(12) United States Patent
Hagiwara et al.

(10) Patent No.: US 8,409,748 B2
(45) Date of Patent: Apr. 2, 2013

(54) BATTERY AND ELECTRONIC APPARATUS

(75) Inventors: Hideki Hagiwara, Tokyo (JP); Michihito Kobayashi, Kanagawa (JP); Yoshihiro Konno, Tokyo (JP); Shoichi Shintani, Saitama (JP); Yoichi Miyajima, Tokyo (JP); Tsugio Sameshima, Chiba (JP); Tomohiro Tsumura, Aichi (JP); Kazuhiro Kitagawa, Aichi (JP); Kiyoshi Miyamori, Aichi (JP); Toshio Takeshita, Kanagawa (JP); Atsushi Takahashi, Aichi (JP); Naoto Hosoya, Kanagawa (JP); Yoshihisa Tsuchida, Kanagawa (JP); Seiya Amatatsu, Kanagawa (JP); Nobutatsu Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1259 days.

(21) Appl. No.: 11/718,652

(22) PCT Filed: Nov. 4, 2005

(86) PCT No.: PCT/JP2005/020684
§ 371 (c)(1),
(2), (4) Date: May 4, 2007

(87) PCT Pub. No.: WO2006/049332
PCT Pub. Date: May 11, 2006

(65) Prior Publication Data
US 2008/0096100 A1  Apr. 24, 2008

(30) Foreign Application Priority Data

Nov. 5, 2004 (JP) ................................. 2004-322268
Dec. 17, 2004 (JP) ................................. 2004-365645
Dec. 20, 2004 (JP) ................................. 2004-367149
Dec. 21, 2004 (JP) ................................. 2004-369041

(51) Int. Cl.
*H01M 6/02* (2006.01)
*H01M 2/10* (2006.01)
*H01M 2/02* (2006.01)
*H01M 2/34* (2006.01)

(52) U.S. Cl. ........... 429/162; 429/100; 429/96; 429/163

(58) Field of Classification Search .................. None
See application file for complete search history.

(56) References Cited

U.S. PATENT DOCUMENTS 6,218,041 B1   4/2001   Barbier et al.

FOREIGN PATENT DOCUMENTS

| EP | 1 089 362 | 4/2001 |
|----|-----------|--------|
| JP | 54-24628  | 2/1979 |

(Continued)

OTHER PUBLICATIONS

U.S. Appl. No. 11/722,125, filed Jun. 19, 2007, Takahashi, et al.

(Continued)

*Primary Examiner* — Barbara Gilliam
*Assistant Examiner* — Angela Martin
(74) *Attorney, Agent, or Firm* — Oblon, Spivak, McClelland, Maier & Neustadt, L.L.P.

(57) ABSTRACT

A battery and an electronic apparatus are disclosed by which it can be discriminated with a simple configuration whether or not the battery is of a thin type. The battery is configured such that a wall portion for discrimination of a battery characteristic which is swollen in a lengthwise direction and connects to a connector section is formed at a location of one of end faces positioned rather near to an end portion in a widthwise direction of a case of the battery.

16 Claims, 42 Drawing Sheets

FOREIGN PATENT DOCUMENTS

| | | |
|---|---|---|
| JP | 54-24628 U | 2/1979 |
| JP | 56-51257 | 5/1981 |
| JP | 56-51257 U | 5/1981 |
| JP | 58-53467 U | 4/1983 |
| JP | 61 114464 | 6/1986 |
| JP | 2001-266826 | 9/2001 |
| JP | 2003-36828 | 2/2003 |
| JP | 2003-45386 | 2/2003 |
| JP | 2003-045386 * | 2/2003 |
| JP | 2003-086155 * | 3/2003 |
| JP | 2003-091335 A * | 3/2003 |
| JP | 2003-91335 A | 3/2003 |
| JP | 2004-120140 | 4/2004 |

OTHER PUBLICATIONS

U.S. Appl. No. 12/845,443, filed Jul. 28, 2010, Takeshita, et al.
U.S. Appl. No. 12/845,437, filed Jul. 28, 2010, Takeshita, et al.

* cited by examiner

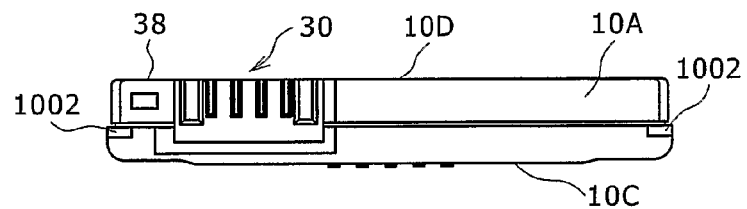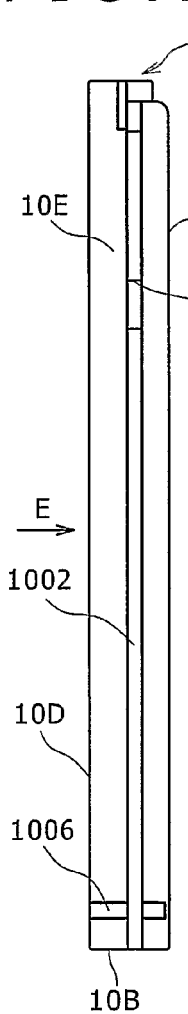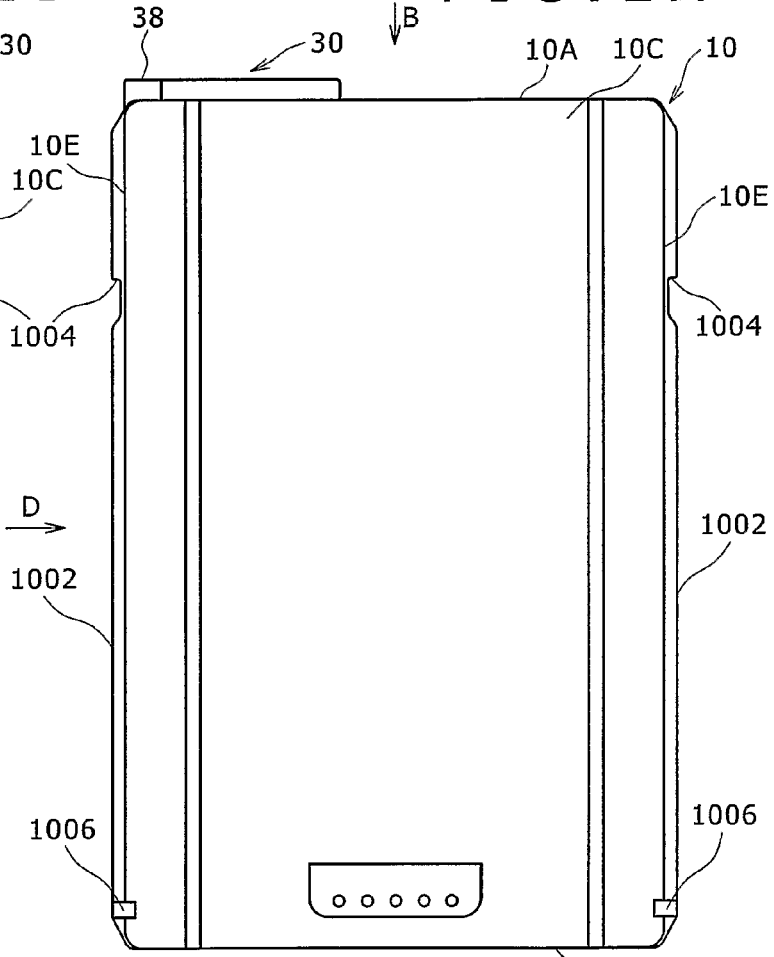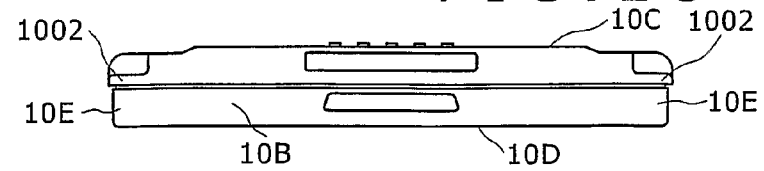

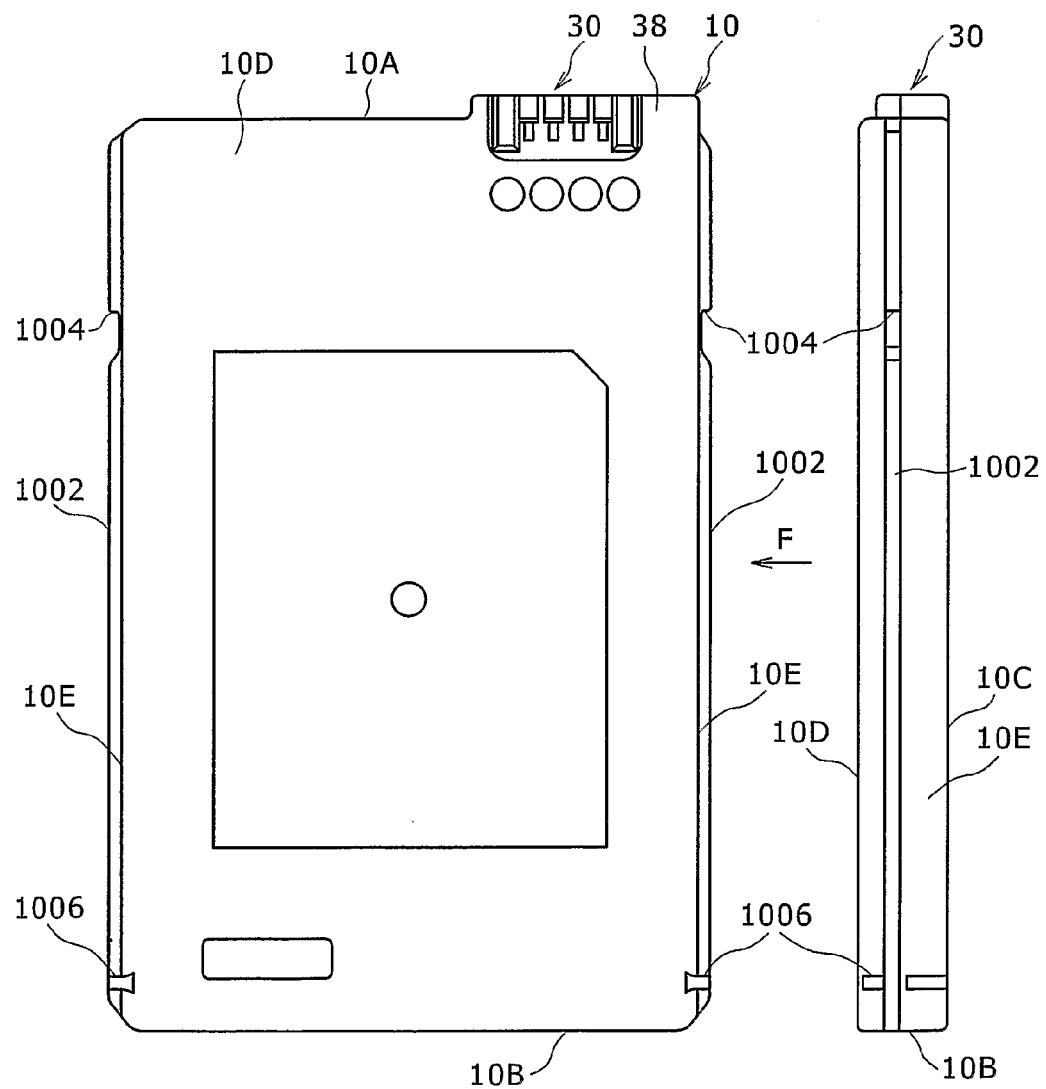

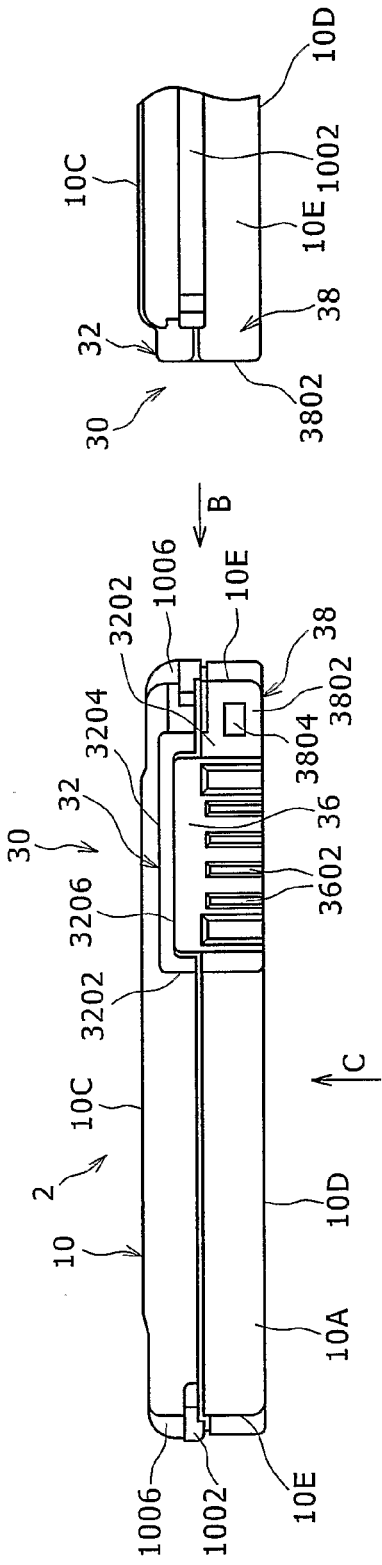

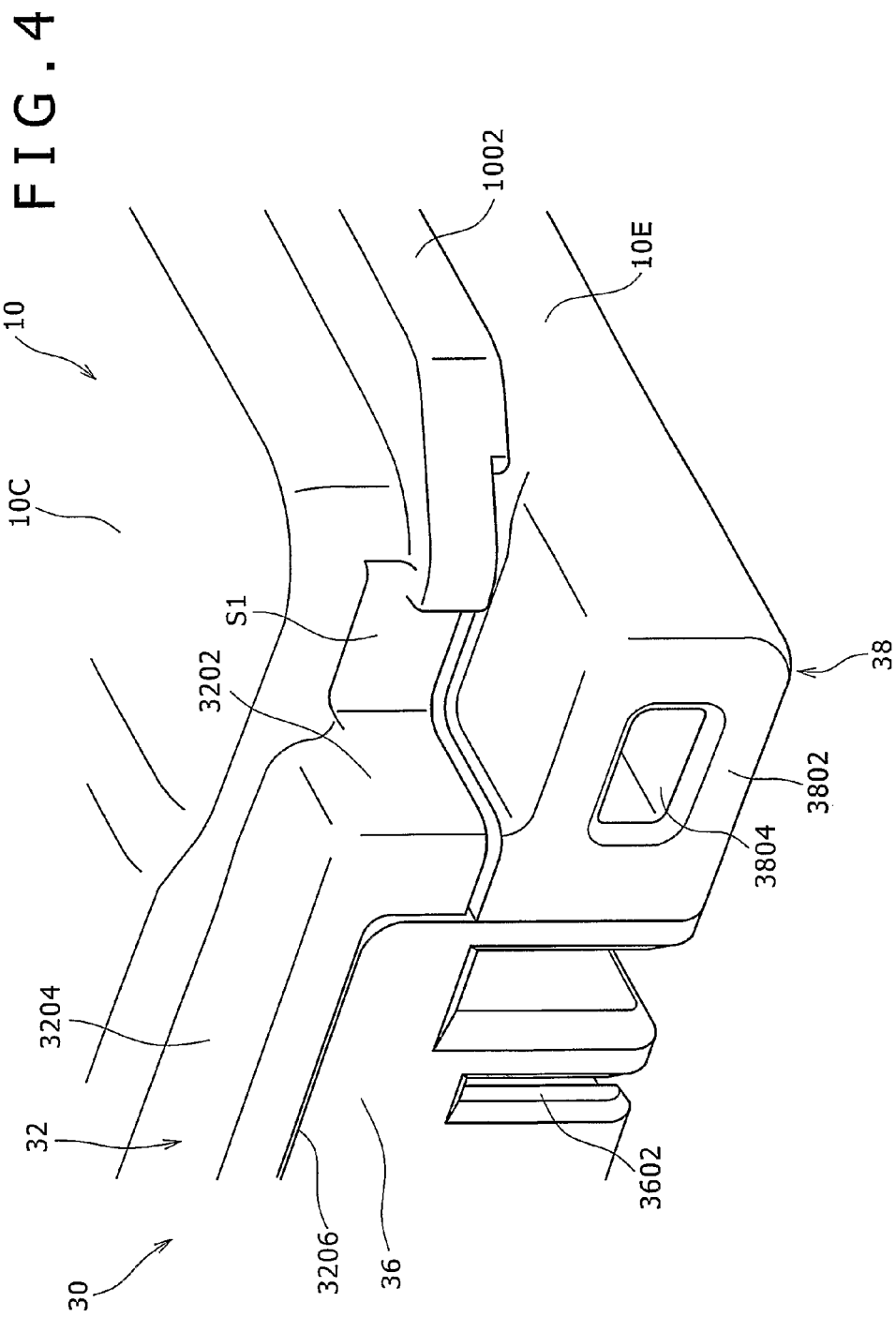

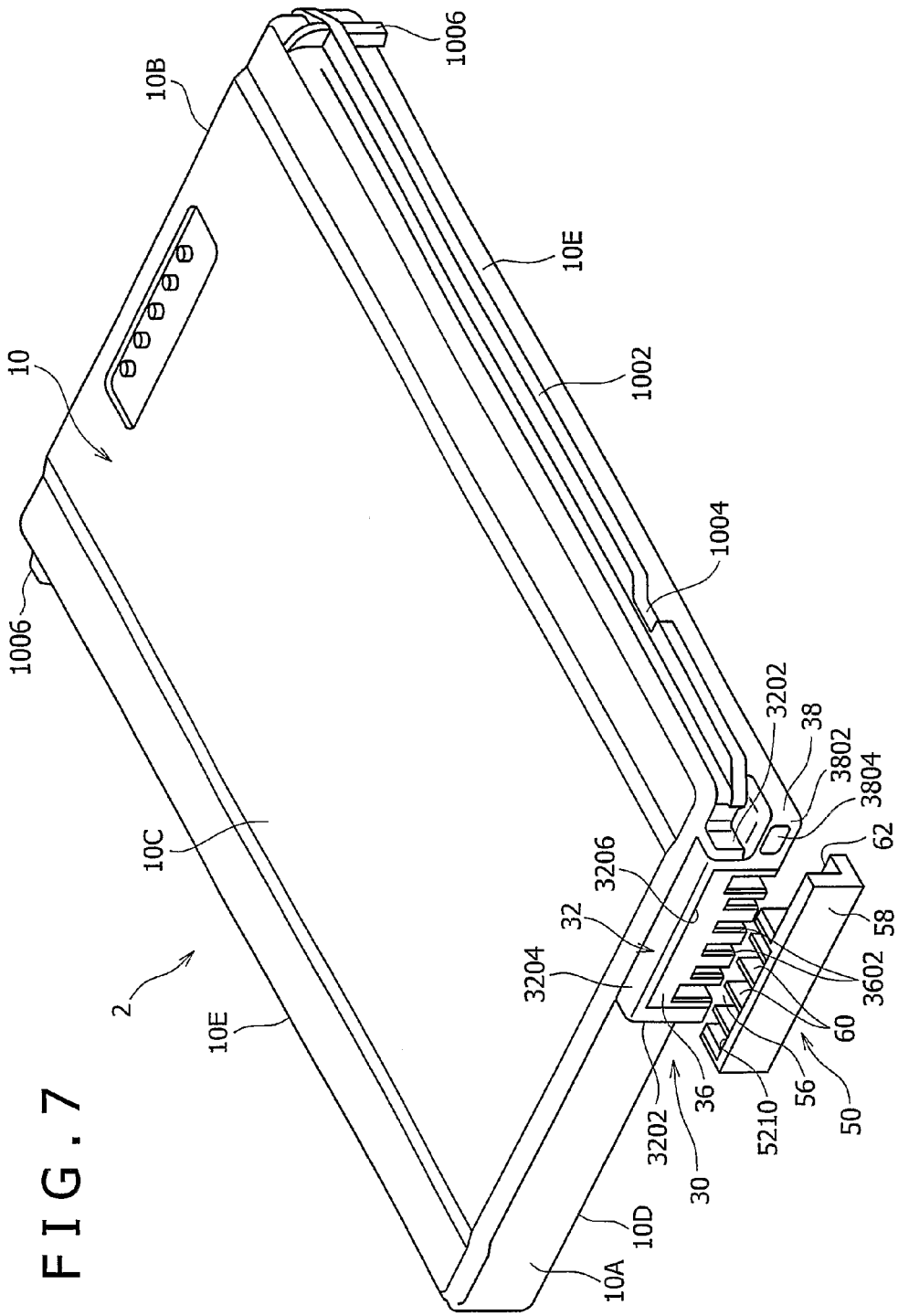

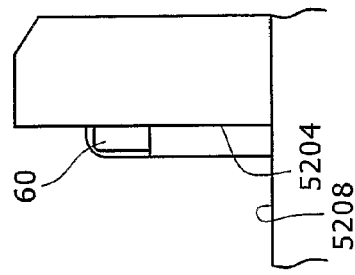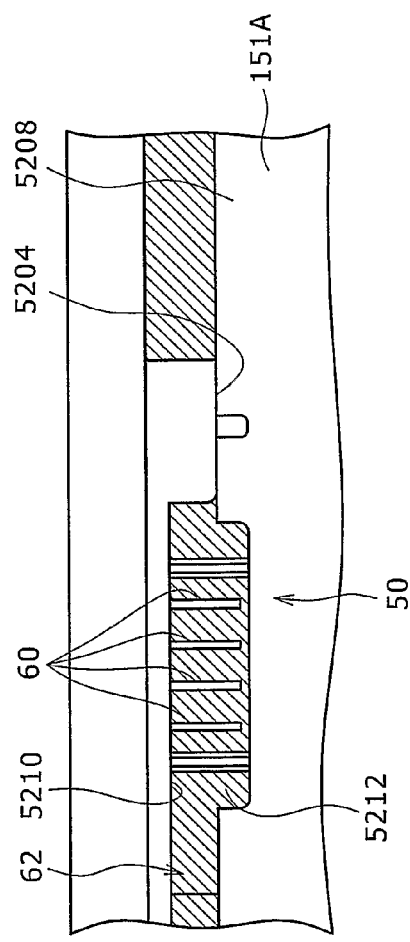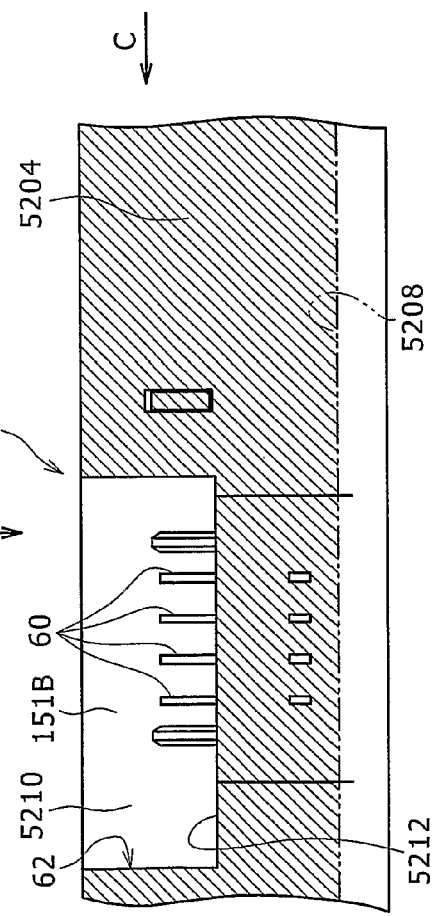

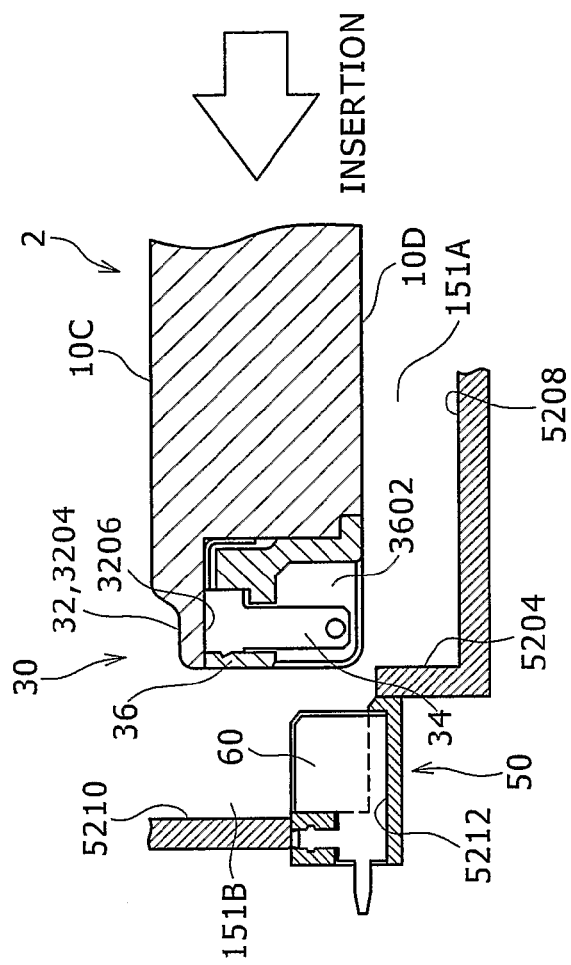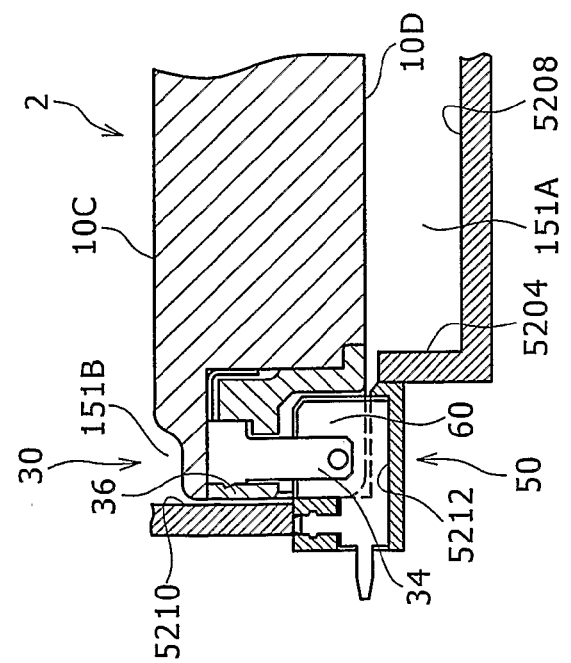

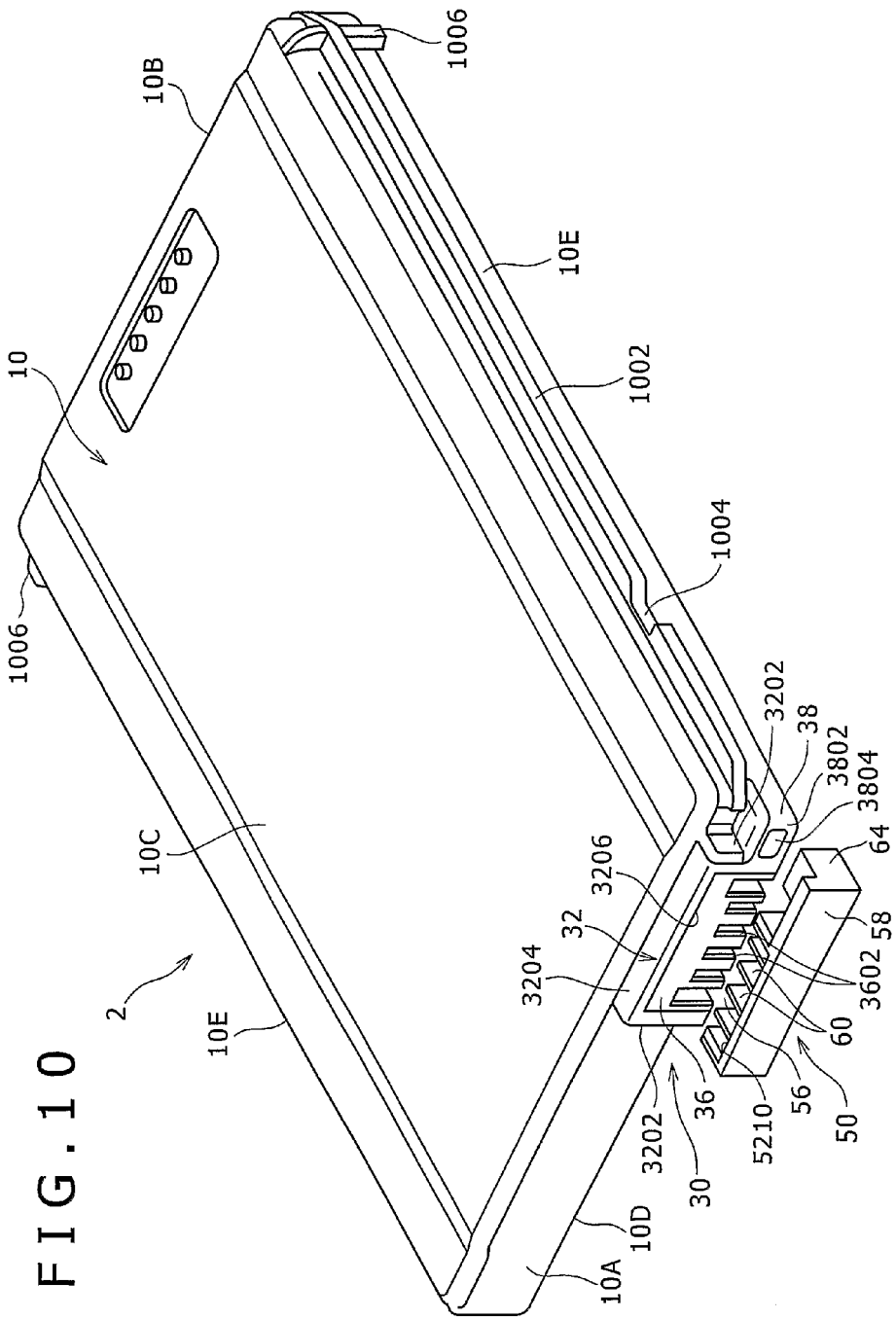

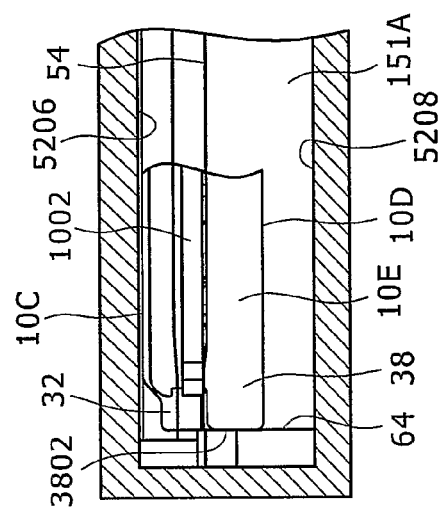
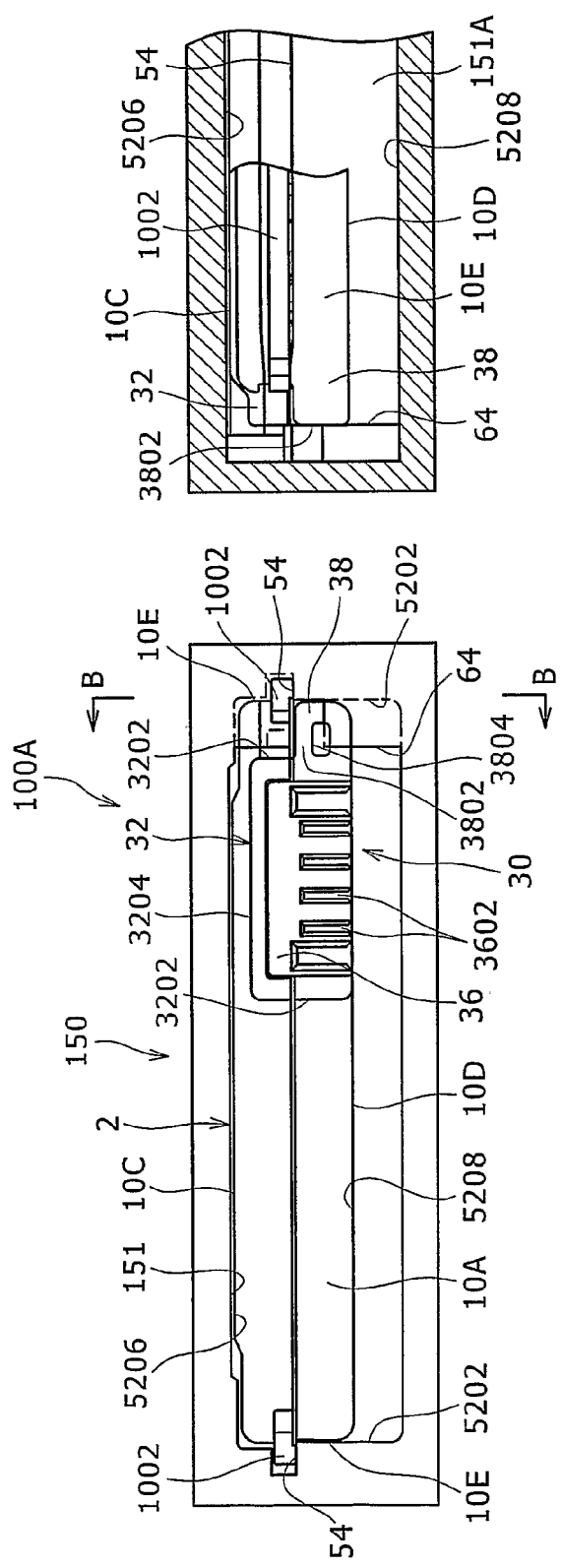
FIG. 12A
FIG. 12B

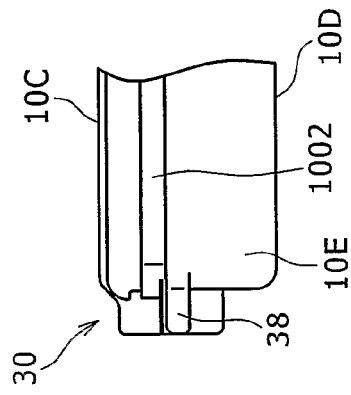
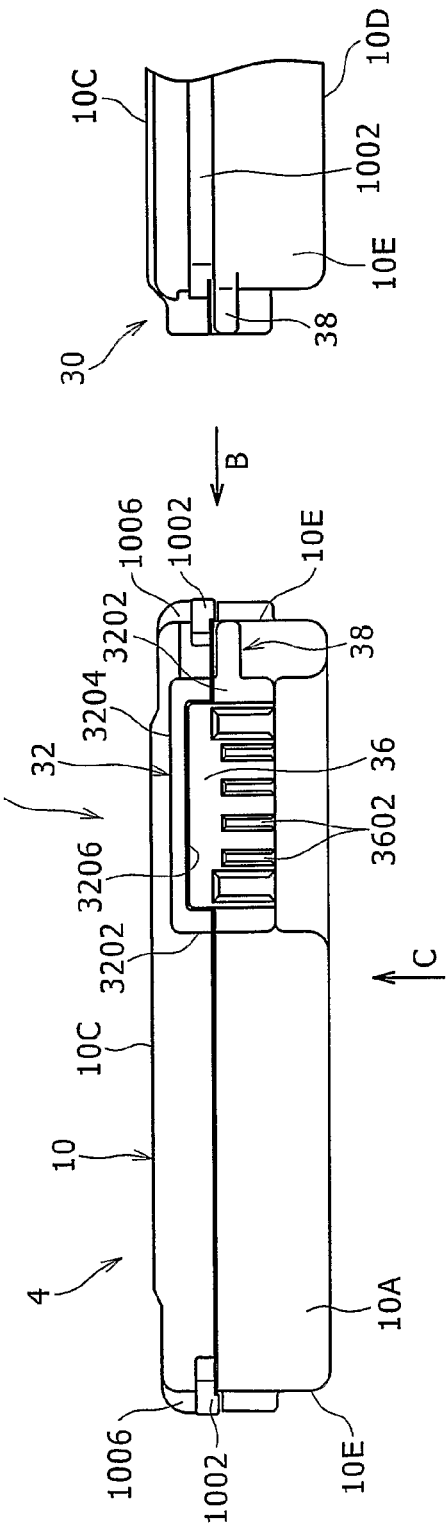
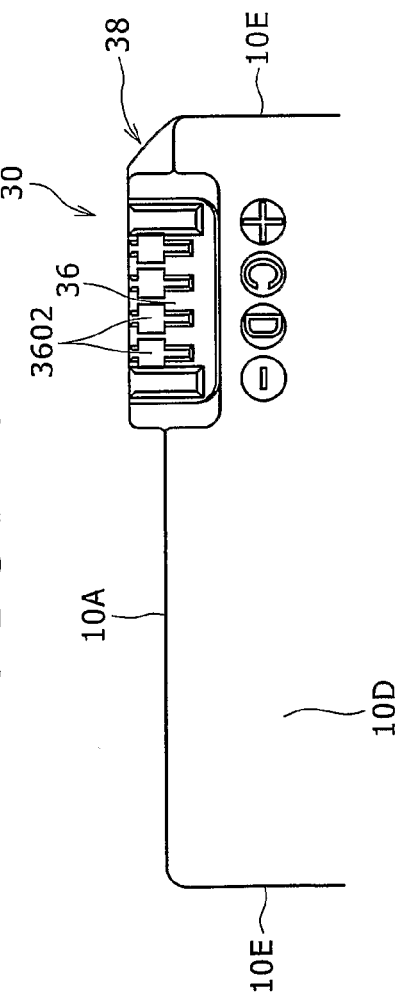

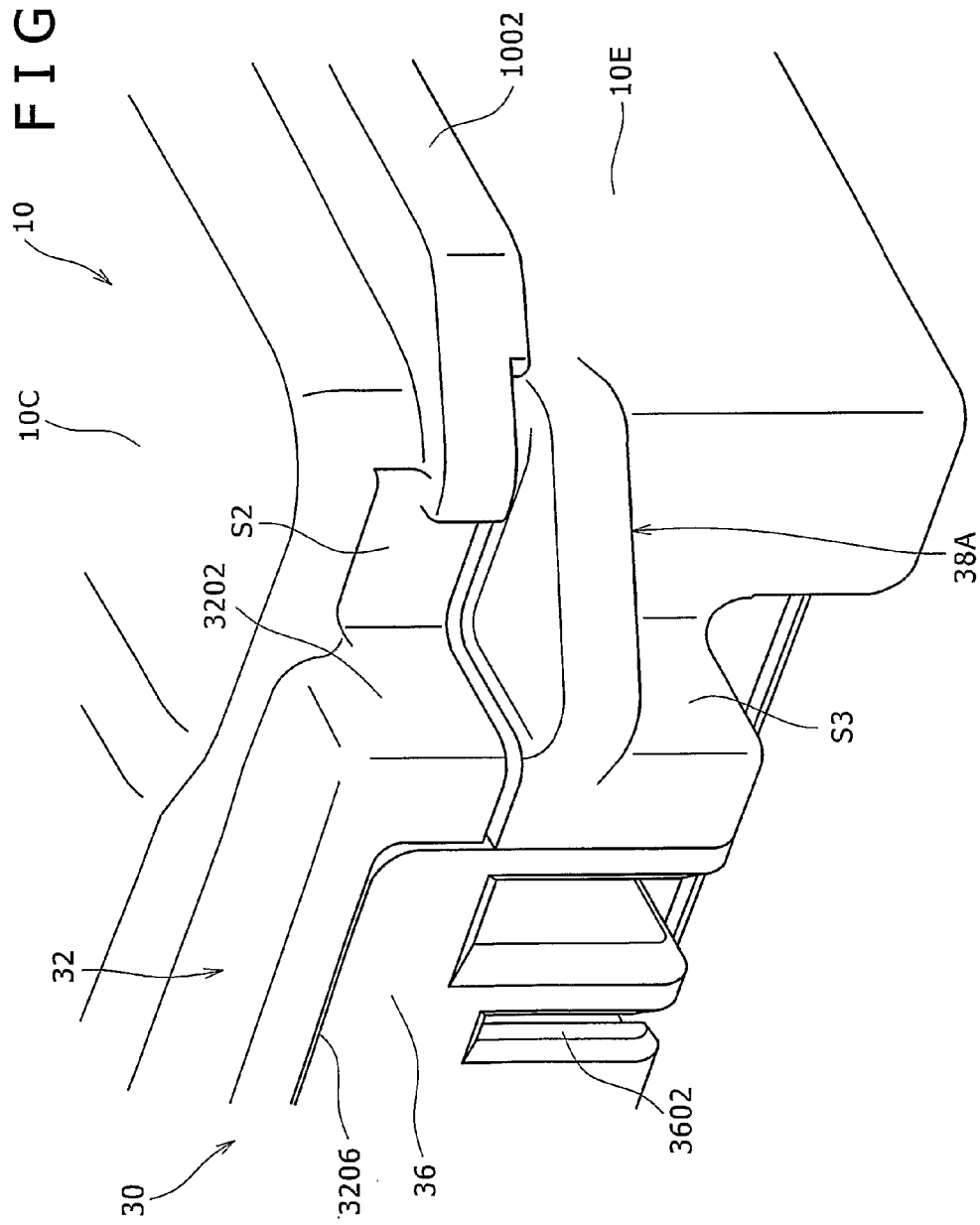

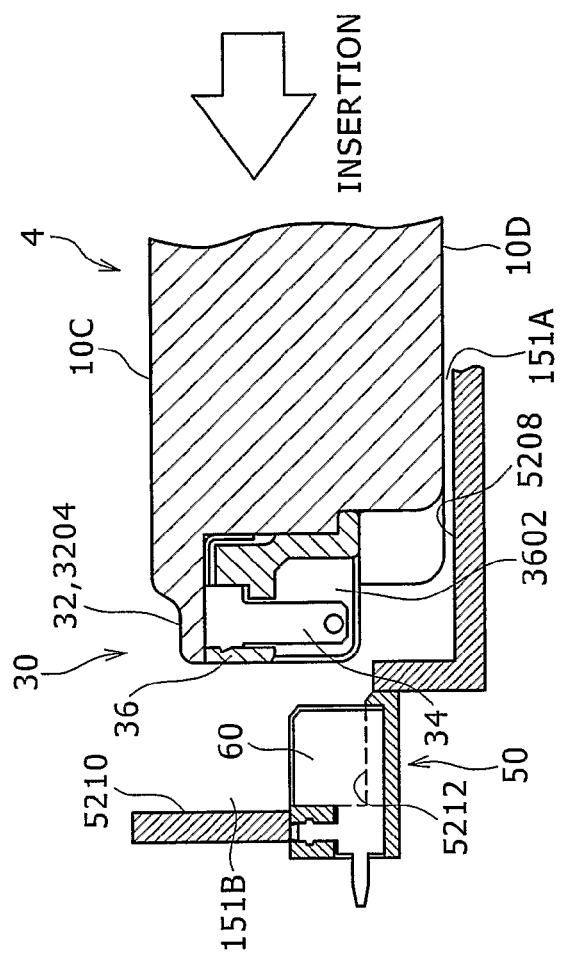
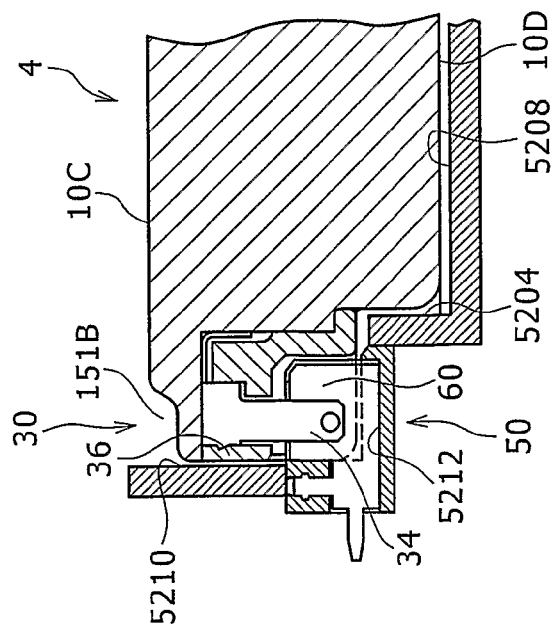

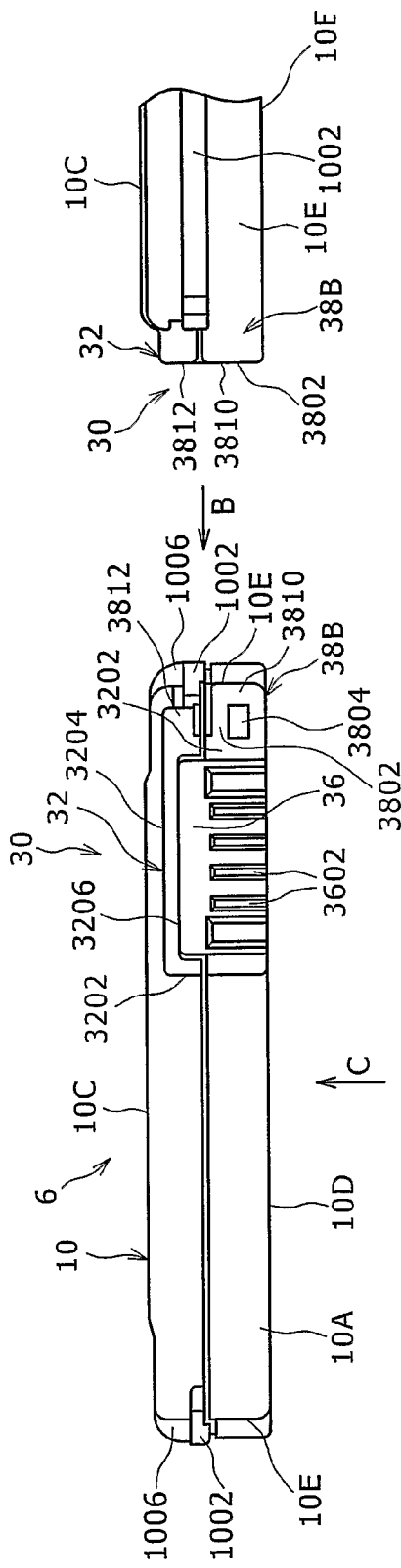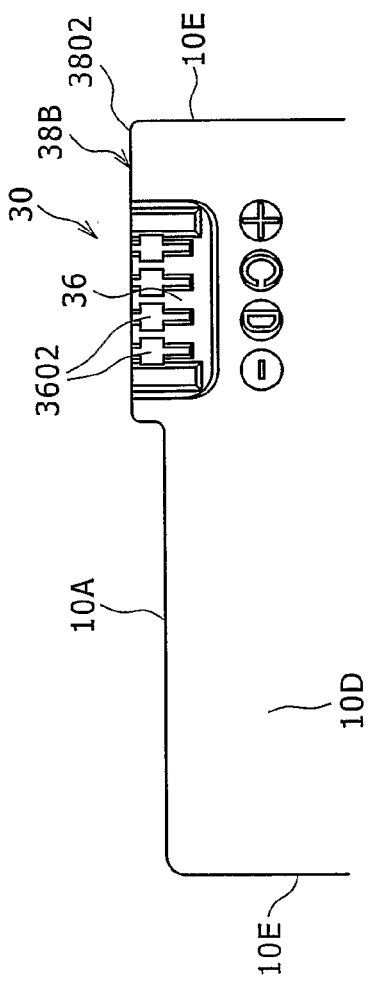

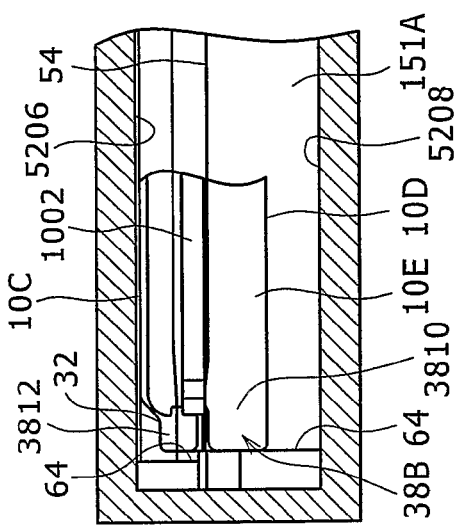
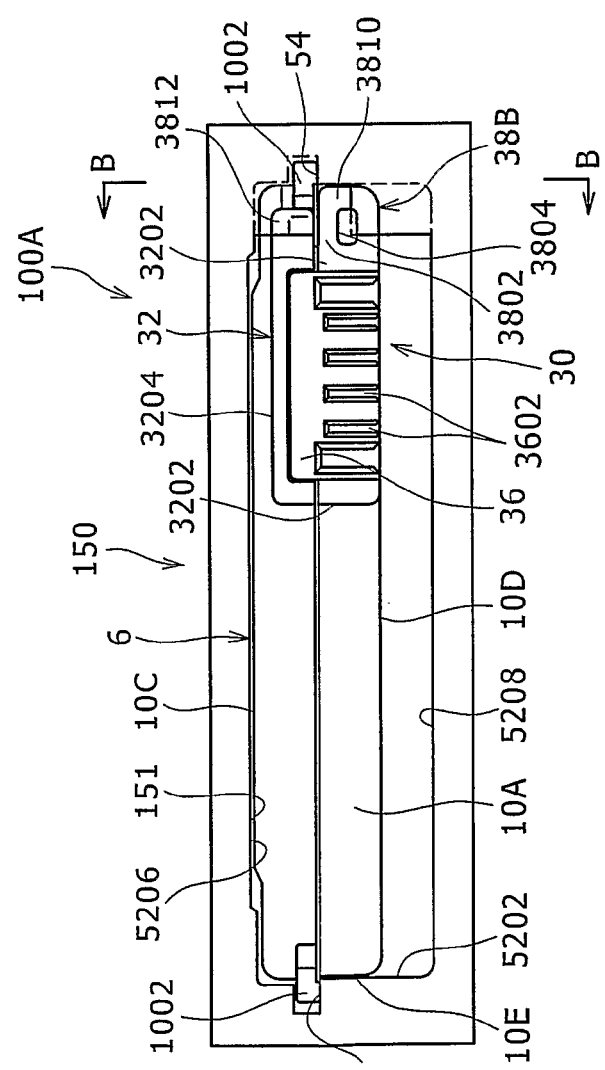
FIG. 21B
FIG. 21A

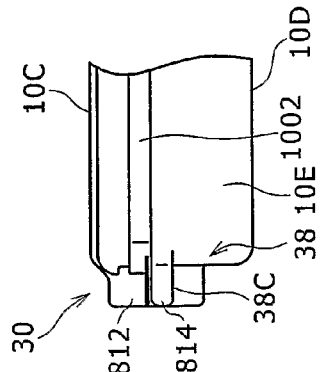
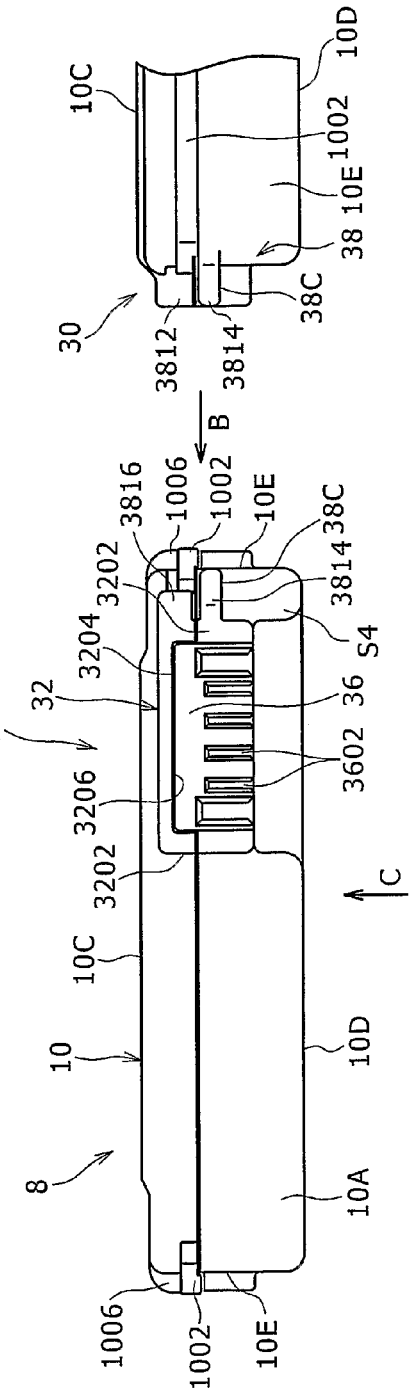
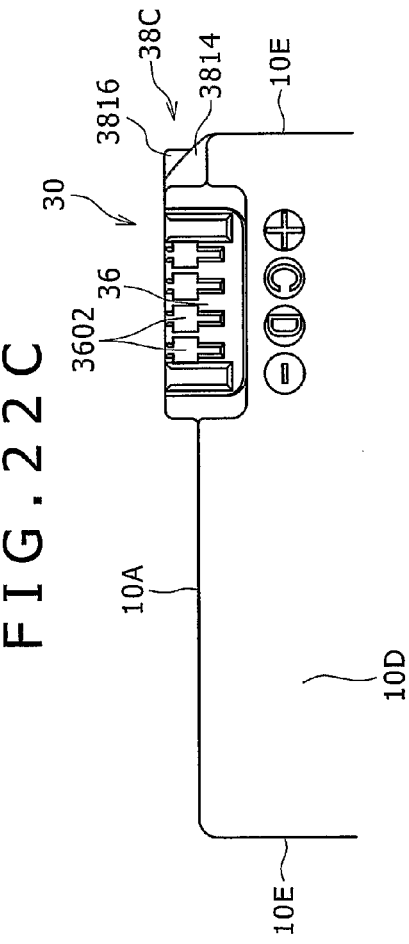

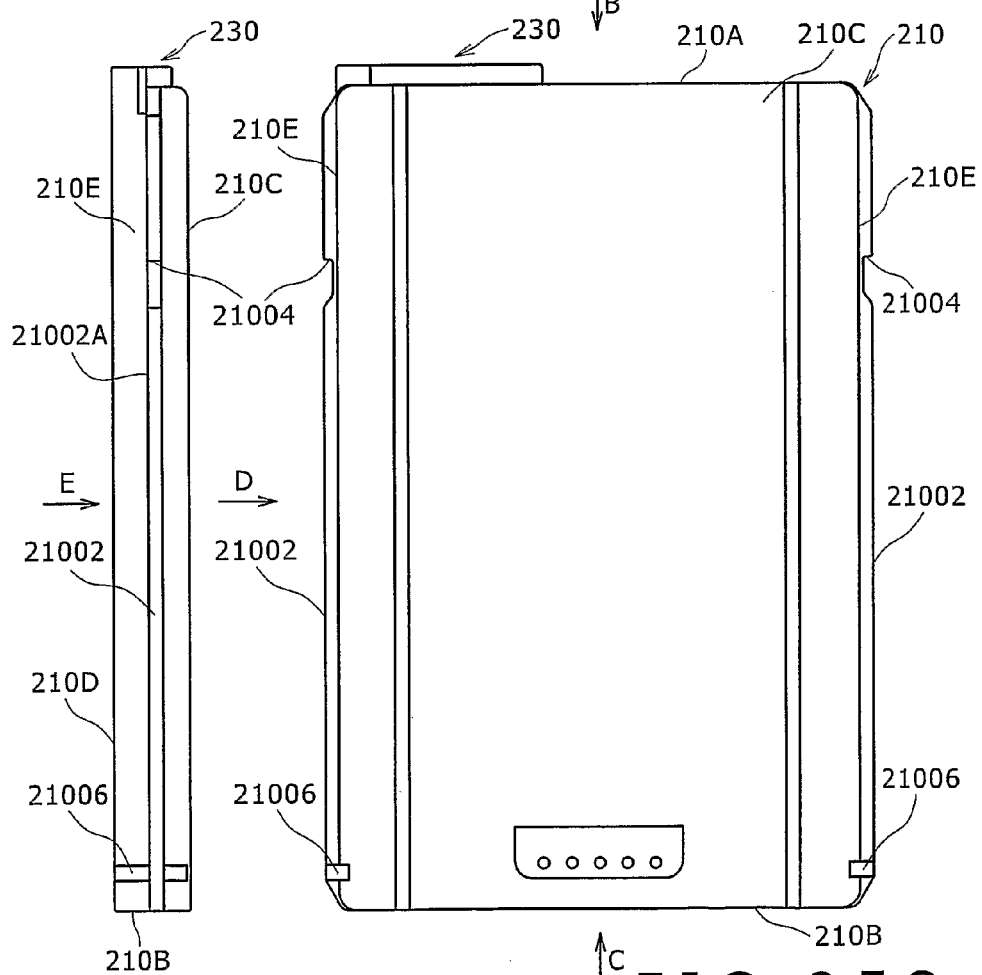

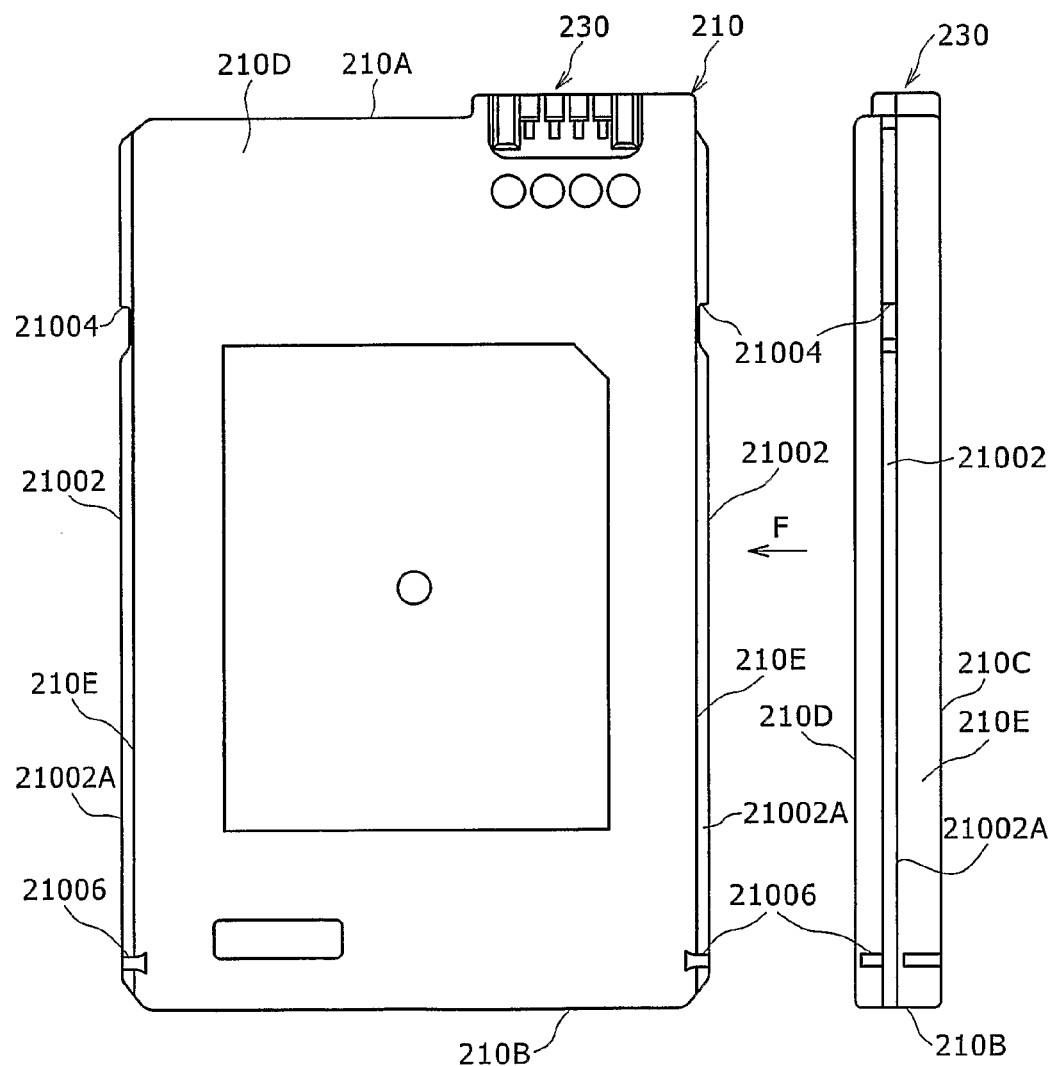

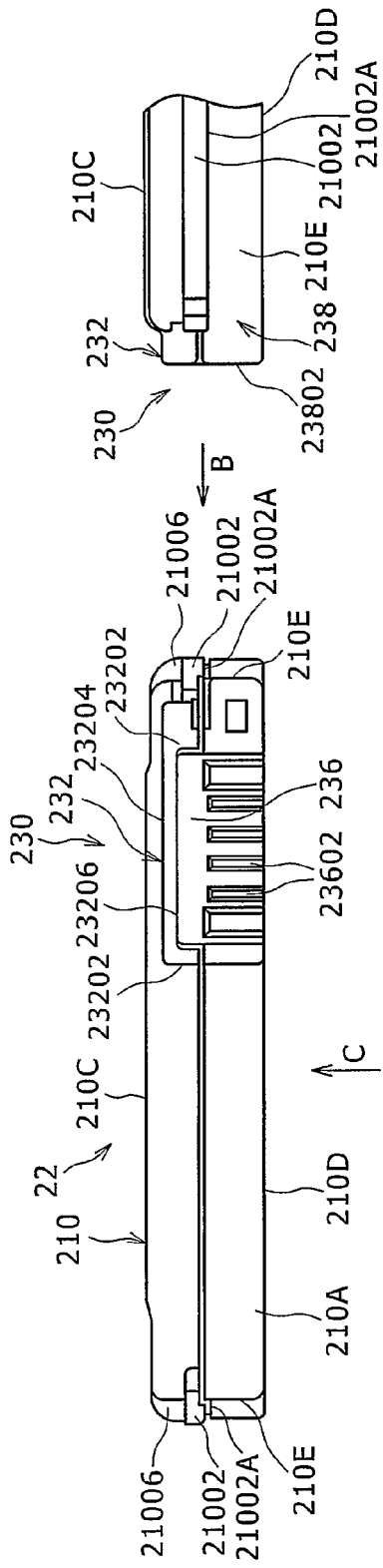
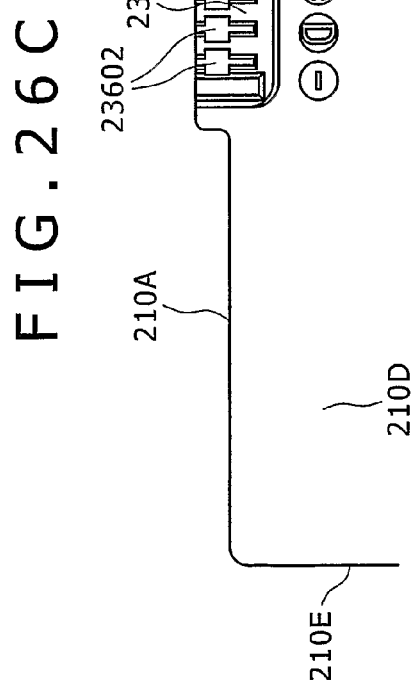

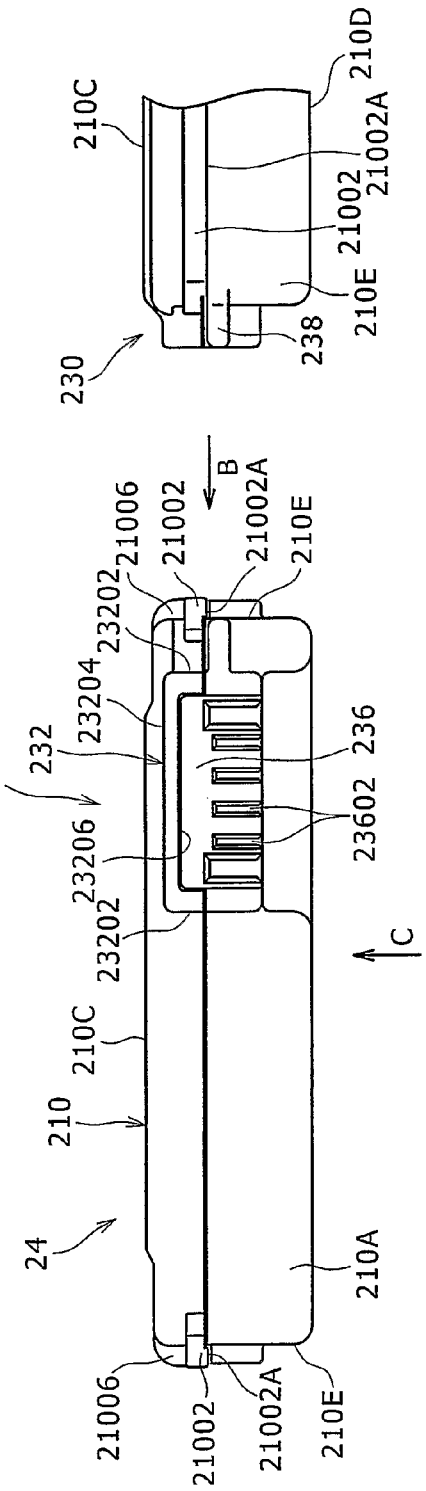
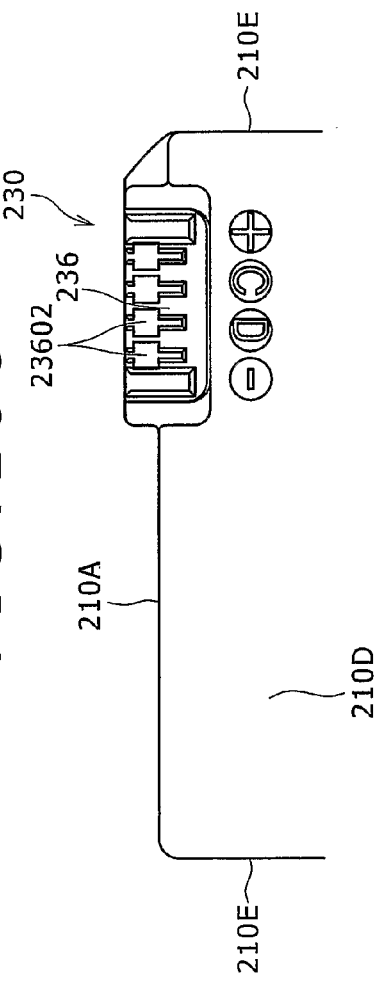
FIG. 28A  FIG. 28B  FIG. 28C

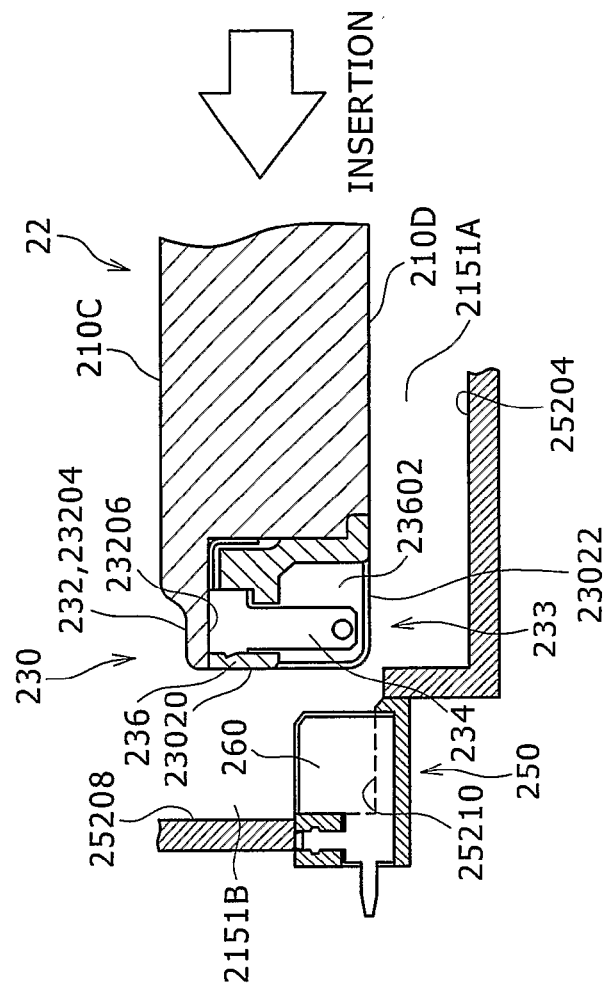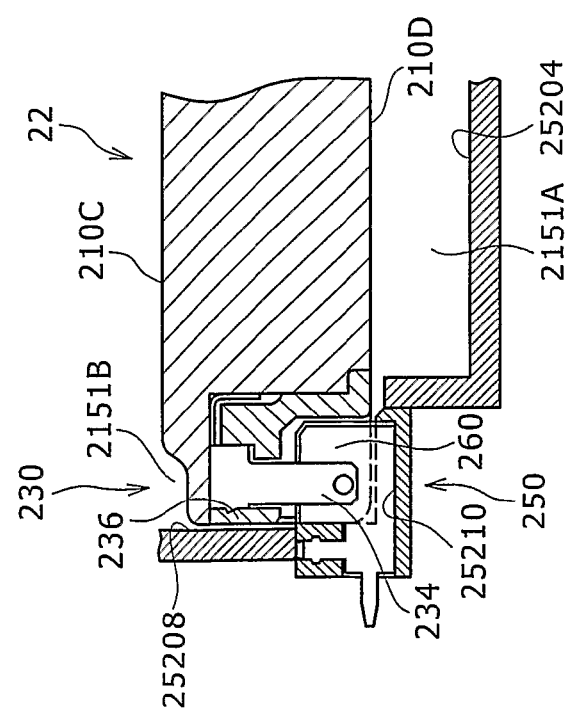

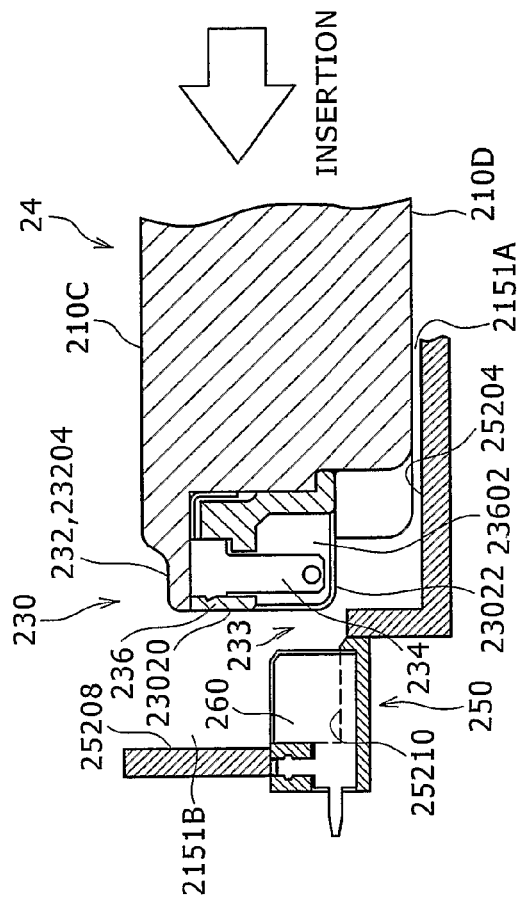
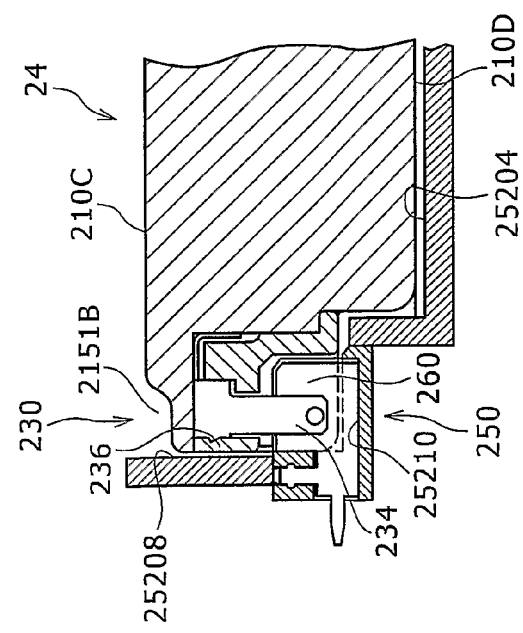

BATTERY AND ELECTRONIC APPARATUS

TECHNICAL FIELD

This invention relates to a battery and an electronic apparatus in which a battery is removably loaded.

The present invention contains subject matter related to Japanese Patent Application JP 2004-367149 filed in the Japanese Patent Office on Dec. 20, 2004, and the Japanese Patent Application JP 2004-369041 filed in the Japanese Patent Office on Dec. 21, 2004, entire contents of which being incorporated herein by reference.

BACKGROUND ART

A battery for being loaded in an electronic apparatus in related art is known which includes a case, a plurality of cylindrical battery cells accommodated in the case, and a battery side connector section provided on the case and connected to the battery cells. The battery is configured such that, when it is accommodated into a battery accommodating chamber of an electronic apparatus, the battery side connector section is connected to an electronic apparatus side connector section in the battery accommodating chamber.

Where a plurality of different types of batteries which are different in capacity or characteristic from each other are available as any of the batteries of the types described above, it is preferable to discriminate a property of a battery compatible with an electronic apparatus and permit loading of the battery if the battery is compatible with the electronic apparatus but inhibit loading of the battery if the battery is not compatible.

To this end, a structure is known which permits loading only of a battery compatible with an electronic apparatus into a battery accommodating chamber of the electronic apparatus. According to the structure, a recess such as a hole or a groove is provided at a portion of a case of the battery which corresponds to a dead space which appears between outer circumferential faces of battery cells in the case. Meanwhile, a projection for fitting with the recess of the case of the battery is provided in a battery accommodating chamber of an electronic apparatus such that, when the shapes and the positions of the recess and the projection coincide with each other and are fitted with each other, loading of the battery into the battery accommodating chamber is permitted. However, if the shapes and/or the positions of the recess and the projection do not coincide with each other and cannot be fitted with each other, then loading of the battery into the battery accommodating chamber is inhibited.

Meanwhile, since efforts are made in recent years to reduce the thickness of a battery as miniaturization of electronic apparatus proceeds, a battery cell of a flattened substantially rectangular plate shape is used in place of a cylindrical battery cell. Thus, a battery cell of a flattened substantially rectangular plate shape of a reduced size has been proposed and disclosed, for example, in Japanese Patent Laid-Open No. 2001-266826.

Also another battery for being loaded in an electronic apparatus in related art is known and disclosed, for example, in Japanese Patent Laid-Open No. Hei 9-266015. The battery includes a case, a battery cell accommodated in the case, and a connector section provided on the case. The battery is configured such that, when it is loaded into a battery accommodating chamber of an electronic apparatus, the connector section thereof is connected to a connector section of the electronic apparatus in the battery accommodating chamber.

The connector section of the battery has a plurality of contact pieces provided at a location of the case facing downwardly and connected to the battery cell. Meanwhile, the connector section of the electronic apparatus has a plurality of contact pieces provided on a bottom face of the battery accommodating chamber for contacting with the contact pieces of the battery. Thus, if the bottom face of the battery is received by the bottom face of the battery accommodating chamber, then the contact pieces of the connector section of the battery and the contact pieces of the connector section of the electronic apparatus are connected to each other.

DISCLOSURE OF INVENTION

In such an electronic apparatus as described above with reference to Japanese Patent Laid-Open No. Hei 9-266015, since the contact pieces of the connector section of the electronic apparatus are supported on the bottom face of the battery accommodating chamber, it cannot be avoided that a portion at which the contact pieces is supported projects downwardly farther than the bottom face of the battery accommodating chamber. Therefore, a space into which the contact pieces project downwardly farther than the bottom face of the case must be assured for the battery accommodating chamber. Consequently, there is a limitation to reduction of the dimension of the battery accommodating chamber in the thicknesswise direction.

In recent years, in order to achieve reduction in thickness and size of electronic apparatus, a configuration wherein a battery having a flattened rectangular plate shape is accommodated in a battery accommodating chamber of an electronic apparatus is adopted frequently. In such an instance, how to reduce the dimension of the battery accommodating chamber in the thicknesswise direction is significant in order to achieve reduction in thickness of the battery chamber and hence to achieve miniaturization of the electronic apparatus.

Meanwhile, in such a battery of a flattened substantially rectangular plate shape as disclosed in Japanese Patent Laid-Open No. 2001-266826, since it uses battery cells having a flattened rectangular shape, such a dead space as appears between outer circumferential faces of cylindrical battery cells as in the battery in related art described hereinabove does not exist in the inside of the base. Therefore, it is difficult to provide a recess for recognition of a battery characteristic or property which is recessed inwardly of the case.

It is an object of the present invention to provide a battery of a reduced thickness and an electronic apparatus of a reduced size which are superior in convenience.

It is another object of the present invention to provide a battery and an electronic apparatus which are advantageous in achieving thin formation of a battery accommodating chamber of the electronic apparatus.

It is a further object of the present invention to provide a battery and an electronic apparatus by which it can be discriminated with a simple configuration whether or not the battery is of a thin type.

In order to attain the objects described above, according to the present invention, a wall portion for discrimination of a battery characteristic which is swollen in a lengthwise direction and connects to a connector section is formed at a location of one of end faces positioned rather near to an end portion in a widthwise direction of a case of the battery.

In particular, according to an embodiment of the present invention, there is provided a battery including a case of a flattened substantially rectangular plate shape having a thickness, a width in a leftward and rightward direction having a greater dimension than the thickness and a length in a forward and backward direction having a greater dimension than the width, a battery cell accommodated in the inside of the case, and a connector section formed at a location rather near to an end portion in the widthwise direction on one of faces at the opposite ends of the case in the lengthwise direction and projecting in the lengthwise direction, a wall portion for discrimination of a battery characteristic being formed at a location between the connector section and the end portion in the widthwise direction on the one end face in such a manner as to be swollen in the lengthwise direction and connect to the connector section.

According to another embodiment of the present invention, there is provided an electronic apparatus into which a battery having a length in a forward and backward direction and having a connector section provided at a front end thereof is loaded, including a battery receiving section in which a battery is to be loaded, the battery receiving section including a battery accommodating chamber into which the battery is inserted in the lengthwise direction thereof and an electronic apparatus side connection section provided at an interior portion of the battery accommodating chamber, a recess being provided in the proximity of the electronic apparatus side connector section for receiving a wall portion for discrimination of a battery characteristic provided on the battery and accommodated therein.

According to a further embodiment of the present invention, there is provided an electronic apparatus into which a battery having a length in a forward and backward direction and having a connector section provided at a front end thereof is loaded, including a battery receiving section in which a battery is to be loaded, the battery receiving section including a battery accommodating chamber into which the battery is inserted in the lengthwise direction thereof and an electronic apparatus side connection section provided at an interior portion of the battery accommodating chamber, a projection being provided in the proximity of the electronic apparatus side connector section for contacting with a wall portion for discrimination of a battery characteristic provided on the battery to block a battery side connector section and the electronic apparatus side connector section from being coupled to each other.

With the battery and the electronic apparatus, the wall portion for discrimination of a battery characteristic does not have an influence on the space for accommodating a battery cell in the inside of the case of the battery. This is advantageous in achieving discrimination of a characteristic of a thin battery with a simple configuration.

Further, a characteristic of a thin battery can be discriminated with certainty with such a simple configuration that a recess which accommodates a wall portion for discrimination of a battery characteristic or a projection for contacting with a wall portion for discrimination of a battery characteristic is provided in the proximity of the electronic apparatus side connector section.

Furthermore, the wall portion for discrimination of a battery characteristic can be disposed in a small space between the connector section and an end portion in the widthwise direction of one of end faces of the case in the lengthwise direction. Consequently, the wall portion for discrimination of a battery characteristic is less likely to make an obstacle to handling of the battery, and this is advantageous in enhancing the convenience in use.

In addition, since the wall face for discrimination of a battery characteristic is connected to the front face of the case and a vertical wall of the connector wall portion, the influence of the connector wall portion can be enhanced and also the strength of a corner portion of the case which is liable to strike upon an external body can be enhanced. This is advantageous in assuring the durability of the battery.

Furthermore, in order to attain the objects described above, according to the present invention, a wall or a groove which projects outwardly in a widthwise direction and extends in a lengthwise direction is provided at an intermediate portion in a thicknesswise direction of each of left and right side faces of a case of a battery, and the position of a connector section in the thicknesswise direction is determined with reference to that face of the wall or the groove on each of the left and right side faces which faces upwardly or downwardly.

Further, a wall or a groove for positioning a battery in an upward and downward direction in a case accommodating chamber of an electronic apparatus is provided on each of left and right side faces of the case accommodating chamber, and an electronic apparatus side connector section is provided at a location displaced to an upper face of the case accommodating chamber rather than a lower face of the case accommodating chamber.

In particular, according to a yet further embodiment of the present invention, there is provided a battery including a case of a flattened substantially rectangular plate shape having an upper face and a lower face positioned at the opposite ends in a thicknesswise direction, left and right side faces positioned at the opposite ends in a direction of a width having a greater dimension than the thickness and a front face and a rear face positioned at the opposite ends in a forward and backward direction of a length having a greater dimension than the width, a battery cell accommodated in the inside of the case, and a connector section provided on the case, the connector section being provided so as to project forwardly on the front face of the case, each of the left and right side faces of the case having a wall formed at an intermediate portion thereof in the thicknesswise direction so as to project outwardly in the widthwise direction and extend in the lengthwise direction, the position of the connector section in the thicknesswise direction being determined with reference to that one of faces of the wall which faces upwardly or downwardly.

According to a yet further embodiment of the present invention, there is provided a battery including a case of a flattened substantially rectangular plate shape having an upper face and a lower face positioned at the opposite ends in a thicknesswise direction, left and right side faces positioned at the opposite ends in a direction of a width having a greater dimension than the thickness and a front face and a rear face positioned at the opposite ends in a forward and backward direction of a length having a greater dimension than the width, a battery cell accommodated in the inside of the case, and a connector section provided on the case, the connector section being provided so as to project forwardly on the front face of the case, each of the left and right side faces of the case having a groove formed at an intermediate portion thereof in the thicknesswise direction so as to be depressed inwardly in the widthwise direction and extend in the lengthwise direction, the position of the connector section in the thicknesswise direction being determined with reference to one of a pair of faces which are opposed to each other to form the groove.

With each of the batteries, where it has a smaller thickness, it can be accommodated in a state wherein the lower face of the connector section and the lower face of the case lie on the same plane and the lower face of the case is spaced from the lower face of the case accommodating chamber.

In other words, the electronic apparatus side connector section can be provided at a location displaced upwardly from the lower face of the case accommodating chamber in the battery accommodating chamber.

Consequently, the portions of the contact pieces of the electronic apparatus side connector section which are supported by the lower face of the connector section accommodating chamber do not project downwardly farther than the lower face of the case accommodating chamber. This is advantageous in suppressing the dimension of the battery accommodating chamber in the upward and downward direction.

According to an additional embodiment of the present invention, there is provided an electronic apparatus including a battery receiving section in which a battery having a connector section provided in a projecting manner on a front face of a case thereof is to be loaded, the battery receiving section including a battery accommodating chamber into which the battery is inserted and an electronic apparatus side connector section provided at an interior portion of the battery accommodating chamber in the insertion direction of the battery for being coupled to a connector section of the battery, the battery accommodating chamber including a case accommodating chamber having an upper face, a lower face and left and right side faces for receiving the case of the battery accommodated therein and a connector section accommodating chamber connected to the case accommodating chamber for receiving the connector section of the battery accommodated therein, each of the left and right side faces of the case accommodating chamber having a groove formed thereon so as to extend along the insertion direction for positioning the battery in the upward and downward direction in the case accommodating chamber, the electronic apparatus side connector section being disposed in the connect section accommodating chamber, the electronic apparatus side connector section being provided at a location displaced to the upper face of the case accommodating chamber from the lower face of the case accommodating chamber.

According to another additional embodiment of the present invention, there is provided an electronic apparatus including a battery receiving section in which a battery having a connector section provided in a projecting manner on a front face of a case thereof is to be loaded, the battery receiving section including a battery accommodating chamber into which the battery is inserted and an electronic apparatus side connector section provided at an interior portion of the battery accommodating chamber in the insertion direction of the battery for being coupled to a connector section of the battery, the battery accommodating chamber including a case accommodating chamber having an upper face, a lower face and left and right side faces for receiving the case of the battery accommodated therein and a connector section accommodating chamber connected to the case accommodating chamber for receiving the connector section of the battery accommodated therein, each of the left and right side faces of the case accommodating chamber having a wall formed in a projecting manner thereon so as to extend along the insertion direction for positioning the battery in the upward and downward direction in the case accommodating chamber, the electronic apparatus side connector section being disposed in the connect section accommodating chamber, the electronic apparatus side connector section being provided at a location displaced to the upper face of the case accommodating chamber from the lower face of the case accommodating chamber.

According to a further additional embodiment of the present invention, there is provided an electronic apparatus into which a battery is loaded, the battery including a case of a flattened substantially rectangular plate shape and a pair of supporting walls which project from left and right side faces thereof and extend in a forward and backward direction, the battery having a connector section provided in a projecting manner on a front face of the case, the electronic apparatus including a battery receiving section for receiving the battery loaded therein, the battery receiving section including a battery accommodating chamber, a lid member, an electronic apparatus side connector section, and a locking section, the battery accommodating chamber including a case accommodating chamber which has a lower face and left and right side faces of a size sufficient to allow the battery accommodating chamber to accommodate the case therein and is open upwardly, a pair of receiving faces formed on the left and right side faces of the case accommodating chamber so as to extend along the forward and backward direction and face upwardly for receiving the supporting walls of the battery, and a connector section accommodating chamber connecting to the case accommodating chamber for accommodating the connector section of the battery therein, the electronic apparatus side connector section being disposed in the connector section accommodating chamber, the lid member being formed so as to cooperate with the case accommodating chamber to cover the battery which is disposed in the case accommodating chamber and the connector section accommodating chamber with the supporting walls thereof received by the receiving faces, the locking section being formed so as to press the supporting walls of the battery accommodated in the case accommodating chamber against the receiving faces and bias the battery in a direction in which the connector section is mated with the electronic apparatus side connector section, the electronic apparatus side connector section being provided at a location displaced upwardly from the lower face of the case accommodating chamber.

With each of the electronic apparatus, the portions of the contact pieces of the electronic apparatus side connector section can be positioned at a location higher than the lower face of the case accommodating chamber. Consequently, the electronic apparatus side connector section does not project downwardly farther than the lower face of the case accommodating chamber. This is advantageous in suppressing the dimension of the battery accommodating chamber in the upward and downward direction.

The above and other objects, features and advantages of the present invention will become apparent from the following description and the appended claims, taken in conjunction with the accompanying drawings in which like parts or elements denoted by like reference symbols.

BRIEF DESCRIPTION OF DRAWINGS

FIG. 2A is a plan view of the first battery;

FIG. 2B is a view as viewed in the direction indicated by an arrow mark B of FIG. 2A;

FIG. 2C is a view as viewed in the direction indicated by an arrow mark C of FIG. 2A;

FIG. 2D is a view as viewed in the direction indicated by an arrow mark D of FIG. 2A;

FIG. 2E is a view as viewed in the direction indicated by an arrow mark E of FIG. 2D;

FIG. 2F is a view as viewed in the direction indicated by an arrow mark F of FIG. 2E;

FIG. 3A is a front elevational view of the first battery;

FIG. 3B is a view as viewed in the direction indicated by an arrow mark B of FIG. 3A;

FIG. 3C is a view as viewed in the direction indicated by an arrow mark C of FIG. 3A;

FIG. 4 is a perspective view of a wall portion for discrimination of the first battery;

FIG. 7 is a schematic perspective view illustrating the first battery and an electronic apparatus side connector section of the image pickup apparatus;

FIG. 8A is a front elevational view of the electronic apparatus side connector section of the image pickup apparatus;

FIG. 8B is a view as viewed in the direction indicated by an arrow mark B of FIG. 8A;

FIG. 8C is a view as viewed in the direction indicated by an arrow mark C of FIG. 8A;

FIGS. 9A and 9B are schematic views showing a connector section of the first battery and the electronic apparatus side connector section of the image pickup apparatus;

FIG. 10 is a schematic perspective view illustrating a relationship between the first battery and an electronic apparatus side connector section of a different image pickup apparatus;

FIG. 12A is a sectional view of a battery receiving section of the different image pickup apparatus;

FIG. 12B is a sectional view taken along a line B-B of FIG. 12A;

FIG. 13A is a front elevational view of a second battery according to a second embodiment of the present invention;

FIG. 13B is a view as viewed in the direction indicated by an arrow mark B of FIG. 13A;

FIG. 13C is a view as viewed in the direction indicated by an arrow mark C of FIG. 13A;

FIG. 14 is a perspective view of a wall portion for discrimination of the second battery;

FIGS. 17A and 17B are schematic views showing a connector section of the second battery and the electronic apparatus side connector section of the image pickup apparatus;

FIG. 20A is a front elevational view of a third battery according to a third embodiment of the present invention;

FIG. 20B is a view as viewed in the direction indicated by an arrow mark B of FIG. 20A;

FIG. 20C is a view as viewed in the direction indicated by an arrow mark C of FIG. 20A;

FIG. 21A is a sectional view of a battery receiving section of the different image pickup apparatus;

FIG. 21B is a sectional view taken along a line B-B of FIG. 21A;

FIG. 22A is a front elevational view of a fourth battery according to a fourth embodiment of the present invention;

FIG. 22B is a view as viewed in the direction indicated by an arrow mark B of FIG. 22A;

FIG. 22C is a view as viewed in the direction indicated by an arrow mark C of FIG. 22A;

FIG. 25A is a plan view of the first battery;

FIG. 25B is a view as viewed in the direction indicated by an arrow mark B of FIG. 25A;

FIG. 25C is a view as viewed in the direction indicated by an arrow mark C of FIG. 25A;

FIG. 25D is a view as viewed in the direction indicated by an arrow mark D of FIG. 25A;

FIG. 25E is a view as viewed in the direction indicated by an arrow mark E of FIG. 25D;

FIG. 25F is a view as viewed in the direction indicated by an arrow mark F of FIG. 25E;

FIG. 26A is a front elevational view of the first battery;

FIG. 26B is a view as viewed in the direction indicated by an arrow mark B of FIG. 26A;

FIG. 26C is a view as viewed in the direction indicated by an arrow mark C of FIG. 26A;

FIG. 28A is a front elevational view of a second battery according to the fifth embodiment of the present invention;

FIG. 28B is a view as viewed in the direction indicated by an arrow mark B of FIG. 28A;

FIG. 28C is a view as viewed in the direction indicated by an arrow mark C of FIG. 28A;

FIGS. 35A and 35B are schematic views illustrating a relationship between a connector section of the first battery and the electronic apparatus side connector section of the image pickup apparatus;

FIGS. 37A and 37B are schematic views illustrating a relationship between a connector section of the second battery and the electronic apparatus side connector section of the image pickup apparatus;

BEST MODE FOR CARRYING OUT THE INVENTION

First Embodiment

Figure 1:
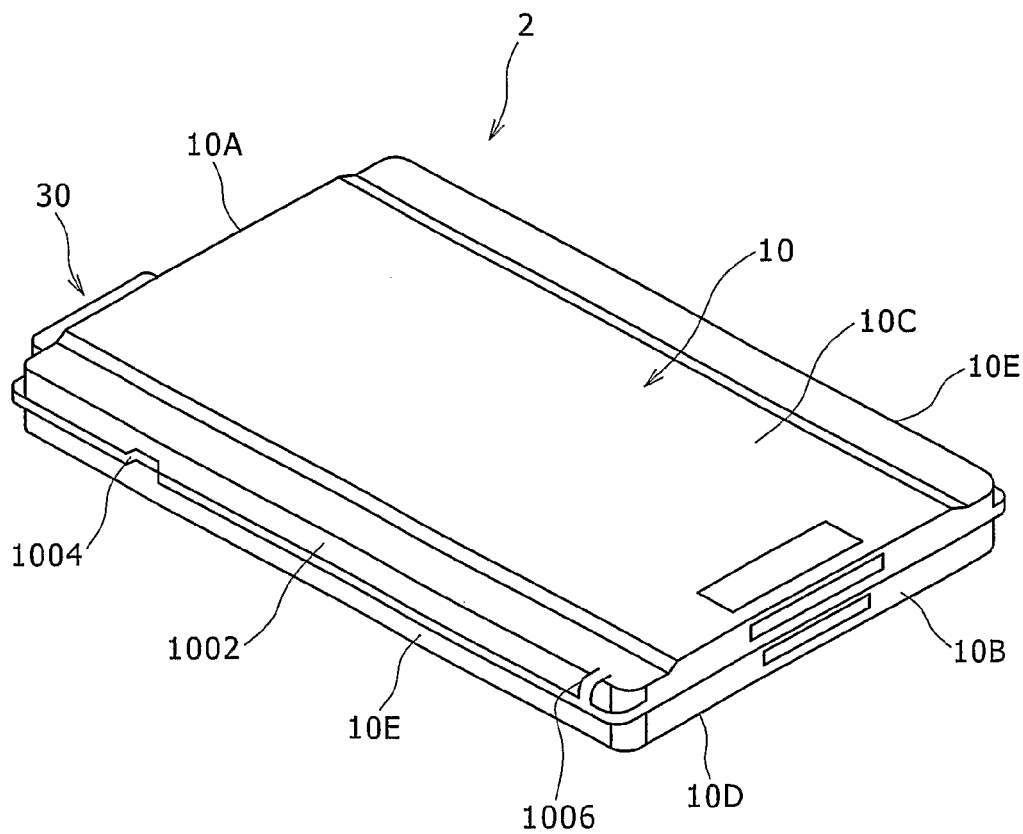
FIG. 1 is a perspective view of a first battery according to a first embodiment of the present invention.

A first embodiment of the present invention is described below with reference to the drawings.

It is to be noted that, in some of the drawings, a plurality of straight lines or curved lines are drawn on a surface of a member or a portion of a member in order to indicate a cylindrical surface, a curved surface or an inclined surface. This similarly applies to the drawings which illustrate different embodiments of the present invention.

Referring first to FIGS. 1 and 2A to 2F, there is shown a first battery 2 according to the first embodiment of the present invention. The first battery 2 includes a case 10, one or more battery cells (not shown) accommodated in the case 10, and a connector section 30.

The case 10 is formed as a flattened substantially rectangular plate shape having a thickness, a width in a leftward and rightward direction having a greater dimension than the thickness and a length in a forward and backward direction having a greater dimension than the width.

The case 10 has a front face 10A and a rear face 10B positioned at the opposite ends in the forward and backward direction, an upper face 10C and a lower face 10D positioned at the opposite ends in the thicknesswise direction perpendicular to the forward and backward direction, and a pair of side faces 10E positioned at the opposite ends in the widthwise direction perpendicular to the forward and backward direction and the thicknesswise direction. It is to be noted that the leftward and rightward direction of the case 10 is represented as viewed from forwardly of the case 10.

An engaging wall 1002 is provided at an intermediate portion in the thicknesswise direction of each of the two side faces 10E such that it projects outwardly in the widthwise direction and extends in the lengthwise direction.

Each of the two side faces 10E has a letting off preventing recess 1004 provided at a location thereof rather near to the front face 10A.

A stopper wall 1006 is formed in a swollen fashion at a location of each of the side faces 10E rather near to the rear face 10B. The stopper walls 1006 are individually connected to the engaging walls 1002 and prevent the rear face 10B of the battery from being inserted into a battery accommodating chamber 151 of an image pickup apparatus 100 (hereinafter described). Thus, the stopper walls 1006 serve as opposite direction insertion preventing walls.

The connector section 30 is provided at a location of the front face 10A of the case 10 rather near to a right end portion in the widthwise direction.

Referring to FIGS. 3A to 3C and 4, the connector section 30 has a connector wall section 32 swollen in the lengthwise direction from the front face 10A, and a plurality of contact pieces 34 connected to the battery cell or cells.

The connector wall section 32 is provided so as to reinforce the connector section 30 and has a pair of vertical walls 3202 spaced from each other in the widthwise direction and extending in the thicknesswise direction, and a transverse wall 3204 extending in the widthwise direction at a location rather near to the upper face 10C and interconnecting end portions of the vertical walls 3202 in the thicknesswise direction.

The vertical walls 3202 and the transverse wall 3204 cooperatively define a space 3206 which is open in the lengthwise direction (forwardly) and is open to the other face (downwardly) from between the faces at the opposite ends in the thicknesswise direction.

Referring to FIGS. 4, 9A and 9B, a terminal forming member 36 made of an insulating material such as a synthetic resin material is disposed in the open space 3206.

The terminal forming member 36 has a plurality of grooves 3602 formed in a spaced relationship from each other in the widthwise direction in such a manner as to be open in the lengthwise direction (forwardly) and extend in the thicknesswise direction. The grooves 3602 are formed such that they are open to the lower face 10D.

The contact pieces 34 are provided in a spaced relationship from each other in the widthwise direction between the vertical walls 3202. In the present embodiment, the contact pieces 34 are disposed so as to form side faces of the grooves 3602 which are opposed to each other in the widthwise direction.

Referring to FIGS. 3A to 3C and 4, a wall portion 38 for discrimination of a battery characteristic is formed at a location of the front face 10A on the right side in the widthwise direction with respect to that one of the vertical walls 3202 which is positioned rather near to a right end portion in the widthwise direction such that it is swollen in the lengthwise direction (forwardly) and connects to the vertical wall 3202. The battery characteristic referred herein means the characteristic such as capacity, type, and capability of the battery.

In the present embodiment, the wall portion 38 for discrimination is formed such that it is swollen forwardly from a lower half at a location of the front face 10A positioned on the right side with respect to the right side vertical wall 3202. In other words, the wall portion 38 for discrimination has a thickness of a dimension substantially equal to ½ the thickness of the case 10, and a space S1 is assured above the wall portion 38 for discrimination forwardly of the front face 10A.

Further, the wall portion 38 for discrimination is provided continuously between that one of the vertical walls 3202 which is positioned rather near to a right end portion in the widthwise direction and an end portion of the front face 10A in the widthwise direction.

A front end of the wall portion 38 for discrimination extends on the same plane parallel to the front face 10A together with a location of the connector wall section 32 at an end portion in the lengthwise direction and a location of the terminal forming member 36 at an end portion in the lengthwise direction.

Further, in the present embodiment, a flat face 3802 at the front end of the wall portion 38 for discrimination has a recess 3804 formed thereon in such a manner as to be open forwardly and be concave rearwardly.

Now, an electronic apparatus to which the present invention is applied is described.

In the present embodiment, the electronic apparatus is formed as an image pickup apparatus such as a digital video camera.

Figure 5:
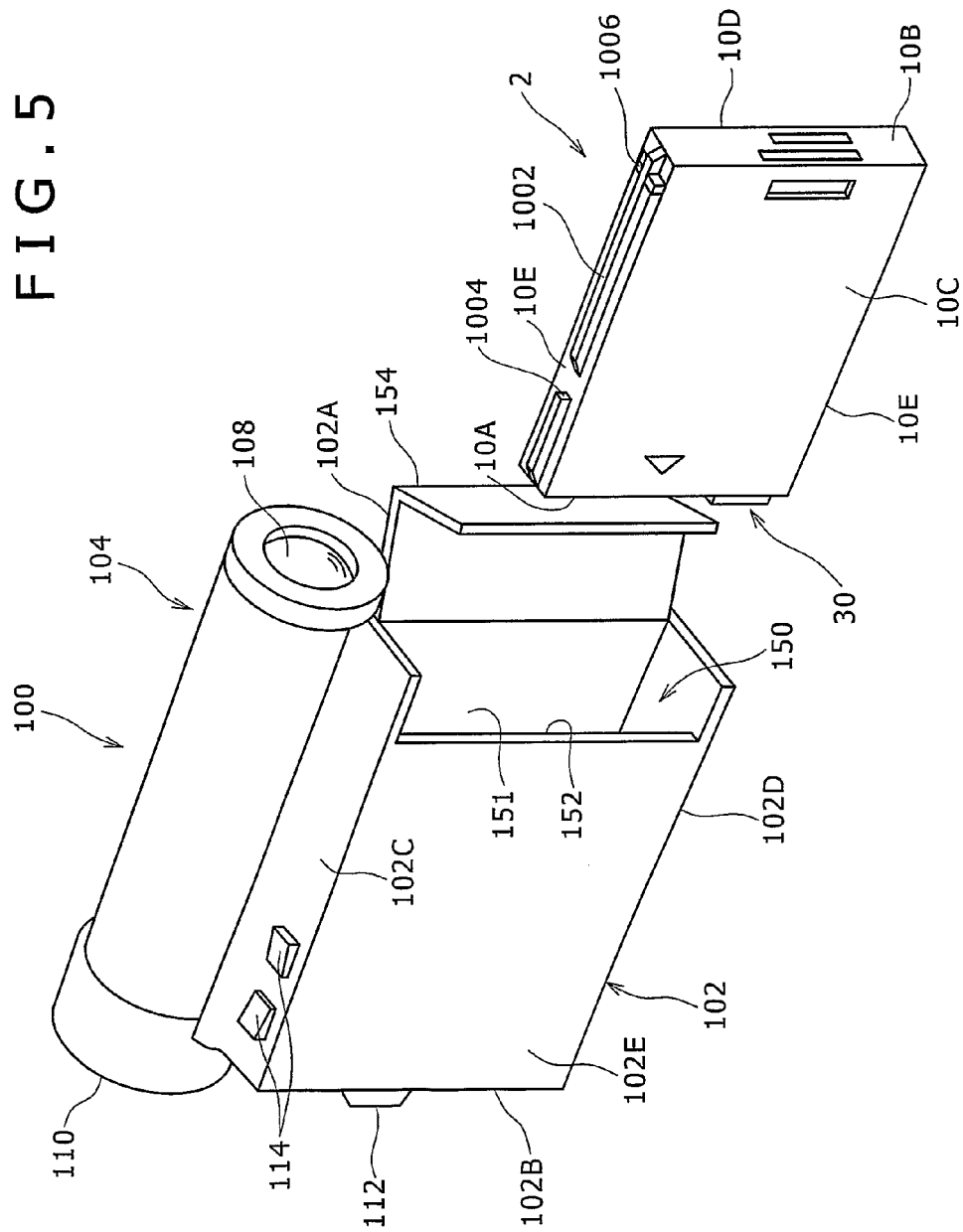
FIG. 5 is a perspective view of an image pickup apparatus to which the present invention is applied.

Referring to FIG. 5, the image pickup apparatus is generally denoted by 100 and has a body case 102 which forms a sheath. The body case 102 has a height in the vertical direction, a length in the forward and backward direction smaller than the height, and a width in the leftward and rightward direction smaller than the length. It is to be noted that the left and the right of the body case 102 in the present specification are represented as viewed from the front side (subject side).

A lens barrel 104 is incorporated at an upper portion of the body case 102, and an image pickup element 106 (FIG. 6) is incorporated at a rear portion of the lens barrel 104. Further, an optical system 108 for introducing an image of a subject to the image pickup element 106 is incorporated in the lens barrel 104.

The optical system 108 is formed from a plurality of optical members including a zoom lens, a focusing lens and an objective lens.

The body case 102 has a front wall 102A facing forwardly, a rear wall 102B facing rearwardly, an upper wall 102C facing upwardly, a lower wall 102D facing downwardly, a left side wall 102E facing leftwardly and a right side wall 102F facing rightwardly.

A viewfinder 110 for visually observing an image being picked up is provided at an upper portion of the rear wall 102B of the body case 102.

A start/stop switch 112 for starting/stopping image pickup of moving pictures is provided at a location of the rear wall 102B below the viewfinder 110.

Operation switches 115 (FIG. 6) including operation switches relating to image pickup such as zoom switches 114 for performing zooming operation of the optical system 108 are provided at locations rather near to a rear portion of the upper wall 102C of the body case 102.

A display panel 164 (FIG. 6) for displaying an image such as a still picture or a moving picture, characters, symbols and so forth is provided on the right wall of the body case 102. Also a medium accommodation section for accommodating a storage medium 166 (FIG. 6) such as a magnetic tape cassette, an optical disk or a memory card for recording image information and sound information is provided on the right wall of the body case 102.

A battery receiving section 150 for removably accommodating the first battery 2 is provided on the body case 102.

The battery receiving section 150 includes a battery accommodating chamber 151 and an electronic apparatus side connector section 50 (FIG. 7).

The battery accommodating chamber 151 has an opening 152 through which the first battery 2 is inserted in the lengthwise direction into the battery accommodating chamber 151. An opening/closing door 154 is provided for rocking motion at the opening 152. The front wall 102A is formed from a portion of the opening/closing door 154 which faces forwardly when the opening 152 is closed.

Referring to FIGS. 9A and 9B, the electronic apparatus side connector section 50 is disposed in the interior portion of the battery accommodating chamber 151 for contacting with the connector section 30 of the first battery 2.

The battery accommodating chamber 151 has a first accommodating chamber 151A for accommodating the case 10 of the first battery 2 therein and a second accommodating chamber 151B provided at the interior portion of the first accommodating chamber 151A for accommodating the connector section 30 of the first battery 2.

Referring to FIGS. 12A and 12B, the first accommodating chamber 151A has opposite side faces 5202 which individually face the side faces 10E of the first battery 2 when the first battery 2 is inserted, a first bottom wall 5204 which faces the front face 10A of the first battery 2, an upper wall 5206 which faces the upper face 10C of the first battery, and a lower wall 5208 which faces the lower face 10D of the first battery 2.

Referring to FIGS. 9A and 9B, the second accommodating chamber 151B has a second bottom wall 5210 which faces a forward location of the connector section 30 of the first battery 2 when the first battery 2 is inserted.

Referring to FIGS. 12A and 12B, each of the opposite side walls 5202 has a guide groove 54 formed thereon. The guide groove 54 is open to the battery accommodating chamber 151 side and extends along the extension direction of the battery accommodating chamber 151 such that the corresponding engaging wall 1002 of the first battery 1 is inserted therein.

It is to be noted that a resilient deformable letting off preventing projection (not shown) is provided in each of the guide grooves 54 such that it removably engages, in a state wherein the first battery 2 is inserted in the battery accommodating chamber 151 and the connector section 30 and the electronic apparatus side connector section 50 are coupled to each other, with the letting off preventing recess 1004 to stabilize the loaded condition of the first battery 2.

Referring to FIGS. 9A and 9B, the electronic apparatus side connector section 50 includes a plurality of contact pieces 60 provided in a horizontally projecting manner from different locations of the second bottom wall 5210 spaced from each other in the upward and downward direction. The contact pieces 60 can individually contact with the contact pieces 34 of the connector section 30 of the first battery 2.

In the present embodiment, the contact pieces 60 are provided in a projecting manner on the second bottom wall 5210 and a connecting wall 5212 which interconnects the second bottom wall 5210 and the first bottom wall 5204.

Referring to FIGS. 7 and 8A to 8C, a recess 62 is provided at a location of the second bottom wall 5210 in the proximity of the electronic apparatus side connector section 50 such that the wall portion 38 for discrimination of the second battery 2 is provided so that the connector section 30 of the first battery 2 may be mated with the electronic apparatus side connector section 50.

An electronic apparatus side connector section 50A of an image pickup apparatus 100A shown in FIGS. 10 to 12A and 12B is of the type into which the first battery 2 described hereinabove must not be loaded. In this instance, the electronic apparatus side connector section 50A is similar to the electronic apparatus side connector section 50 in that a plurality of contact pieces are provided horizontally in a projecting manner at different locations spaced from each other in the upward and downward direction of the second bottom wall 5210. However, a projection 64 is provided at a location of the second bottom wall 5210 in the proximity of the electronic apparatus side connector section 50A as seen in FIGS. 10 to 12A and 12B such that it can contact with the wall portion 38 for discrimination of the first battery 2 so that coupling of the connector section 30 of the first battery 2 to the electronic apparatus side connector section 50 may be blocked.

The electronic apparatus side connector section 50 or 50A is connected to a power supply circuit 172 (FIG. 6) of the image pickup apparatus 100 or 100A.

Figure 6:
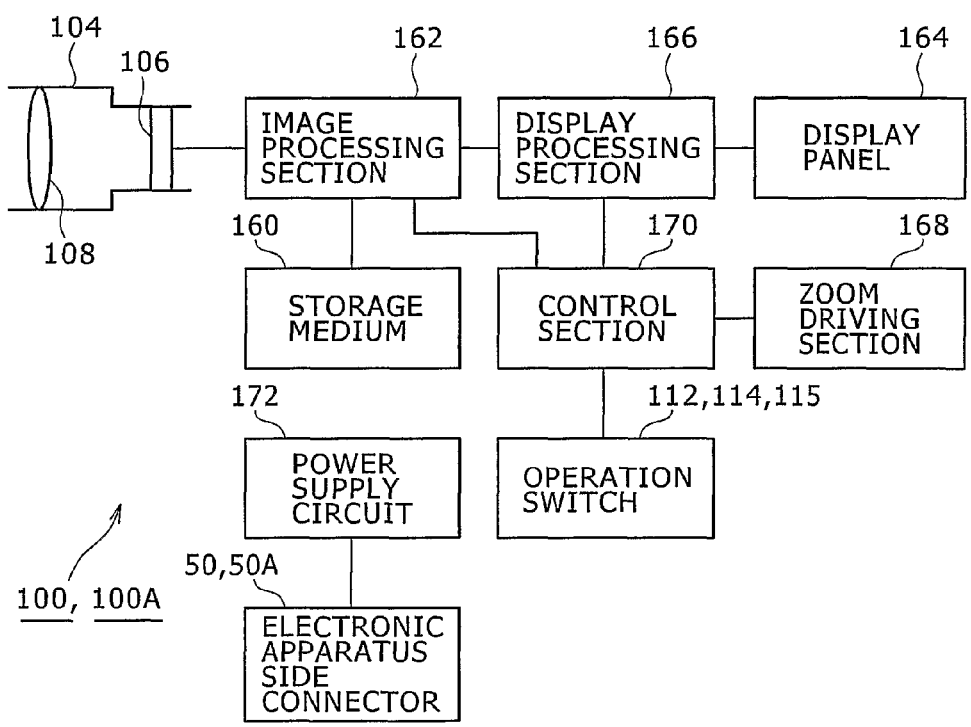
FIG. 6 is a block diagram showing a control system of the image pickup apparatus.

Referring to FIG. 6, the image pickup apparatus 100 or 100A includes an image processing section 162 for performing a predetermined data process for an image pickup signal outputted from the image pickup element 106 to produce image data and recoding the image data on a storage medium 160. The image pickup apparatus 100 or 100A further includes a display processing section 166 for displaying the image data on the display panel 164, a zoom driving section 168 for varying the image pickup magnification of the optical system 108, and a control section 170 for controlling the image processing section 162, display processing section 166, zoom driving section 168 and so forth in response to operations of the operation switches 112, 114 and 115. The image pickup apparatus 100 or 100A further includes the power supply circuit 172 for supplying dc power supplied from the first battery 2 through the electronic apparatus side connector section 50 or 50A to the image processing section 162, display processing section 166 and zoom driving section 168.

Now, action of the image pickup apparatus 100 is described.

When the first battery 2 is to be loaded into the image pickup apparatus 100, the opening/closing door 154 would be opened as shown in FIG. 5, and while the front face 10A, opposite side faces 10E, upper face 10C and lower face 10D of the case 10 of the first battery 2 are opposed to the first bottom wall 5204, opposite side walls 5202, upper wall 5206 and lower wall 5208 of the battery accommodating chamber 151 of the image pickup apparatus 100, respectively, the engaging walls 1002 of the first battery 2 would be inserted and pushed into the guide grooves 54 of the battery accommodating chamber 151.

Consequently, the wall portion 38 for discrimination of the first battery 2 is accommodated into the recess 62, and the contact pieces 34 of the connector section 30 and the contact pieces 60 of the electronic apparatus side connector section 50 are contacted with each other thereby to couple the connector section 30 to the electronic apparatus side connector section 50 and the front location of the connector section 30 is positioned in the proximity of the second bottom wall 5210 as seen in FIGS. 9A and 9B.

Then, the letting off preventing projections described hereinabove are engaged with the letting off preventing recesses 1004 of the engaging walls 1002 thereby to keep the loaded state of the first battery 2 stably.

Thereafter, the opening/closing door 154 would be closed.

Consequently, dc power is supplied from the first battery 2 to the components of the image pickup apparatus 100 through the power supply circuit 172.

When the first battery 2 is to be removed, the opening/closing door 154 would be opened and the first battery 2 would be removed from the battery accommodating chamber 151 with a rear portion thereof grasped by the user.

Now, loading of the first battery 2 into the image pickup apparatus 100A as seen in FIG. 5 is described.

The opening/closing door 154 would be opened, and while the front face 10A, opposite side faces 10E, upper face 10C and lower face 10D of the first battery 2 are opposed to the first bottom wall 5204, opposite side walls 5202, upper wall 5206 and lower wall 5208 of the battery accommodating chamber 151 of the image pickup apparatus 100A, respectively, the engaging walls 1002 of the first battery 2 would be inserted and pushed into the guide grooves 54 of the battery accommodating chamber 151.

Figure 11:
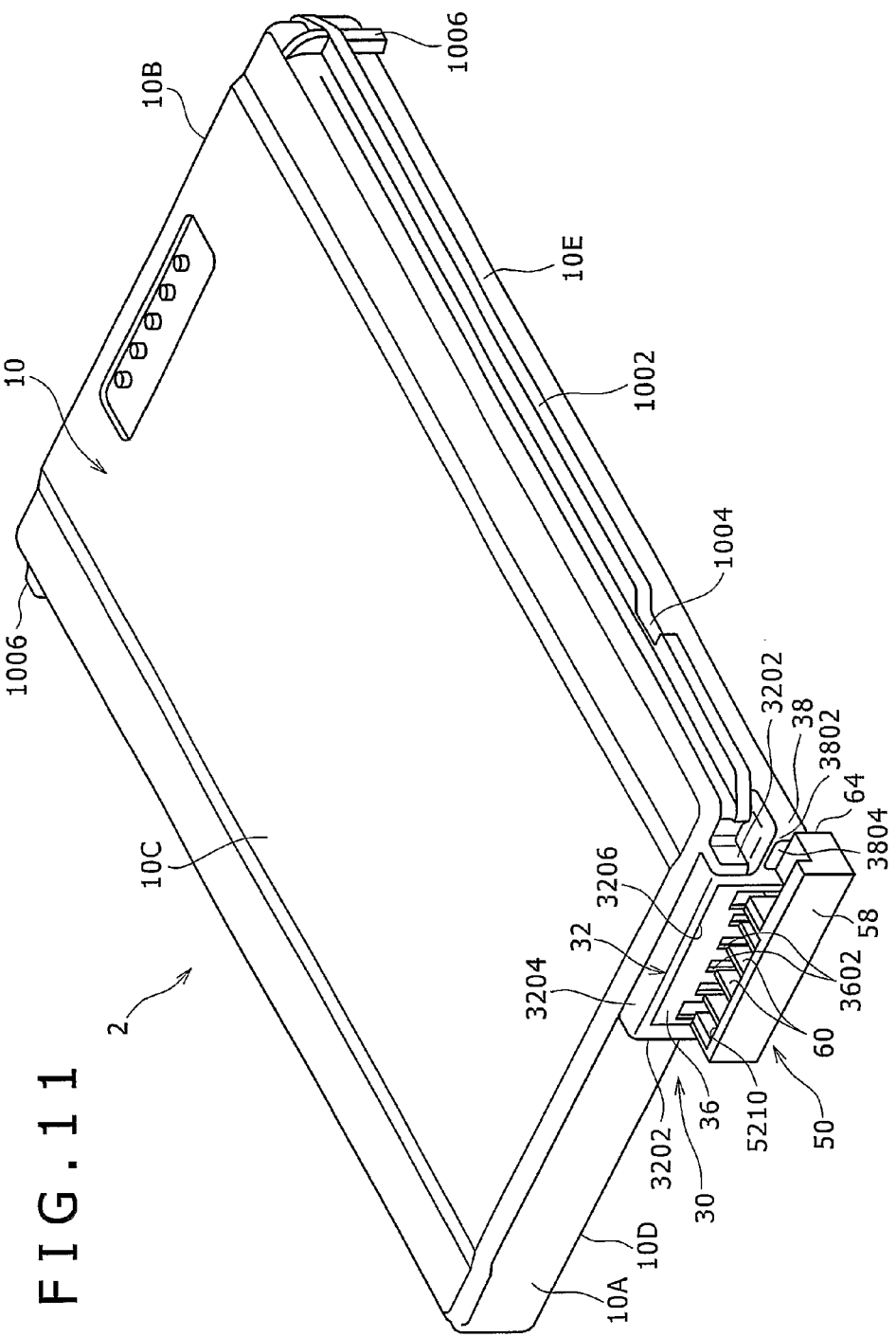
FIG. 11 is a schematic perspective view illustrating a relationship between the first battery and an electronic apparatus side connector section of a different image pickup apparatus.
Figure 15:
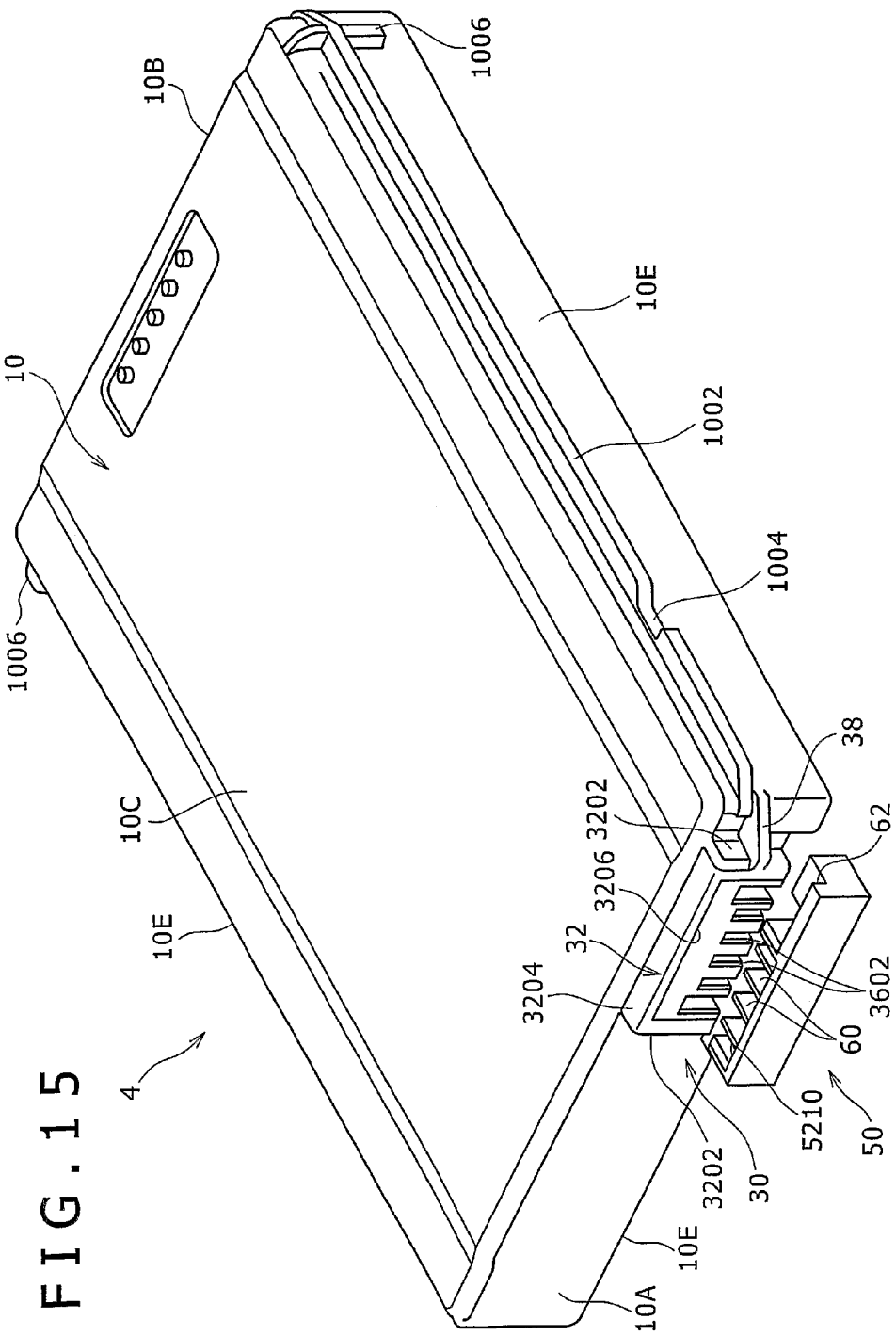
FIG. 15 is a schematic perspective view illustrating a relationship between the second battery and the electronic apparatus side connector section of the image pickup apparatus.
Figure 16:
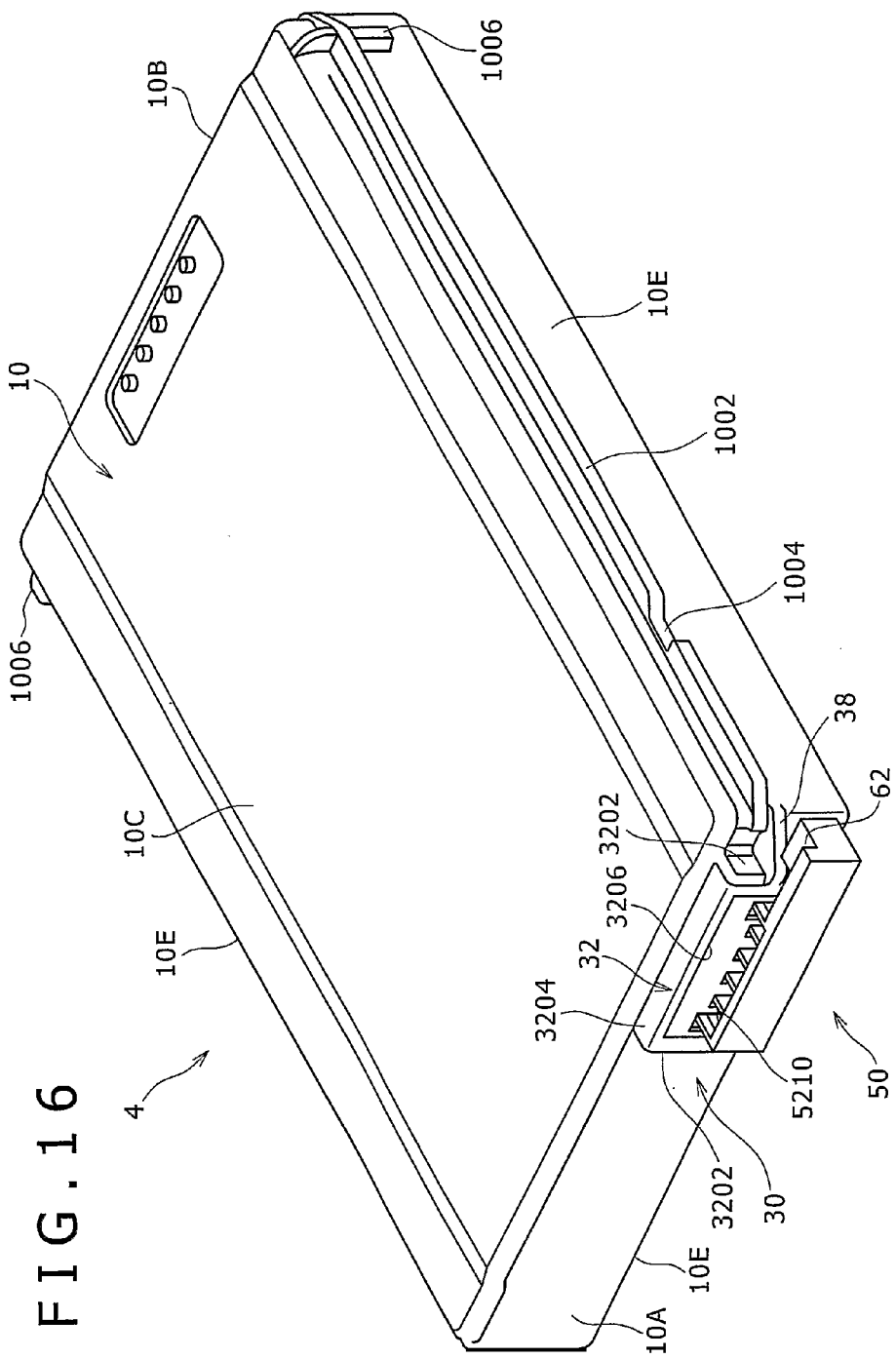
FIG. 16 is a schematic perspective view illustrating a relationship between the second battery and the electronic apparatus side connector section of the image pickup apparatus.

However, since the wall portion 38 for discrimination of the first battery 2 is contacted with the projection 64, coupling between the connector section 30 and the electronic apparatus side connector section 50 is blocked as seen in FIGS. 11, 12A and 12B. Consequently, power of the first battery 2 is not supplied to the power supply circuit 172 of the image pickup apparatus 10A.

Such discrimination of the first battery 2 as described above is performed based on whether or not such characteristics as the capacity, type, function and the like of the first battery 2 comply with the image pickup apparatus 100 into which it is tried to load the first battery 2. Such discrimination as just described is used naturally, for example, to distinguish the first battery 2 in which a rechargeable battery cell is accommodated and a dry cell pack wherein a dry cell is removably accommodated in a case similar to the case 10 of the first battery 2 so that one of the first battery 2 and the dry cell pack is selectively used.

It is to be noted that, while, in the first embodiment described above, the single first battery 2 is applied to two different image pickup apparatus 100 and 100A having electronic apparatus side connector sections of different shapes from each other, the present invention can naturally be applied also to an alternative case wherein two different batteries having connector sections having different shapes from each other are applied to a single image pickup apparatus as hereinafter described. In other words, the present invention is applied to both of a case wherein a battery is selectively loaded into different electronic apparatus and another case wherein different batteries are selectively loaded into an electronic apparatus.

According to the present embodiment, the wall portion 38 for discrimination is formed between that one of the vertical walls 3202 of the connector section 30 which is positioned rather near to a right end portion in the widthwise direction and a location of the front face 10A positioned at the right side end portion in the widthwise direction such that it is swollen in the lengthwise direction (forwardly) and connects to the vertical wall 3202. Therefore, the wall portion 38 for discrimination does not have an influence on the battery cell accommodating space in the inside of the case 10 of the first battery 2. This is advantageous in achieving discrimination of a battery of a reduced thickness with a simple configuration.

Further, according to the present embodiment, discrimination of a battery of a reduced thickness can be preformed with certainty with such a simple configuration that the recess 62 for accommodating the wall portion 38 for discrimination of the first battery 2 or the projection 64 for contacting with the wall portion 38 for discrimination is provided in the proximity of the electronic apparatus side connector section 50.

Further, since the connector section 30 is formed at a location of the front face 10A of the case 10 rather near to an end portion in the widthwise direction and the wall portion 38 for discrimination is connected to the front face 10A of the case 10 and the vertical wall 3202 of the connector section 30, the wall portion 38 for discrimination can be disposed in a small space between the connector section 30 and an end portion in the widthwise direction of the front face 10A of the case 10. Consequently, the wall portion 38 for discrimination is less likely to disturb handling of the battery, which is advantageous in enhancing the convenience in use.

Further, since the connector section 30 is formed at a location of the front face 10A of the case 10 rather near to an end portion in the widthwise direction and the wall portion 38 for discrimination is connected to the front face 10A of the case 10 and the vertical wall 3202 of the connector section 30, the strength of the connector wall section 32 is enhanced and also the strength of the corner portion of the case 10 which is liable to interfere with an external object can be enhanced. This is advantageous in assuring the durability of the battery.

It is to be noted that, while, in the present embodiment, the recess 62 for accommodating the wall portion 38 for discrimination of a battery characteristic or the projection 64 for contacting with the wall portion 38 for discrimination is provided in the proximity of the electronic apparatus side connector section 50 to discriminate a battery, similar action and advantages to those described above can be exhibited also by such an alternative configuration that a projection for being accommodated in the recess 3804 of the wall portion 38 for discrimination is provided at a near location of the electronic apparatus side connector section 50 so that a battery is discriminated based on whether or not the projection is present.

Second Embodiment

Now, a second embodiment of the present invention is described with reference to FIGS. 13A to 19.

The second embodiment is a modification to and is common in configuration to the first embodiment except the shape of the wall portion 38 for discrimination of a battery and the dimension of the battery in the thicknesswise direction.

Referring first to FIGS. 13A to 13C, the battery case 10 of the first battery 2 and the battery case 10 of the second battery 4 are formed equal in width and length to each other, but the battery case 10 of the second battery 4 has a greater thickness than the battery case 10 of the first battery 2.

The connector section 30 provided on the second battery 4 and the connector section 30 provided on the first battery 2 are formed in the same shape and structure, and the positions of them in the upward and downward direction on the front face 10A are the same location with reference to the engaging walls 1002 while the positions of them in the leftward and rightward direction are the same location with respect to one of the side faces 10E.

Referring to FIG. 14, the wall portion 38A for discrimination is formed between the vertical wall 3202 which is positioned rather near to a right end portion in the widthwise direction from between the pair of the vertical walls 3202 which form the connector wall section 32 of the connector section 30 and a location of the front face 10A positioned at the right side end portion in the widthwise direction such that it is swollen in the lengthwise direction (forwardly) and connects to the vertical wall 3202, similarly as in the first embodiment, however, in the present second embodiment, the wall portion 38A for discrimination is formed so as to be swollen forwardly from an intermediate portion in the upward and downward direction of the location of the front face 10A positioned on the right side of the vertical wall 3202 and interconnects an intermediate portion in the upward and downward direction of the right side vertical wall 3202 and an angular portion at the boundary between the front face 10A and the side face 10E of the right side.

The wall portion 38A for discrimination is formed with a thickness of a dimension smaller than the thickness of the case 10, and spaces S2 and S3 are formed above and below the wall portion 38A for discrimination forwardly of the front face 10A, respectively.

The wall portion 38A for discrimination is provided continuously between the right side vertical wall 3202 and an end portion of the front face 10A in the widthwise direction. Further, the wall portion 38 for discrimination extends horizontally with a uniform thickness in the upward and downward direction is connected at a front edge thereof to the front face of the vertical wall 3202.

Figures 18A, 18B:
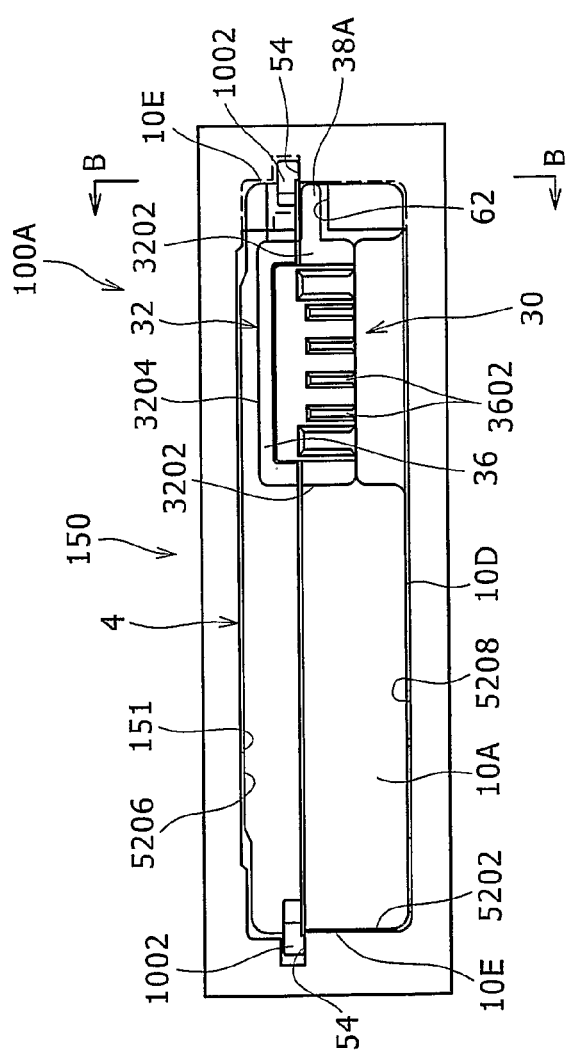
FIG. 18A is a sectional view of a battery receiving section of the image pickup apparatus.
FIG. 18B is a sectional view taken along a line B-B of FIG. 18A.

An electronic apparatus side connector section 50 of an image pickup apparatus 100 shown in FIGS. 18A and 18B is of the type into which the second battery 4 is to be loaded. Referring to FIGS. 15, 16 and 18A to 18B, a recess 62 which can accommodate the wall portion 38 for discrimination of the second battery 4 is provided at a location of the second bottom wall 5210 in the proximity of the electronic apparatus side connector section 50 so that coupling of the connector section 30 of the second battery 4 to the electronic apparatus side connector section 50 may be permitted.

Figure 19:
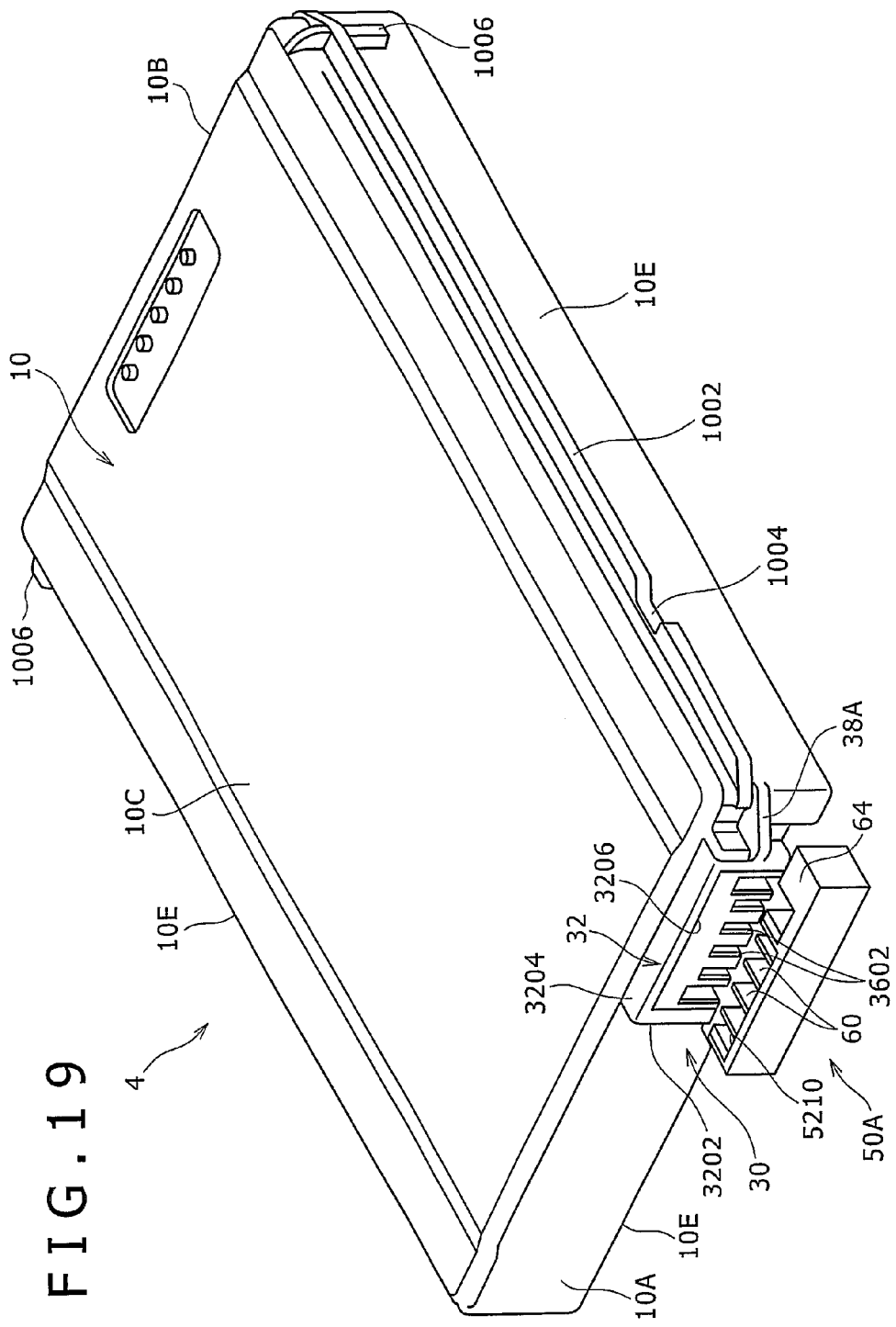
FIG. 19 is a schematic perspective view illustrating a relationship between the second battery and the electronic apparatus side connector section of the different image pickup apparatus.

An electronic apparatus side connector section 50A of another image pickup apparatus 100 shown in FIG. 19 is of the type into which the second battery 4 described above must not be loaded. Referring to FIG. 19, a projection 64 which can contact with the wall portion 38A for discrimination of the second battery 4 is provided at a location of the second bottom wall 5210 in the proximity of the electronic apparatus side connector section 50A so that coupling of the connector section 30 of the second battery 4 to the electronic apparatus side connector section 50 may be blocked.

Now, action of the image pickup apparatus 100 is described.

When the second battery 4 is to be loaded into the image pickup apparatus 100, while the front face 10A, opposite side faces 10E, upper face 10C and lower face 10D of the case 10 of the second battery 4 are opposed to the first bottom wall 5204, opposite side walls 5202, upper wall 5206 and lower wall 5208 of the battery accommodating chamber 151 of the image pickup apparatus 100, respectively, the engaging walls 1002 of the second battery 4 would be inserted and pushed into the guide grooves 54 of the battery accommodating chamber 151, similarly as in the case of the first embodiment.

Consequently, the wall portion 38A for discrimination of the second battery 4 is accommodated into the recess 62, and the connector section 30 is coupled to the electronic apparatus side connector section 50 and the front location of the connector section 30 is positioned in the proximity of the second bottom wall 5210 as seen in FIGS. 17A and 17B.

Then, the letting off preventing projections described hereinabove are engaged with the letting off preventing recesses 1004 of the engaging walls 1002 thereby to keep the loaded state of the second battery 4 stably.

Consequently, dc power is supplied from the second battery 4 to the components of the image pickup apparatus 100 through the power supply circuit 172.

On the other hand, when the second battery 4 is to be loaded into the image pickup apparatus 100A, while the front face 10A, opposite side faces 10E, upper face 10C and lower face 10D of the second battery 4 are opposed to the first bottom wall 5204, opposite side walls 5202, upper wall 5206 and lower wall 5208 of the battery accommodating chamber 151 of the image pickup apparatus 100A, respectively, the engaging walls 1002 of the second battery 4 would be inserted and pushed into the guide grooves 54 of the battery accommodating chamber 151, similarly as in the case of the first embodiment.

However, since the wall portion 38 for discrimination of the second battery 4 is contacted with the projection 64, coupling between the connector section 30 and the electronic apparatus side connector section 50 is blocked as seen in FIG. 19. Consequently, power of the second battery 4 is not supplied to the power supply circuit 172 of the image pickup apparatus 100A.

Such discrimination of the second battery 4 as described above is performed based on whether or not such characteristics as the capacity, type, function and the like of the second battery 4 comply with the image pickup apparatus 100 into which it is tried to load the second battery 4. Such discrimination as just described is used to distinguish the second battery 4 in which a rechargeable battery cell is accommodated and a dry cell pack wherein a dry cell is removably accommodated in a case similar to the case 10 of the second battery 4 so that one of the second battery 4 and the dry cell pack is selectively used.

Also the second embodiment having such a configuration as described above exhibits operation and advantages similar to those of the first embodiment.

Third Embodiment

Now, a third embodiment of the present invention is described with reference to FIGS. 20A to 20C and 21A to 21B.

The third embodiment is a modification to and is common in configuration to the first embodiment except the shape of the wall portion 38B for discrimination of a battery characteristic.

In the third embodiment, the wall portion 38B is formed integrally with one of the vertical walls 3202.

More particularly, referring to FIGS. 20A to 20C, that one of the vertical walls 3202 of the connector wall section 32 of the connector section 30 which is positioned rather near to the right end portion in the widthwise direction is formed so as to extend to the right end of the front face 10A, and the wall portion 38B is formed from the extension of the vertical wall 3202.

In other words, in the third embodiment, the right side vertical wall 3202 of the connector section 30 is formed from a left side portion of the wall portion 38B, and a right side portion of the wall portion 38B functions as the wall portion 38 or 38A in the first or second embodiment described hereinabove. The right side portion of the wall portion 38B has a lower portion 3810 formed so as to be swollen forwardly from a lower half of a location of the front face 10A and an upper portion 3812 formed so as to be swollen forwardly from an upper half of the location of the front face 10A. The right side portion of the wall portion 38B has a thickness of a dimension substantially equal to the thickness of the case 10.

The electronic apparatus side connector 50 of the type into which the third battery 6 having such a configuration as described above is loaded has a recess, which can accommodate the wall portion 38B of the third battery 6, at a location of the second bottom wall 5210 in the proximity of the electronic apparatus side connector 50 such that coupling of the connector section 30 of the third battery 6 to the electronic apparatus side connector 50 may be permitted.

Meanwhile, the electronic apparatus side connector 50 of the type which blocks loading of the third battery 6 therein has a projection 64, which can be contacted with the wall portion 38B (in the present example, both of the lower portion 3810 and the upper portion 3812) of the third battery 6, provided at a location of the second bottom wall 5210 in the proximity of the electronic apparatus side connector section 50A such that coupling of the connector section 30 of the third battery 6 to the electronic apparatus side connector 50 may be blocked as seen in FIGS. 21A and 21B.

Also the third embodiment having such a configuration as described above exhibits operation and advantages similar to those of the first embodiment.

Fourth Embodiment

Now, a fourth embodiment of the present invention is described with reference to FIGS. 22A to 22B and 23A to 23B.

The fourth embodiment is a modification to and is common in configuration to the second embodiment except the shape of the wall portion 38C for discrimination of a battery characteristic.

In the fourth embodiment, the wall portion 38C for discrimination of a battery characteristic is formed integrally with one of the vertical walls 3202.

In particular, that one of the vertical walls 3202 of the connector wall section 32 of the connector section which is positioned rather near to the right side end portion in the widthwise direction and the wall portion 38C for discrimination are provided integrally with each other.

More particularly, referring to FIGS. 22A to 22B, that one of the vertical walls 3202 of the connector wall section 32 of the connector section 30 which is positioned rather near to the right end portion in the widthwise direction is formed so as to extend to the right end of the front face 10A, and the wall portion 38C for discrimination is formed from the extension of the vertical wall 3202.

In other words, in the fourth embodiment, the right side vertical wall 3202 of the connector section 30 is formed from a left side portion of the wall portion 38C for discrimination, and a right side portion of the wall portion 38C for discrimination functions as the wall portion 38 or 38A of the first or second embodiment described hereinabove. The right side portion of the wall portion 38C for discrimination has a lower portion 3814 formed so as to be swollen forwardly from an intermediate portion in the upward and downward direction of a location of the front face 10A and an upper portion 3816 formed so as to be swollen forwardly from an upper portion of the location of the front face 10A. A space S4 is formed below the lower portion 3814.

The electronic apparatus side connector 50 of the type into which the fourth battery 8 having such a configuration as described above is loaded has a recess, which can accommodate the wall portion 38C for discrimination of the fourth battery 8, provided at a location of the second bottom wall 5210 in the proximity of the electronic apparatus side connector 50 such that coupling of the connector section 30 of the fourth battery 8 to the electronic apparatus side connector section 50 may be permitted, similarly as in the case of the second embodiment.

Figure 23B:
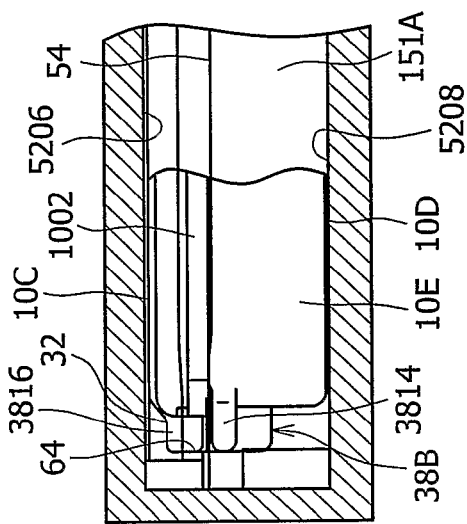
FIG. 23B is a sectional view taken along a line B-B of FIG. 23A.
Figure 23A:
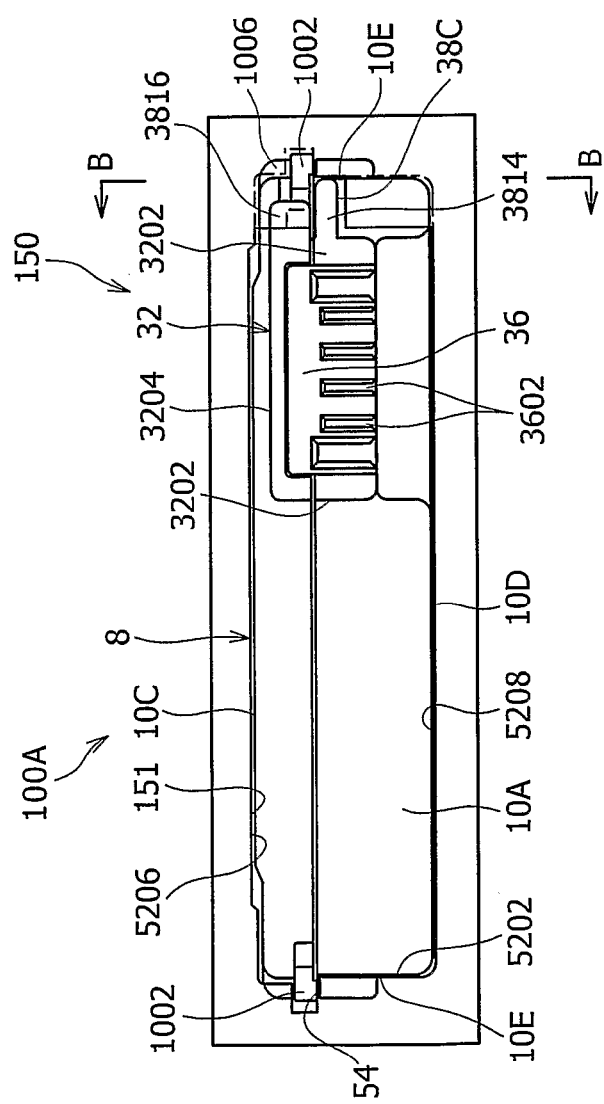
FIG. 23A is a sectional view of the battery receiving section of the different image pickup apparatus.
Figure 24:
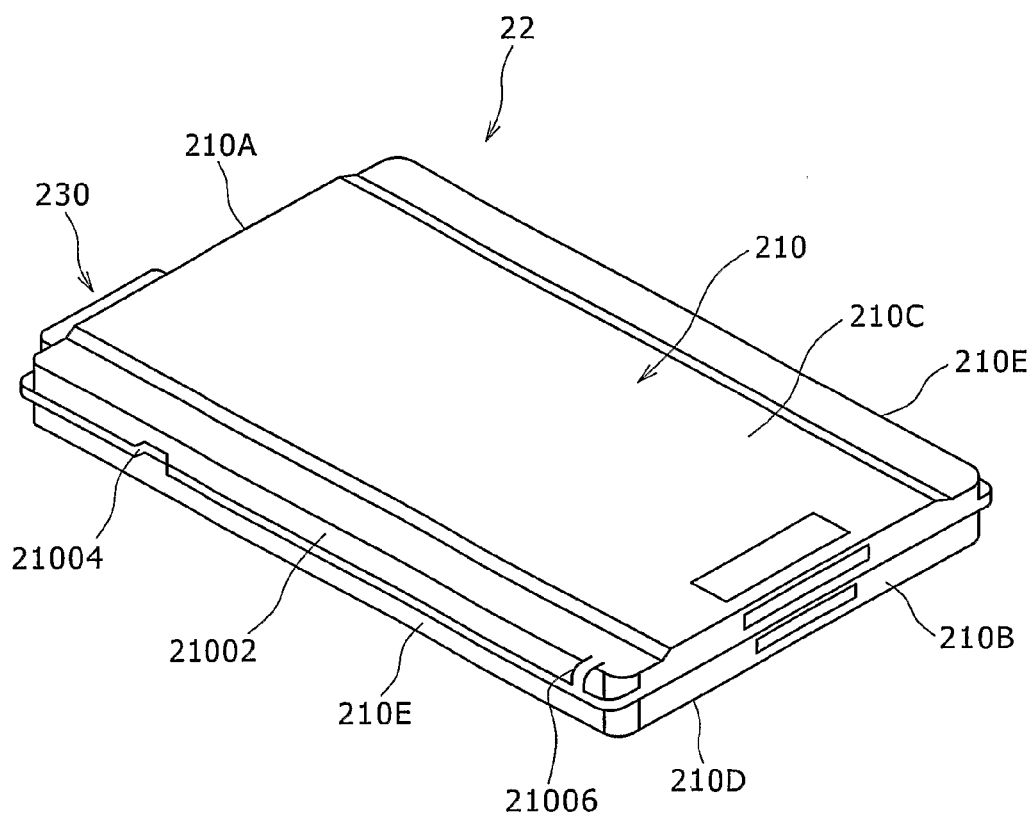
FIG. 24 is a perspective view of a first battery according to a fifth embodiment of the present invention.

On the other hand, the electronic apparatus side connector 50 of the type which blocks loading of the fourth battery 8 therein has a projection 64, which can be contacted with the wall portion 38C for discrimination (in the present example, the upper portion 3816) of the fourth battery 8, provided at a location of the second bottom wall 5210 in the proximity of the electronic apparatus side connector section 50A such that coupling of the connector section 30 of the fourth battery 8 to the electronic apparatus side connector 50 may be blocked as seen in FIGS. 23A and 23B, similarly as in the case of the second embodiment.

Also the fourth embodiment having such a configuration as described above exhibits operation and advantages similar to those of the third embodiment.

It is to be noted that, while, in the embodiments described above, a battery is inserted into and accommodated in the battery accommodating chamber 151 of the battery receiving section 150 of an electronic apparatus, the battery of the present invention can be loaded into battery receiving sections of various known structures. For example, the present invention is applied naturally to a battery receiving section which has an engaging section for applying the bottom face of a battery to a receiving face from the connector wall section 32 of the battery and the upper face 10C of the case 10 in a state wherein the connector section 30 of the battery is coupled to the electronic apparatus side connector of the battery receiving section.

Further, while, in the embodiments described above, the electronic apparatus is an image pickup apparatus, the electronic apparatus is not limited to an image pickup apparatus but the present invention can be applied naturally to any apparatus in which a battery is loaded such as illumination apparatus, audio apparatus, communication apparatus and battery charging apparatus.

Further, since, in the first embodiment described hereinabove, the stopper wall 1006 connected to the corresponding engaging wall 1002 is formed at a location of each of the side faces 10E of the first battery 2 rather near to the rear face 10B, the two left and right engaging walls 1002 are individually divided into two portions by the stopper walls 1006. Consequently, the engaging walls 1002 are formed as four divisional portions. Accordingly, at least one contacting wall for contacting with one of the divisional portions of the engaging walls 1002 to block coupling of the connector section 30 to the electronic apparatus side connector 50 may be provided at a location of the battery accommodating chamber 151 which corresponds to one of the divisional portions of the engaging walls 1002 such that discrimination of a battery characteristic may be performed depending upon whether or not the contacting face is present. Or a cutaway portion is provided on the contacting face while a wall portion which can be fitted into the cutaway portion is provided at a location of the battery accommodating chamber 151 such that discrimination of a battery characteristic may be performed depending upon whether or not the wall portion is present.

Fifth Embodiment

Now, a fifth embodiment of the present invention is described with reference to FIGS. 24 to 29.

Referring first to FIGS. 24 to 27, there is shown a first battery 22 according to the fifth embodiment of the present invention. The first battery 22 is a power supply of a comparatively small capacity and includes a case 210, a battery cell or a plurality of battery cells (not shown) accommodated in the case 210, and a connector section 230 provided on the case 210.

The case 210 is formed in a flattened rectangular plate-like shape having an upper face 210C and a lower face 210D positioned at the opposite ends in the direction a thickness, a pair of left and right side faces 210E positioned at the opposite ends in the direction of a width having a dimension greater than the thickness, and a front face 210A and a rear face 210B positioned at the opposite ends of a length having a dimension greater than the width. It is to be noted that the leftward and rightward direction of the case 210 is represented as viewed from forwardly of the case 210.

An engaging wall 21002 is provided on each of the two side faces 210E such that it projects outwardly in a widthwise direction and extends in the lengthwise direction. The engaging walls 21002 are provided at locations of the side faces 210E displaced to the upper face 210C or the lower face 210D from the center in the thicknesswise direction, and particularly in the present embodiment, the engaging walls 21002 are provided at locations displaced to the upper face 210C. It is to be noted that the engaging walls 21002 serve as walls.

Each of the engaging walls 21002 has a letting off preventing recess 21004 formed at an intermediate portion in the extension direction thereof, and particularly in the present embodiment, formed at a location of the engaging wall 21002 rather near to the front face 210A.

A stopper wall 21006 is formed in a swollen fashion at a location of each of the side faces 210E near to the rear face 210B. The stopper walls 21006 are individually connected to the engaging walls 21002 and prevent the rear face 210B side of the case 210 from being inserted into a battery accommodating chamber 2151 of an image pickup apparatus 2100 (hereinafter described). Thus, the stopper walls 21006 serve as opposite direction insertion preventing walls.

The connector section 230 is provided on the front face 210A of the case 210 such that it projects forwardly. In the present embodiment, the connector section 230 is provided at a location of the front face 210A rather near to a right end in the widthwise direction and extends in the widthwise direction.

The position of the connector section 230 in the widthwise direction on the front face 210A is determined with reference to faces of the engaging walls 21002 of the left and right side faces 210E which oppose to the upper face 210C or the lower face 210D. In the present embodiment, faces 21002A of the engaging walls 21002 which oppose to the lower face 210D make a reference to the position of the connector section 230 in the thicknesswise direction.

Referring to FIGS. 26A to 26C, the connector section 230 has a connector wall section 232 swollen in the lengthwise direction from the front face 210A, and a contact section 233 (FIGS. 35A and 35B) connected to the battery cell or cells.

The connector wall section 232 is provided to reinforce the connector section 230 and has a pair of vertical walls 23202 spaced from each other in the widthwise direction and extending in the thicknesswise direction, and a transverse wall 23204 extending in the widthwise direction at a location rather near to the upper face 210C and interconnecting end portions of the vertical walls 23202 in the thicknesswise direction.

The vertical walls 23202 and the transverse wall 23204 cooperatively define a space 23206 which is open in the widthwise direction (forwardly) and is open to the other face (downwardly) from between the faces at the opposite ends in the thicknesswise direction.

Figure 27:
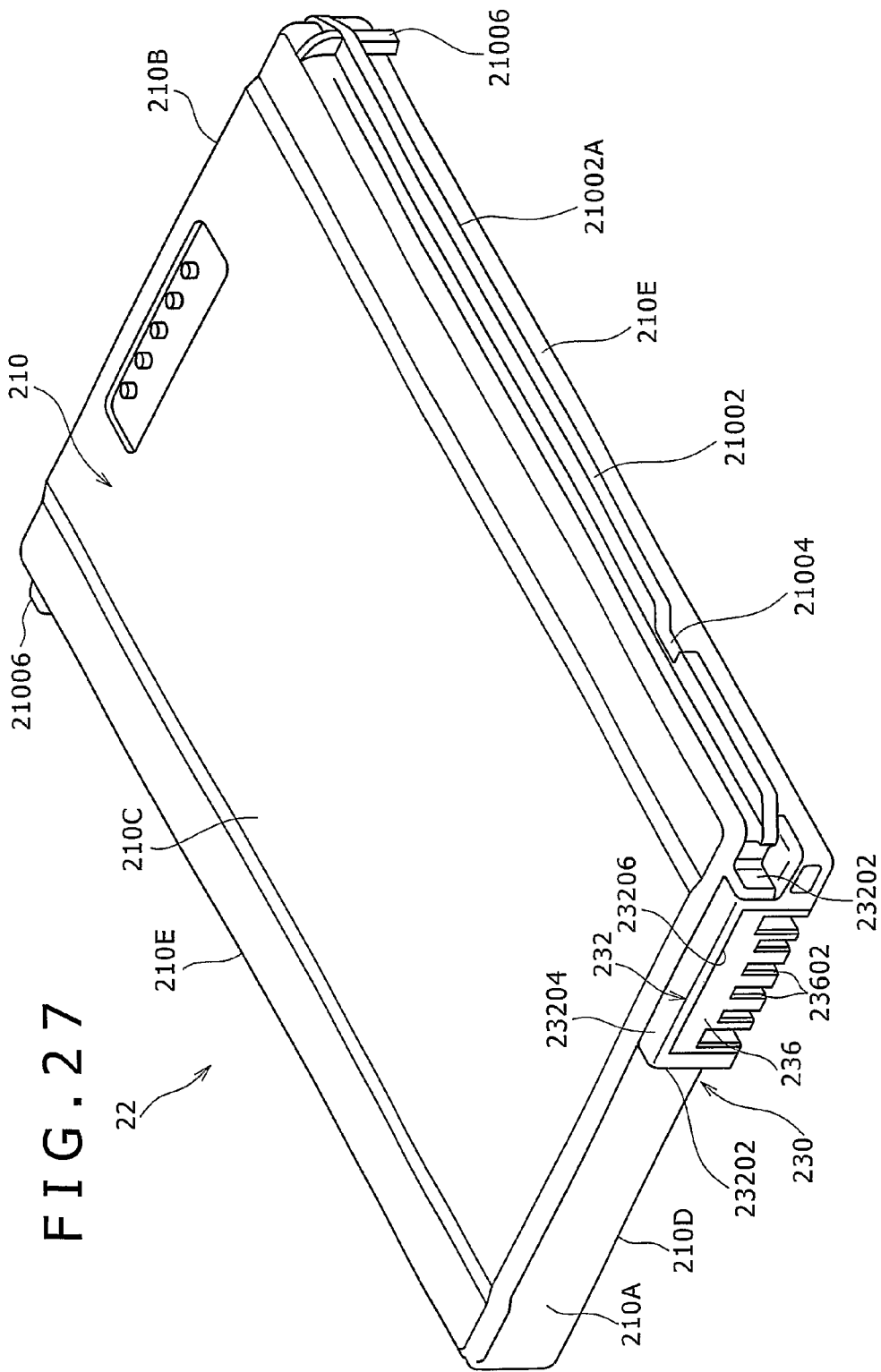
FIG. 27 is a perspective view of the first battery as viewed in a direction different from that of FIG. 24.
Figure 29:
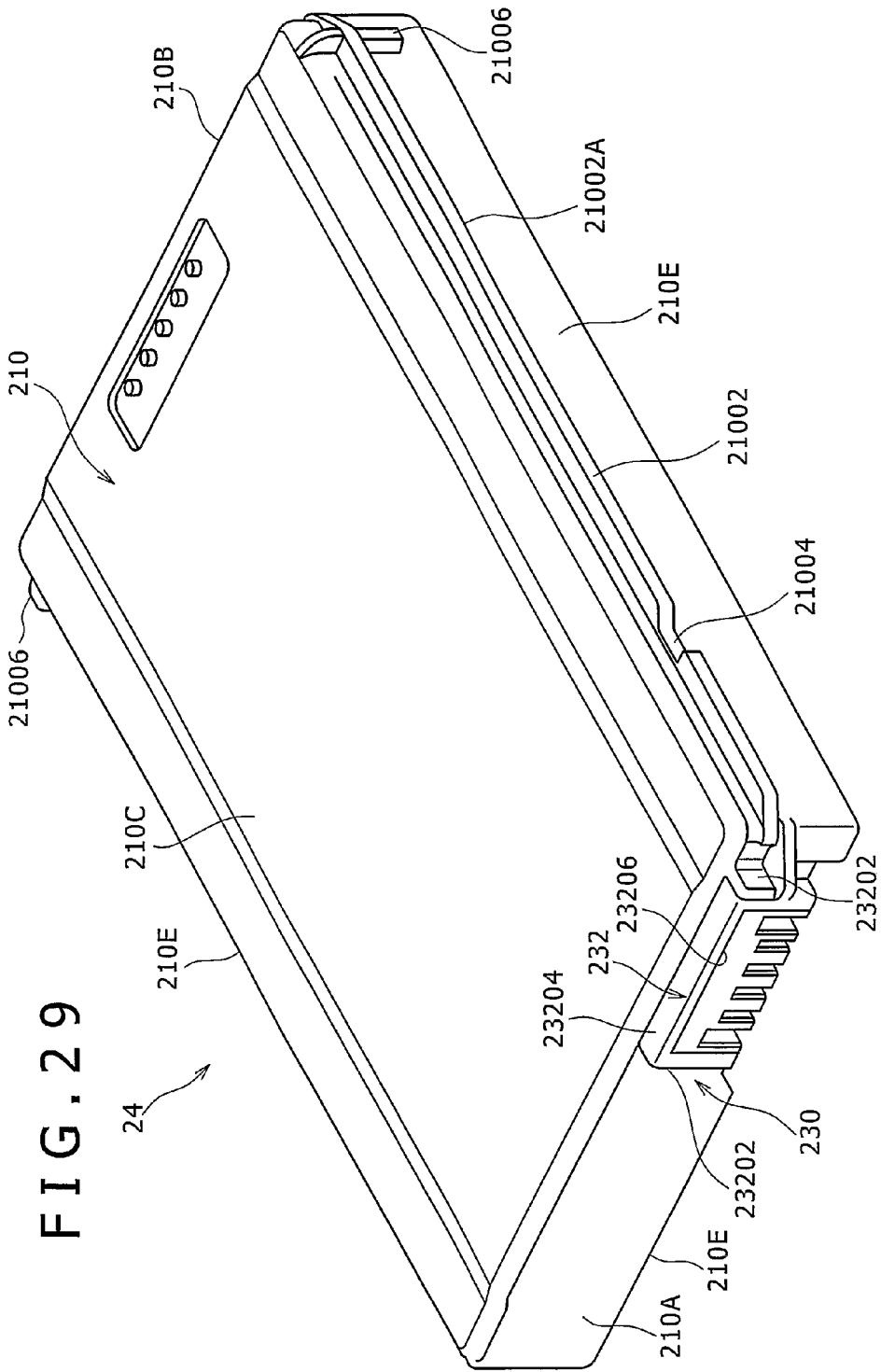
FIG. 29 is a perspective view of the second battery.

Referring to FIGS. 27, 35A and 35B, a terminal forming member 236 made of an insulating material such as a synthetic resin material is disposed in the open space 23206.

The terminal forming member 236 has a plurality of grooves 23602 formed in a spaced relationship from each other in the widthwise direction in such a manner as to be open in the lengthwise direction (forwardly) and extend in the thicknesswise direction. The grooves 23602 are formed such that they are open to the lower face 210D.

The contact section 233 is formed from a plurality of pairs of contact pieces 234 juxtaposed in a spaced relationship in the widthwise direction such that the contact pieces 234 in each pair are opposed to each other in the widthwise direction and are open forwardly and downwardly. In the present embodiment, the contact pieces 234 are provided in a spaced relationship from each other in the widthwise direction between the vertical walls 23202. Further, in the present embodiment, the contact pieces 234 form side faces of the grooves 23602 which are opposed to each other.

In the present embodiment, a lower face 23022 of the connector section 230 and the lower face 210D of the case 210 are positioned on the same plane.

Now, a second battery 24 according to the fifth embodiment of the present invention is described.

Referring to FIGS. 28A to 28C and 29, the second battery 24 is used as a power supply of a large capacity and is configured in a similar manner to the first battery 22 except the dimension in the thicknesswise direction and the position of the connector section 230 in the thicknesswise direction with reference to the upper face 210C or the lower face 210D.

As seen from FIGS. 28A to 28C and 29, the case 210 of the first battery 22 and the case 210 of the second battery 24 are formed equal in width and length to each other, but the case 210 of the second battery 24 has a greater thickness than the case 210 of the first battery 22.

The connector section 230 provided on the second battery 24 and the connector section 230 provided on the first battery 22 are formed in the same shape and structure.

Similarly as in the first battery 22, an engaging wall 21002 is provided on each of the two side faces 210E such that it projects outwardly in a widthwise direction and extends in the lengthwise direction. The engaging walls 21002 are provided at locations of the side faces 210E displaced to the upper face 210C or the lower face 210D from the center in the thicknesswise direction, and particularly in the present embodiment, the engaging walls 21002 are provided at locations displaced to the upper face 210C. The engaging walls 21002 serve as walls.

The position of the connector section 230 of the second battery 24 in the thicknesswise direction is determined with the dimensions same as those in the first battery 22 with reference to faces of the engaging walls 21002 of the left and right side faces 210E which oppose to the upper face 210C or the lower face 210D. In the present embodiment, faces 21002A of the engaging walls 21002 which oppose to the lower face 210D make a reference to the position of the connector section 230 in the thicknesswise direction.

Accordingly, the connector sections 230 of the first and second batteries 22 and 24 have an equal height from the engaging walls 21002. However, while, in the first battery 22, the lower face 23022 of the connector section 230 is positioned on the same plane as the lower face 210D of the case 210, the lower face 23022 of the connector section 230 of the second battery 24 is positioned at a location higher than the lower face 210D of the case 210 as seen in FIGS. 35A, 35B, 37A and 37B.

Now, an electronic apparatus into which the first and second batteries 22 and 24 are loaded is described.

In the present embodiment, the electronic apparatus is formed as an image pickup apparatus such as a digital video camera.

Figure 30:
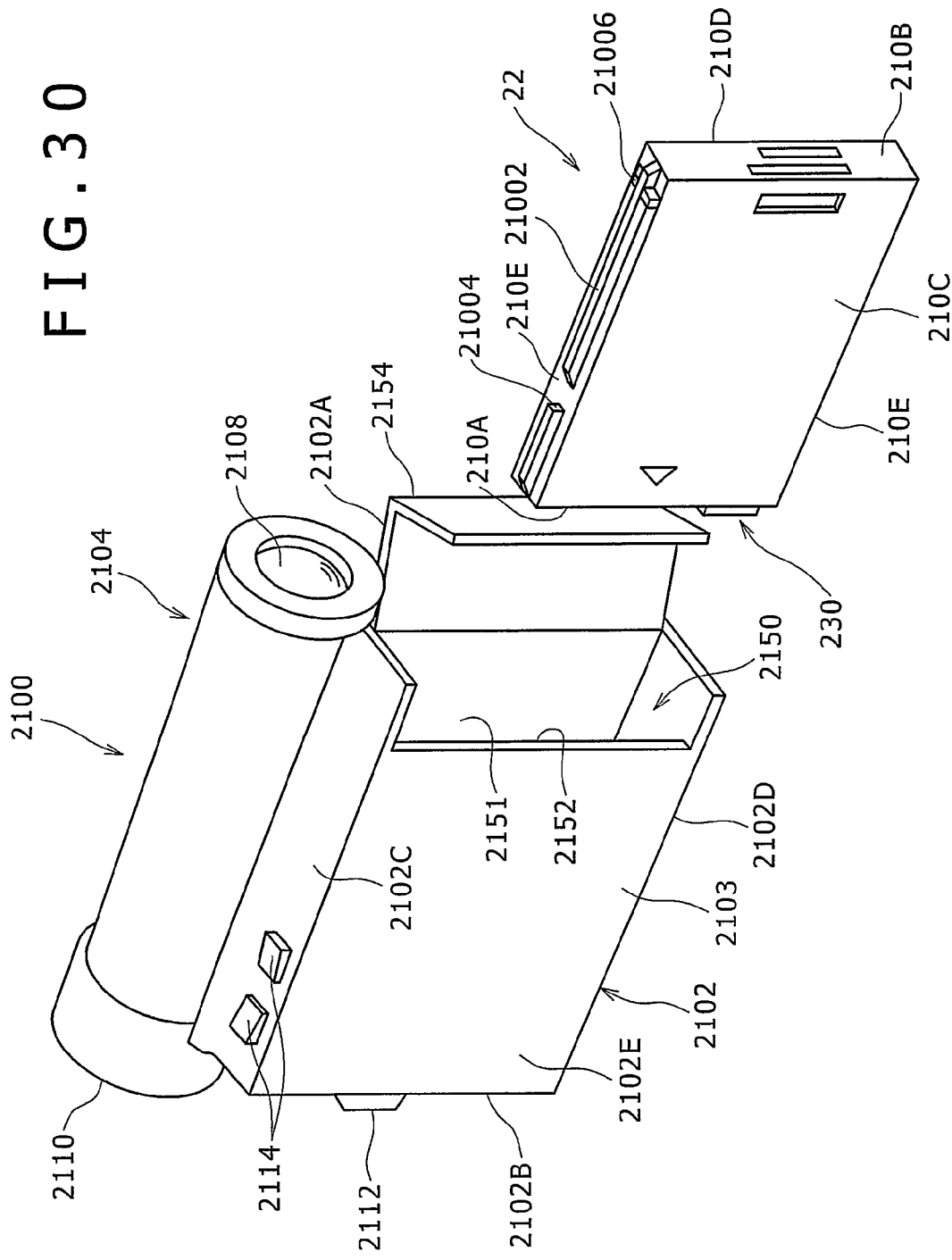
FIG. 30 is a perspective view of an image pickup apparatus to which the present invention is applied.

Referring to FIG. 30, the image pickup apparatus is generally denoted by 2100 and has a body case 2102 which forms a sheath. The body case 2102 has a height in the vertical direction, a length in the forward and backward direction smaller than the height, and a width in the leftward and rightward direction smaller than the length. It is to be noted that the left and the right of the body case 2102 in the present specification are represented as viewed from the front side (subject side).

A lens barrel 2104 is incorporated at an upper portion of the body case 2102, and an image pickup element 2106 (FIG. 31) is incorporated at a rear portion of the lens barrel 2104. Further, an optical system 2108 for introducing an image of a subject to the image pickup element 2106 is incorporated in the lens barrel 2104.

The optical system 2108 is formed from a plurality of optical members including a zoom lens, a focusing lens and an objective lens.

The body case 2102 has a front wall 2102A facing forwardly, a rear wall 2102B facing rearwardly, an upper wall 2102C facing upwardly, a lower wall 2102D facing downwardly, a left side wall 2102E facing leftwardly and a right side wall 2102F facing rightwardly.

A viewfinder 2110 for visually observing an image being picked up is provided at an upper portion of the rear wall 2102B of the body case 2102.

A start/stop switch 2112 for starting/stopping image pickup of moving pictures is provided at a location of the rear wall 2102B below the viewfinder 2110.

Operation switches 2115 (FIG. 31) including operation switches relating to image pickup such as zoom switches 2114 for performing zooming operation of the optical system 2108 are provided at locations rather near to a rear portion of the upper wall 2102C of the body case 2102.

A display panel 2164 (FIG. 31) for displaying an image such as a still picture or a moving picture, characters, symbols and so forth is provided on the right wall of the body case 2102. Also a medium accommodation section for accommodating a storage medium 2160 (FIG. 31) such as a magnetic tape cassette, an optical disk or a memory card for recording image information and sound information is provided on the right wall of the body case 2102.

A battery receiving section 2150 for removably accommodating the first battery 22 is provided on the body case 2102.

Figure 32C:
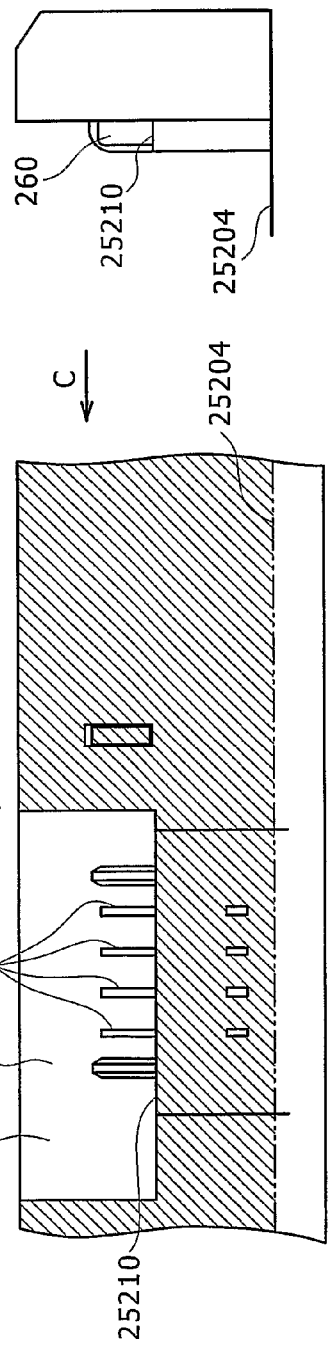
FIG. 32C is a view as viewed in the direction indicated by an arrow mark C of FIG. 32A.
Figure 32B:
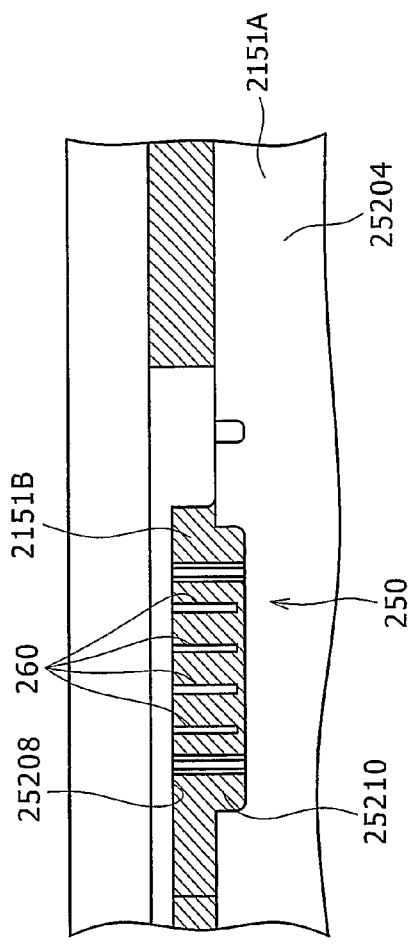
FIG. 32B is a view as viewed in the direction indicated by an arrow mark B of FIG. 32A.
Figure 32A:
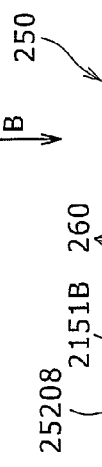
FIG. 32A is a front elevational view of an electronic apparatus side connector section of the image pickup apparatus.

The battery receiving section 2150 includes a battery accommodating chamber 2151 and an electronic apparatus side connector section 250 (FIGS. 32A to 32C).

The battery accommodating chamber 2151 has an opening 2152 through which the first battery 22 is inserted in the lengthwise direction (forward and backward direction) into the battery accommodating chamber 2151. An opening/closing door 2154 is provided for rocking motion at the opening 2152. The front wall 2102A is formed from a portion of the opening/closing door 2154 which faces forwardly when the opening 2152 is closed.

Referring to FIGS. 35A, 35B, 37A and 37B, the electronic apparatus side connector section 250 is disposed in the interior portion of the battery accommodating chamber 2151 such that it can be mated with the connector section 230 of the first and second batteries 22 and 24.

The battery accommodating chamber 2151 has a case accommodating chamber 2151A for accommodating the case 210 of the first and second batteries 22 and 24 therein and a connector section accommodating chamber 2151B provided at the interior portion of the case accommodating chamber 2151A for accommodating the connector section 230 of the first battery 22.

Figure 34:
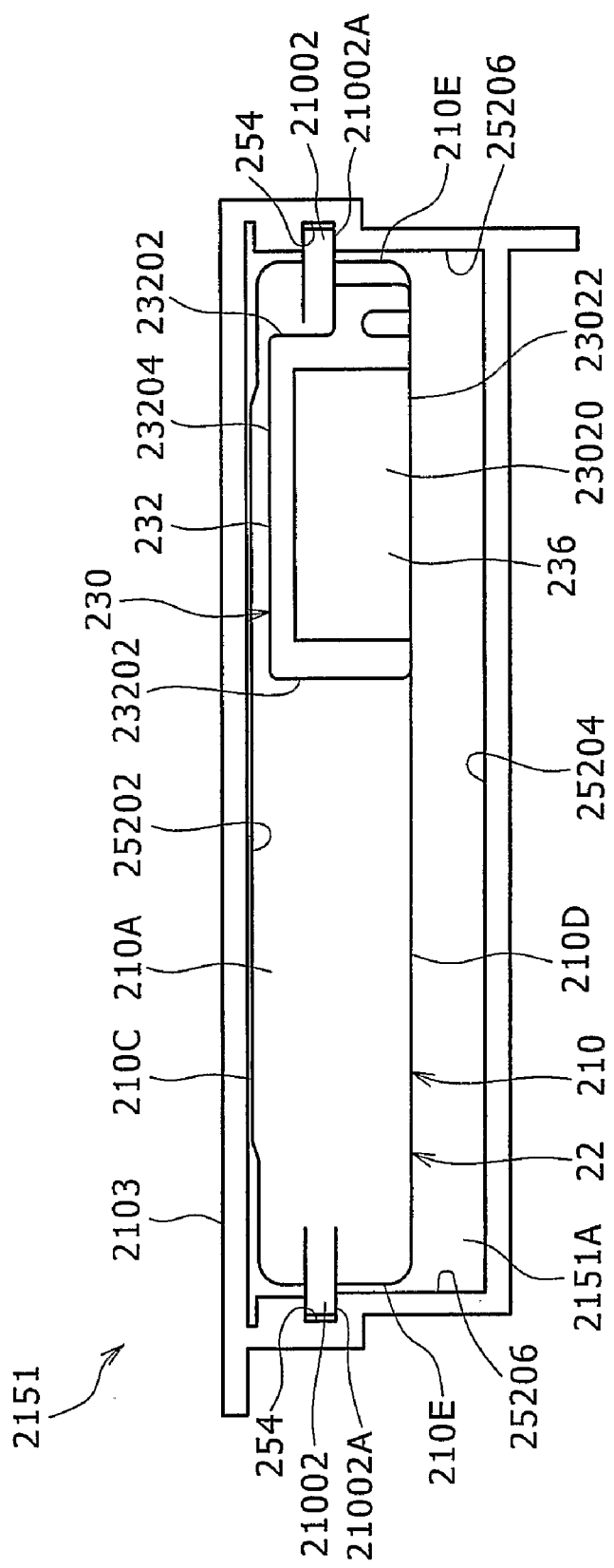
FIG. 34 is a schematic view showing the first battery incorporated in the battery receiving section.
Figure 36:
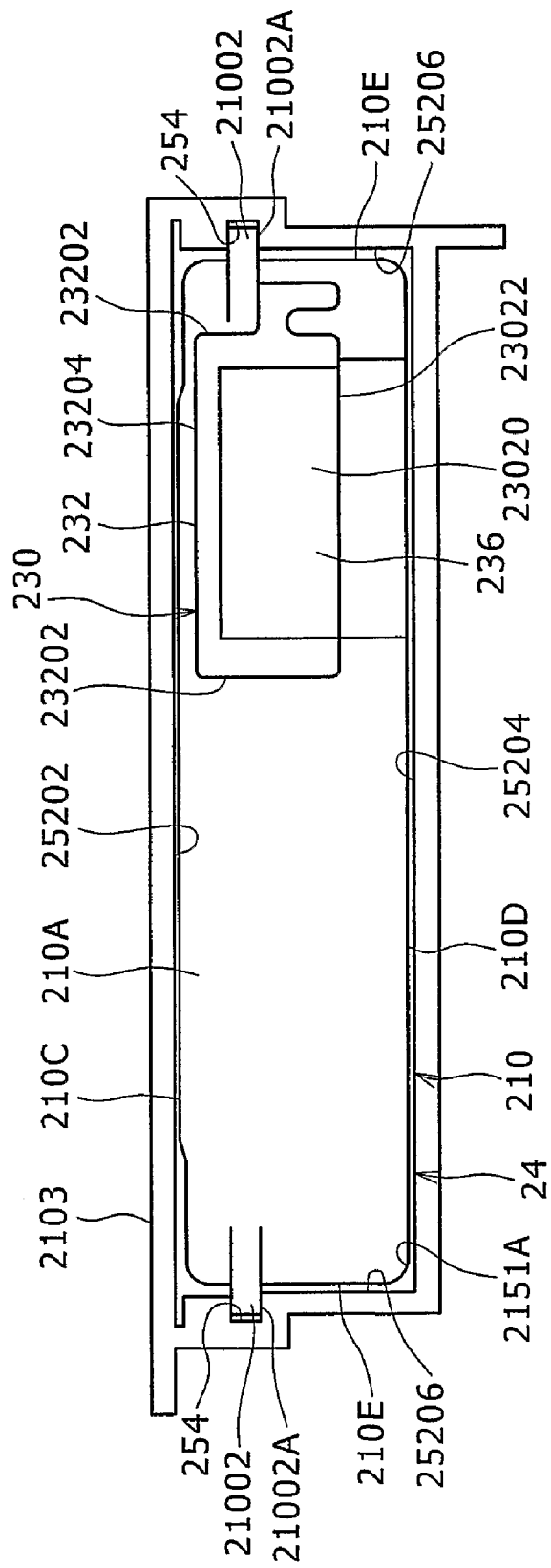
FIG. 36 is a schematic view showing the second battery loaded in the battery receiving section.

Referring to FIGS. 34 and 36, the case accommodating chamber 2151A has an upper face 25202, a lower face 25204 and left and right side faces 25206 for facing the upper face 210C, lower face 210D and left and right side faces 210E of the case 210 of the first and second batteries 22 and 24, respectively.

In the present embodiment, the upper face 25202 of the case accommodating chamber 2151A is formed from an inner face (wall face) of a wall portion 2103 which forms the body case 2102 of the image pickup apparatus 2100.

Referring to FIGS. 35A, 35B, 37A and 37B, the connector section accommodating chamber 2151B has an interior face 25208 connected to the case accommodating chamber 2151A and facing a forwardly facing front face 23020 of the connector section 230 of the first and second batteries 22 and 24, and a lower face 25210 facing the downwardly facing lower face 23022 of the connector section 230.

The lower face 25210 of the connector section accommodating chamber 2151B is provided at a location of the case accommodating chamber 2151A displaced to the upper face 25202 with respect to the lower face 25204 of the battery accommodating chamber 2151.

Figure 33:
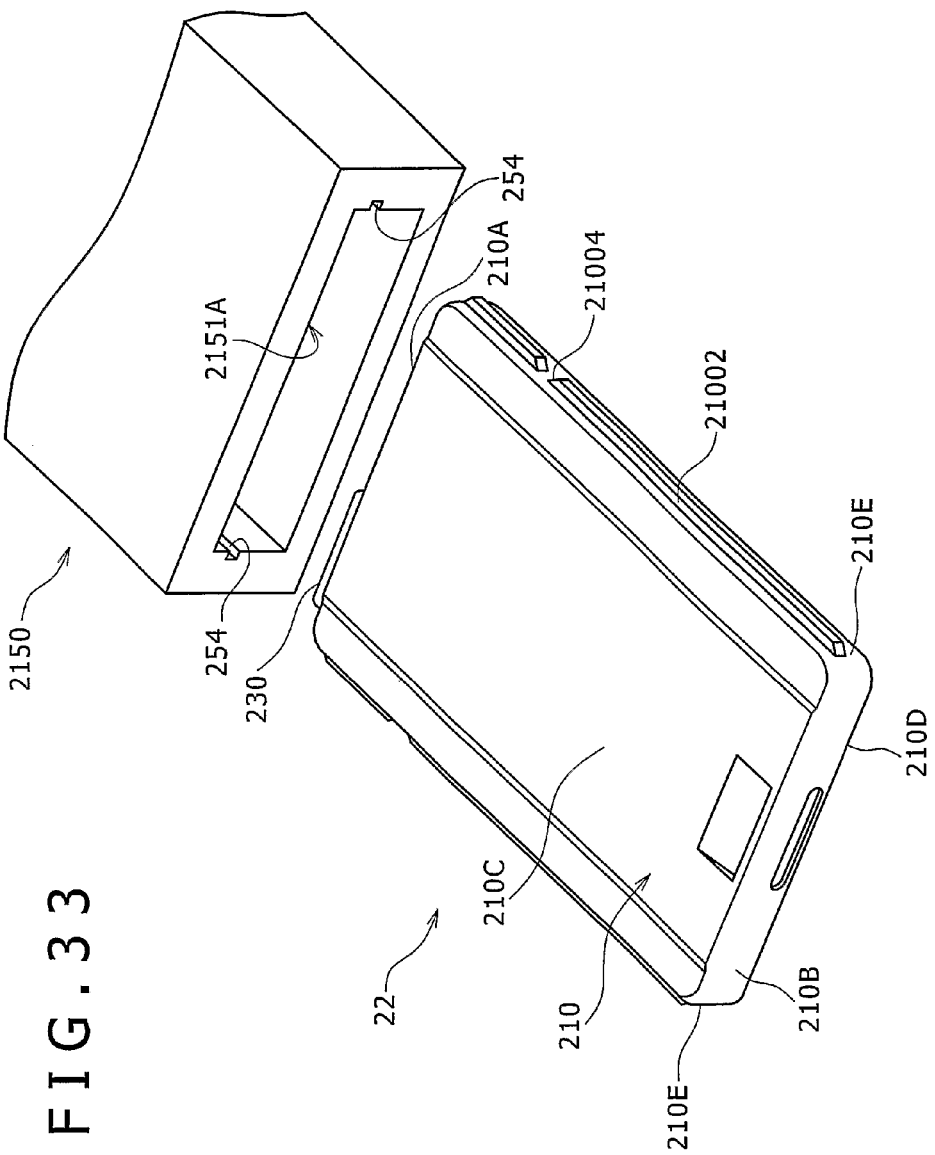
FIG. 33 is a perspective view showing the first battery and a battery receiving section of the image pickup apparatus.

Referring to FIGS. 33, 34 and 36, an engaging groove 254 is formed on each of the left and right side faces 25206 of the case accommodating chamber 2151A in such a manner as to extend along the direction in which the first and second batteries 22 and 24 are inserted and be engageable with the engaging wall 21002 of each of the left and right side faces 210E of the first and second batteries 22 and 24. The engaging groove 254 serves as a groove provided for positioning the battery 22 or 24 in the upward and downward direction in the case accommodating chamber 2151A.

The engaging groove 254 is provided at a location of each of the side faces 25206 displaced to the upper face 25202 or the lower face 25204 with respect to the central position in the upward and downward direction of the side face 25206. In the present embodiment, the engaging groove 254 is provided at a location of each side face 25206 displaced to the upper face 25202, and that one of a pair of faces of the engaging groove 254 opposing to each other which is directed upwardly is formed as a reference face of the engaging groove 254 in the upward and downward direction.

The upper face 210C of the case 210 and the upper face 25202 (wall face) of the case accommodating chamber 2151A opposing to the upper face 210C are positioned in the proximity of each other in a state wherein the case 210 is accommodated in the case accommodating chamber 2151A with the engaging walls 21002 of the first or second battery 22 or 24 engaged with the engaging grooves 254 of the case accommodating chamber 2151A and with the connector section 230 coupled to the electronic apparatus side connector section 250.

It is to be noted that each of the engaging grooves 254 includes a resiliently deformable letting off preventing projection (not shown). The letting off preventing projection releasably engages with the cutaway portion 21004 in a state wherein the first or second battery 22 or 24 is inserted in the battery accommodating chamber 2151 and the connector section 230 and the electronic apparatus side connector section 250 to stabilize the loaded state of the first or second battery 22 or 24.

Referring to FIGS. 32A to 32C, 35A, 35B, 37A and 37B, the electronic apparatus side connector section 250 includes a plurality of contact pieces 260 supported in the interior face 25208 and the lower face 25210 of the connector section accommodating chamber 2151B and juxtaposed in a spaced relationship from each other in a direction in which the left and right side faces 25206 of the battery accommodating chamber 2151 are connected to each other. The contact pieces 260 can individually contact with the contact pieces 234 of the connector section 230 of the first and second batteries 22 and 24.

The electronic apparatus side connector section 250 is connected to a power supply circuit 2172 (FIG. 31) of the image pickup apparatus 2100.

Figure 31:
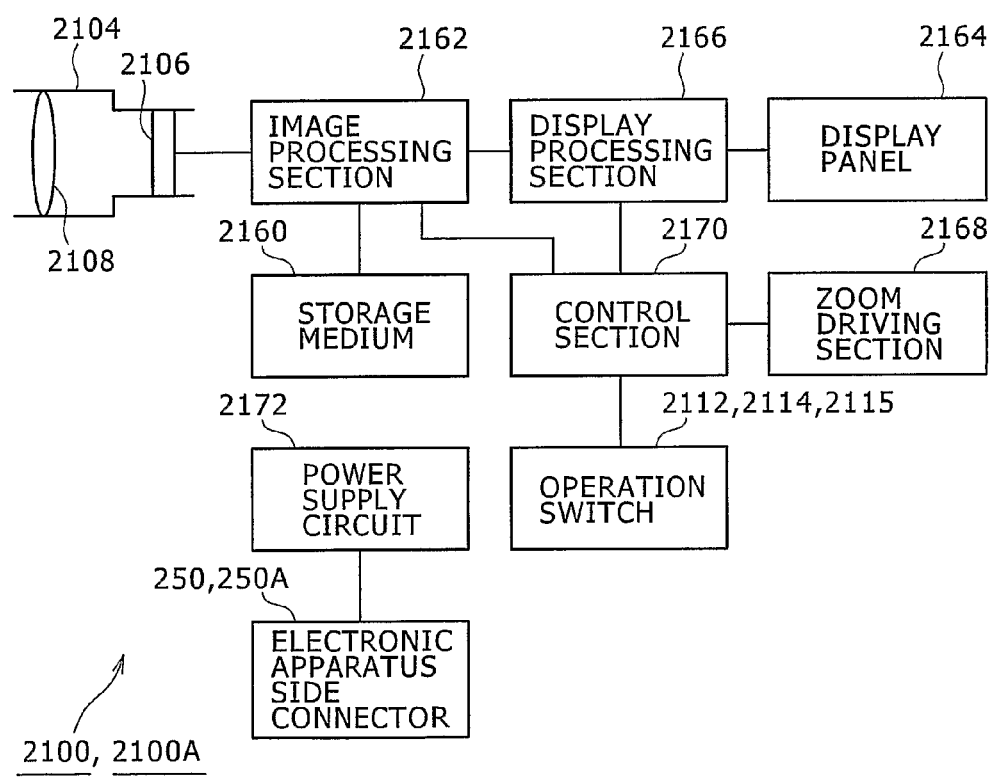
FIG. 31 is a block diagram showing a control system of the image pickup apparatus.

Referring to FIG. 31, the image pickup apparatus 2100 and 2100A includes an image processing section 2162 for performing a predetermined data process for an image pickup signal outputted from the image pickup element 2106 to produce image data and recoding the image data on a storage medium 2160. The image pickup apparatus 2100 further includes a display processing section 2166 for displaying the image data on the display panel 2164, a zoom driving section 2168 for varying the image pickup magnification of the optical system 2108, and a control section 2170 for controlling the image processing section 2162, display processing section 2166, zoom driving section 2168 and so forth in response to operations of the operation switches 2112, 2114 and 2115. The image pickup apparatus 2100 further includes the power supply circuit 2172 for supplying dc power supplied from the first battery 22 through the electronic apparatus side connector section 250 or 250A to the image processing section 2162, display processing section 2166 and zoom driving section 2168.

Now, action and advantages are described.

When the first battery 22 is to be loaded into the image pickup apparatus 2100, the opening/closing door 2154 would be opened as shown in FIG. 33, and while the upper face 210C, lower face 210D and left and right side faces 210E of the case 210 of the first battery 22 are opposed to the upper face 25202, lower face 25204 and left and right side faces 25206 of the case accommodating chamber 2151A of the image pickup apparatus 2100, respectively, the engaging walls 21002 of the first battery 22 would be inserted and pushed into the engaging grooves 254 of the battery accommodating chamber 2151.

Consequently, the contact pieces 234 of the connector section 230 and the contact pieces 260 of the electronic apparatus side connector section 250 are contacted with each other thereby to couple the connector section 230 to the electronic apparatus side connector section 250 and the front face 23020 of the connector section 230 is positioned in the proximity of the interior face 25208 of the connector section accommodating chamber 2151B while the lower face 23022 of the connector section 230 is opposed to the lower face 25210 of the connector section accommodating chamber 2151B as seen in FIGS. 35A and 35B.

In this state, the upper face 210C of the first battery 22 is positioned in the proximity of the upper face 25202 (wall face) of the case accommodating chamber 2151A, and the lower face 210D of the first battery 22 is positioned in a spaced relationship from the lower face 25204 of the case accommodating chamber 2151A.

Then, the letting off preventing projections are engaged with the cutaway portions 21004 of the engaging walls 21002 to keep the loaded state of the first battery 22 stably.

Thereafter, the opening/closing door 2154 would be closed.

Consequently, dc power is supplied from the first battery 22 to the components of the image pickup apparatus 2100 through the power supply circuit 2172.

When the first battery 22 is to be removed, the opening/closing door 2154 would be opened and the first battery 22 would be removed from the battery accommodating chamber 2151 with a rear portion thereof grasped by the user.

Now, loading of the second battery 24 is performed in the following manner.

Similarly as in the case wherein the first battery 22 is loaded, the opening/closing door 2154 would be opened, and while the upper face 210C, lower face 210D and left and right side faces 210E of the case 210 are opposed to the upper face 25202, lower face 25204 and left and right side faces 25206 of the case accommodating chamber 2151a of the image pickup apparatus 2100, respectively, the projecting walls 21002 of the second battery 24 would be inserted and pushed into the engaging grooves 254 of the battery accommodating chamber 2151.

Consequently, the contact pieces 234 of the connector section 230 and the contact pieces 260 of the electronic apparatus side connector section 250 are contacted with each other to connect the connector section 230 to the electronic apparatus side connector section 250 and the front face 23020 of the connector section 230 is positioned in the proximity of the interior face 25208 of the connector section accommodating chamber 2151B while the lower face 23022 of the connector section 230 is opposed to the lower face 25210 of the connector section accommodating chamber 2151B as seen in FIGS. 37A and 37B.

In this state, the upper face 210C of the second battery 24 is positioned in the proximity of the upper face 25202 (wall face) of the case accommodating chamber 2151A, and the lower face 210D of the second battery 24 is positioned in the proximity of the lower face 25204 of the case accommodating chamber 2151A.

Then, the letting off preventing projections described hereinabove are engaged with the cutaway portions 21004 of the engaging walls 21002 to keep the loaded state of the second battery 24 stably.

Thereafter, the opening/closing door 2154 would be closed.

Consequently, dc power is supplied from the second battery 24 to the components of the image pickup apparatus 2100 through the power supply circuit 2172.

When the second battery 24 is to be removed, the opening/closing door 2154 would be opened and the second battery 24 would be removed from the battery accommodating chamber 2151 with a rear portion thereof grasped by the user.

According to the battery of the present embodiment, since the position of the connector section 230 in the thicknesswise direction is determined with reference to the faces of the engaging walls 21002 of the left and right side faces 210E which face the upper face 210C or the lower face 210D, the first battery 22 having a smaller thickness can be accommodated in the case accommodating chamber 2151A in a condition wherein the lower face 23022 of the connector section 230 and the lower face 210D of the case 210 lie on the same plane and the lower face 210D of the case 210 is spaced from the lower face 25204 of the case accommodating chamber 2151A as seen in FIGS. 35A and 35B.

In other words, the connector section 230 can be provided in the battery accommodating chamber 2151 at a location wherein the electronic apparatus side connector section 250 is displaced upwardly from the lower face 25204 of the case accommodating chamber 2151A.

Consequently, since portions of the contact pieces 260 of the electronic apparatus side connector section 250 which are supported on the lower face 25210 of the connection section accommodating chamber 2151B are positioned at a location higher than the lower face 25204 of the case accommodating chamber 2151A but do not project downwardly father than the lower face 25204 of the case accommodating chamber 2151A, the case accommodating chamber 2151A may be formed in a size sufficient to accommodate the second battery 24 of a greater thickness. Accordingly, the dimension of the battery accommodating chamber 2151 in the upward and downward direction can be suppressed.

Further, since, in the present embodiment, the engaging walls 21002 are provided at a location displaced to the upper face 210C or the lower face 210D of the case 210 from the center in the thicknesswise direction of the left and right side faces 210E of the case 210, even if it is tried to insert a battery in a vertically reversed state, the engaging walls 21002 cannot be inserted into the engaging grooves 254. Consequently, wrong insertion of the battery in a vertically reversed state can be prevented.

Further, according to the image pickup apparatus 2100 of the present embodiment, since a battery is inserted into the battery accommodating chamber 2151 while the engaging walls 21002 thereof are engaged with and positioned in the upward and downward direction by the engaging grooves 254 of the case accommodating chamber 2151A and the lower face of the connection section accommodating chamber 2151B is provided at a location displaced to the upper face 25202 of the case accommodating chamber 2151A with respect to the lower face 25204 of the case accommodating chamber 2151A, portions of the contact pieces 260 of the electronic apparatus side connector section 250 which are supported by the lower face 25210 of the connection section accommodating chamber 2151B can be positioned at a location higher than the lower face 25204 of the case accommodating chamber 2151A. Consequently, the electronic apparatus side connector section 250 does not project downwardly farther than the lower face 25204 of the case accommodating chamber 2151A, and accordingly, the battery accommodating chamber 2151 may be formed with a size sufficient to accommodate the second battery 24. This is advantageous in suppressing the dimension of the battery accommodating chamber 2151 in the upward and downward direction.

Further, according to the image pickup apparatus 2100 of the present embodiment, since the upper face 210C of the case 210 and the upper face 25202 (wall face) of the case accommodating chamber 2151A which is opposed to the upper face 210C are positioned in the proximity of each other in a state wherein the case 210 is accommodated in the battery accommodating chamber 2151 with the engaging walls 21002 engaged with the engaging grooves 254 and with the connector section 230 connected to the electronic apparatus side connector section 250, the case 210 of the battery can function as a reinforcing plate for the wall portion 2103 which forms the body case 2102 of the image pickup apparatus 2100. This is advantageous in reducing the thickness and the size of the body case 2102 of the image pickup apparatus 2100.

It is to be noted that, in the fifth embodiment described above, the engaging walls 21002 are provided at an intermediate portion in the thicknesswise direction of the left and right side faces 210E of the case 210 so as to project outwardly in the widthwise direction and extend in the lengthwise direction and the position of the connector section 230 in the thicknesswise direction is determined with reference to the faces of the engaging walls 21002 of the left and right side faces 210E which face the upper face 210C or the lower face 210D and besides the engaging grooves 254 are provided on the left and right side faces 25206 of the case accommodating chamber 2151A of the image pickup apparatus 2100 so as to extend along the insertion direction and be engageable with the engaging walls 21002 of a battery. However, similar action and advantages to those of the fifth embodiment can naturally be achieved by such a modification as described just below. In particular, a groove is provided at an intermediate portion in the thicknesswise direction of each of the left and right side faces 210E of the case 210 of a battery so as to be depressed inwardly in the widthwise direction and extend in the lengthwise direction and the position of the connector section 230 in the thicknesswise direction is determined with reference to one of a pair of opposing faces which form each of the grooves while a wall is provided on each of the left and right side faces 25206 of the case accommodating chamber 2151A of the image pickup apparatus 2100 so as to project from the corresponding side face 25206 and extend along the insertion direction such that it can engage with the corresponding one of the grooves on the left and right side faces 210E of the battery. In this instance, the face which is to be used as a reference to the position of the connector section 230 in the thicknesswise direction is that one of a pair of opposing faces of the groove which faces downwardly.

Sixth Embodiment

Now, a sixth embodiment of the present invention is described with reference to FIGS. 38 to 40.

The sixth embodiment is a modification to and is similar in configuration to the fifth embodiment except the configuration of the case accommodating chamber 2151A of the battery receiving section 2150.

Figure 38:
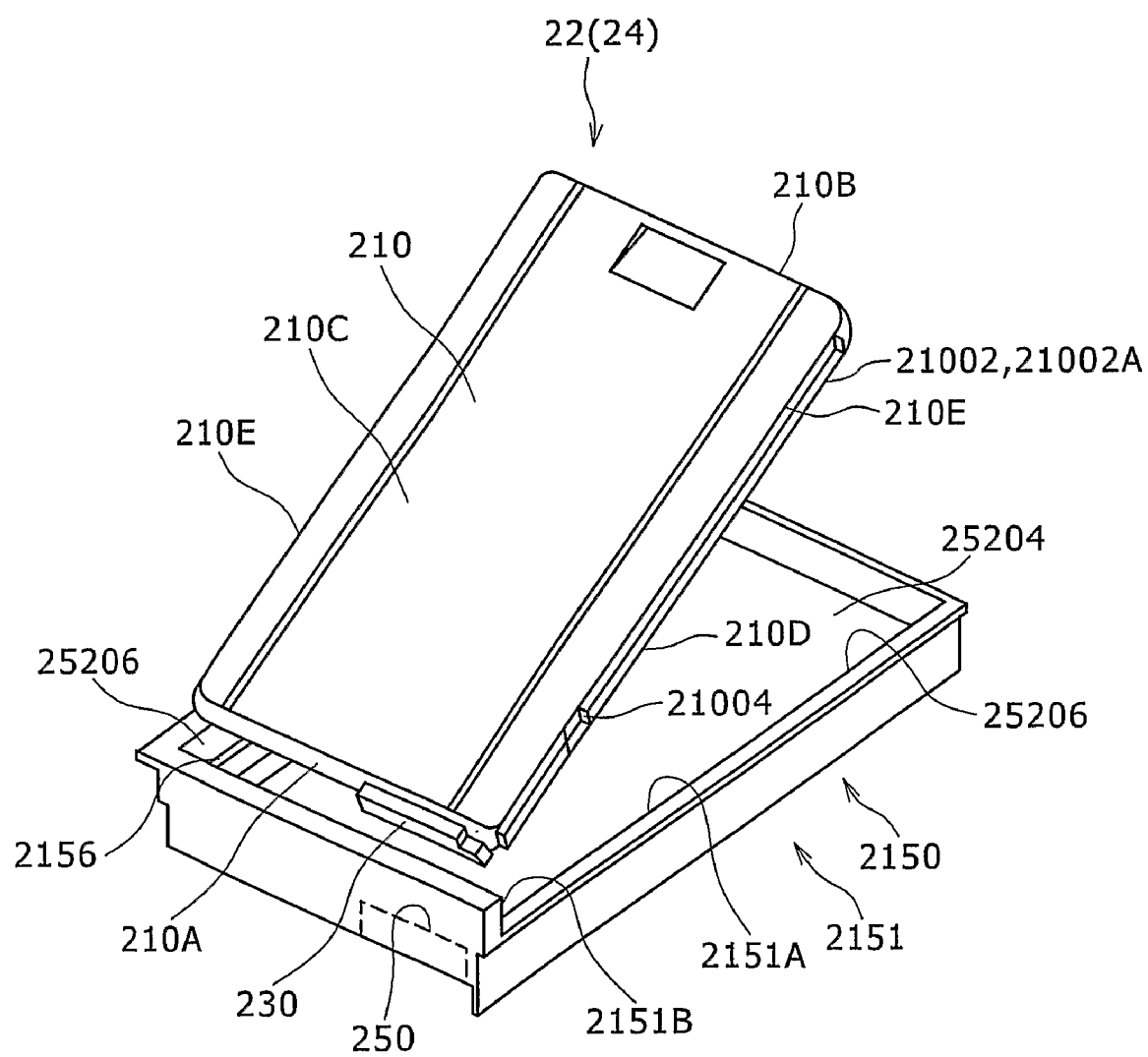
FIG. 38 is a perspective view of a battery according to a sixth embodiment of the present invention and a battery receiving section.
Figure 39:
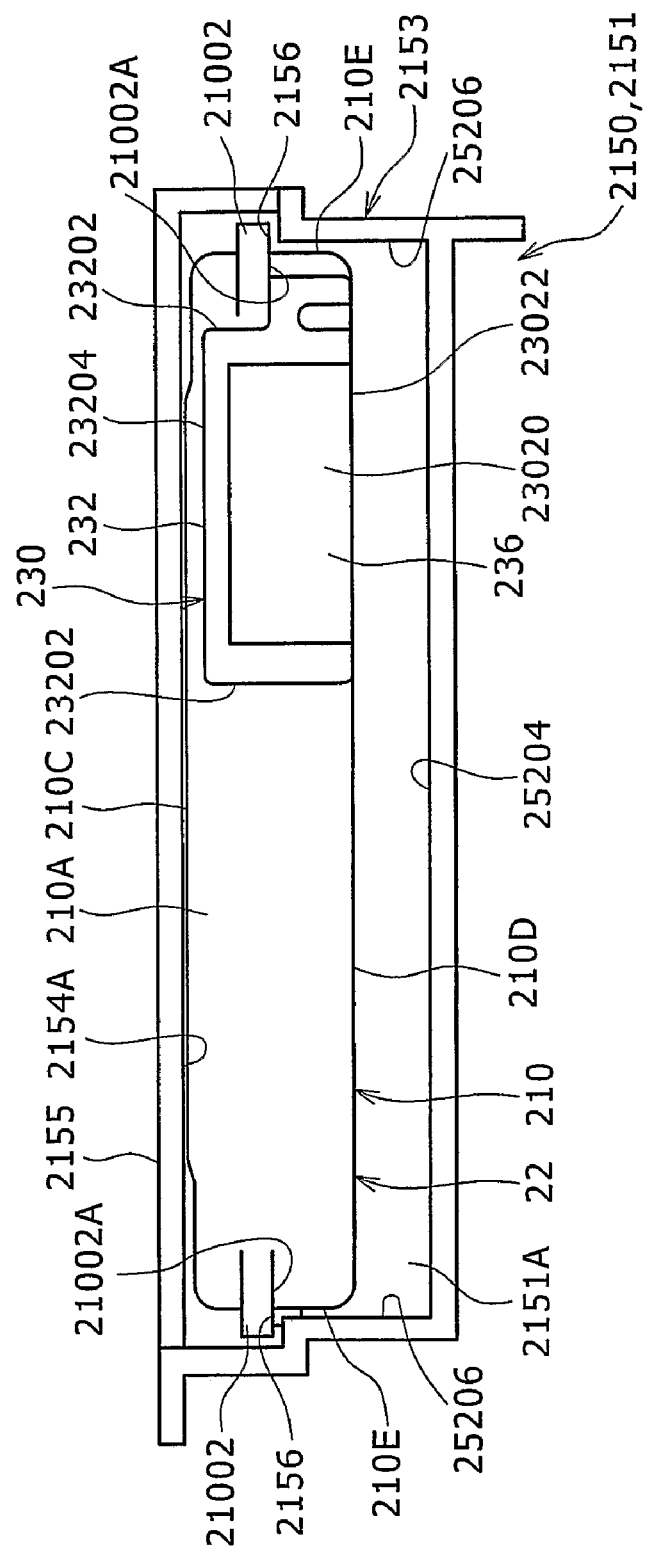
FIG. 39 is a schematic view showing the first battery loaded in the battery receiving section.
Figure 40:
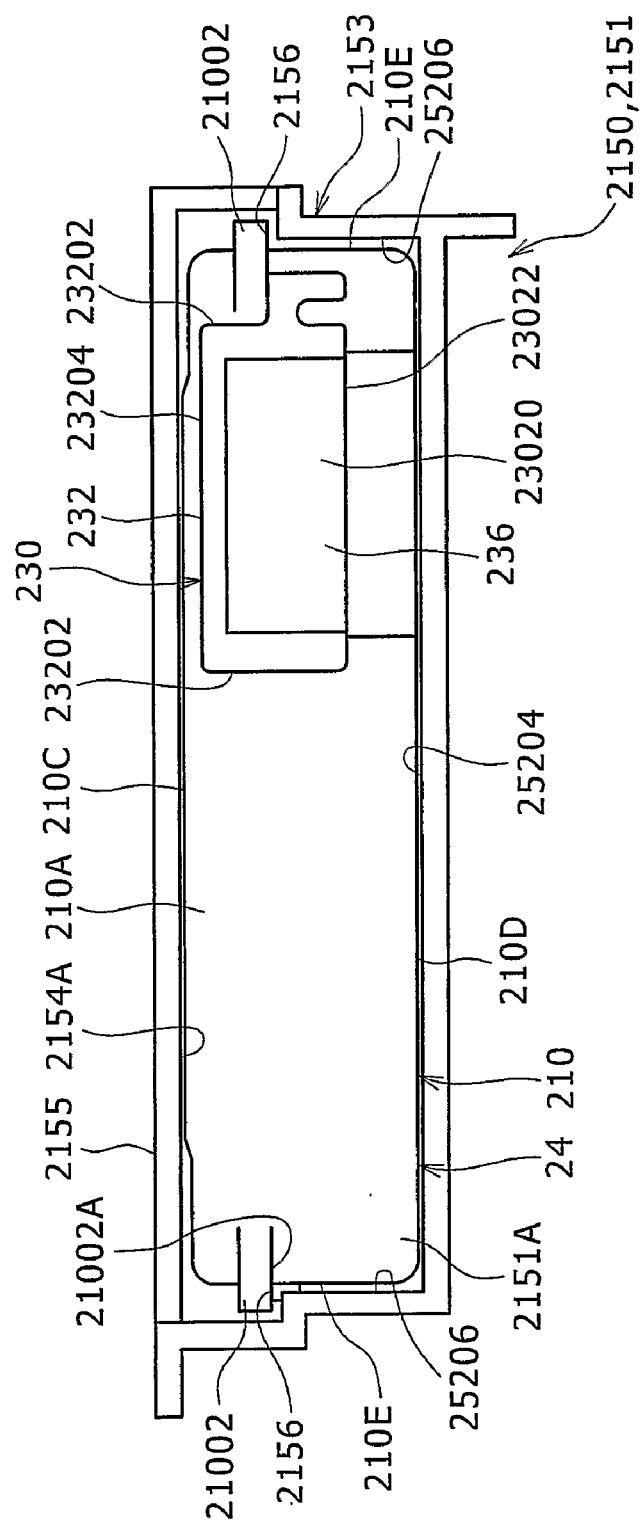
FIG. 40 is a schematic view showing the second battery loaded in the battery receiving section.

As seen in FIGS. 38 to 40, the battery receiving section 2150 of the image pickup apparatus 2100 includes a battery accommodating chamber 2151, a lid member 2155, an electronic apparatus side connector section 250 and a locking section.

The battery accommodating chamber 2151 has a case accommodating chamber 2151A and a connector section accommodating chamber 2151B which accommodates the connector section 230 of a battery. The case accommodating chamber 2151A has a lower face 25204 and left and right side faces 25206 which face the lower face 210D and left and right side faces 210E of the case 210, respectively, and is open upwardly. The connector section accommodating chamber 2151B has a pair of upwardly facing receiving faces 2156 formed so as to extend along the forward and backward direction on the left and right side faces 25206 of the case accommodating chamber 2151A and receive the faces 21002A of the engaging walls 21002 (serving as receiving walls) of a battery which face the lower face 210D of the battery. The connection section accommodating chamber 2151B further has an interior face connected to the case accommodating chamber 2151A and facing a forwardly facing front face 23020 of the connector section 230, and a lower face which faces the downwardly facing lower face 23022 of the connector section 230.

The lid member 2155 is formed so as to cooperate with the case accommodating chamber 2151A to cover a battery disposed in the case accommodating chamber 2151A with the engaging walls 21002 received by the receiving faces 2156.

The locking section is provided to keep a battery loaded in a stable state in the battery receiving section 2150.

The locking section is provided so as to press the engaging walls 21002 of a battery disposed in the case accommodating chamber 2151A against the receiving faces 2156 and bias the battery in a direction in which the connector section 230 is mated with the electronic apparatus side connector section 250. For example, the locking section is disposed such that an end portion thereof is attached to the case of the battery accommodating chamber 2151 or is removably attached to the lid member 2155 and a wall portion 2153 which defines the battery accommodating chamber 2151. Various conventionally known structures can be adopted for the configuration of the locking section.

The lower face of the connection section accommodating chamber 2151B is provided at a location displaced to the upper face of the case accommodating chamber 2151A rather than the lower face of the case accommodating chamber 2151A similarly as in the fifth embodiment.

The electronic apparatus side connector section 250 includes a plurality of contact pieces supported on the interior face and the lower face of the connection section accommodating chamber 2151B and juxtaposed in a spaced relationship from each other between the left and right side faces of the case accommodating chamber 2151A similarly as in the fifth embodiment. The connector section 230 can be mated with the contact pieces.

The upper face 210C of the case 210 and a face 2154A of the lid member 2155 which opposes to the upper face 210C are positioned in the proximity of each other in a state wherein the engaging walls 21002 of the case 210 are placed on the receiving faces 2156 and the connector section 230 is connected to the electronic apparatus side connector section 250 while the lid member 2155 cooperates with the case accommodating chamber 2151A to cover a battery disposed in the case accommodating chamber 2151A similarly as in the fifth embodiment.

Now, action and advantages are described.

When the first battery 22 is to be loaded into the image pickup apparatus 2100, the lid member 2155 would be opened as shown in FIG. 38, and while the case 210 of the first battery 22 is inclined such that the front face 210A side thereof is positioned downwardly, the first battery 22 would be inserted into the battery accommodating chamber 2151A.

Thus, the connector section 230 is mated with the electronic apparatus side connector section 250, and the lower face 210D and the left and right side faces 210E of the case 210 face the lower face 25204 and the left and right side faces 25206 of the case accommodating chamber 2151A of the image pickup apparatus 2100, respectively. Further, the engaging walls 21002 of the first battery 22 are received by the receiving faces 2156 of the battery accommodating chamber 2151.

Then, the first battery 22 is kept in a stable state in the battery receiving section 2150 by the locking section, and the first battery 22 disposed in the battery accommodating chamber 2151 is covered from above with the lid member 2155. In this state, the lid member 2155 is kept in the closing state by an engaging member not shown.

Consequently, the contact pieces 234 of the connector section 230 and the contact pieces 260 of the electronic apparatus side connector section 250 are contacted with each other thereby to couple the connector section 230 to the electronic apparatus side connector section 250 and the front face 23020 of the connector section 230 is positioned in the proximity of the interior face 25208 of the connector section accommodating chamber 2151B while the lower face 23022 of the connector section 230 is opposed to the lower face 25210 of the connector section accommodating chamber 2151B similarly as in the case of FIGS. 35A and 35B according to the fifth embodiment.

In this state, the upper face 210C of the first battery 22 is positioned in the proximity of the face 2154A of the lid member 2155 and the lower face 210D of the first battery 22 is positioned in a spaced relationship from the lower face 25204 of the case accommodating chamber 2151A as seen in FIG. 39.

Consequently, dc power is supplied from the first battery 22 to the components of the image pickup apparatus 2100 through the power supply circuit 2172.

When the first battery 22 is to be removed, the engagement of the lid member 2155 by the engaging section is canceled to release the lid member 2155 and then the locking of the first battery 22 by the locking section is canceled, whereafter the first battery 22 would be removed from the battery accommodating chamber 2151 with a rear portion thereof grasped by the user.

According to the battery of the sixth embodiment, since the position of the connector section 230 in the thicknesswise direction is determined with reference to the faces of the engaging walls 21002 of the left and right side faces 210E which face the upper face 210C or the lower face 210D similarly as in the fifth embodiment, the first battery 22 having a smaller thickness can be accommodated in the case accommodating chamber 2151A in a condition wherein the lower face 23022 of the connector section 230 and the lower face 210D of the case 210 lie on the same plane and the lower face 210D of the case 210 is spaced from the lower face 25204 of the case accommodating chamber 2151A as seen in FIGS. 35A and 35B.

In other words, the connector section 230 can be provided in the battery accommodating chamber 2151 at a location wherein the electronic apparatus side connector section 250 is displaced upwardly from the lower face 25204 of the case accommodating chamber 2151A.

Consequently, since portions of the contact pieces 260 of the electronic apparatus side connector section 250 which are supported on the lower face 25210 of the connection section accommodating chamber 2151B are positioned at locations higher than the lower face 25204 of the case accommodating chamber 2151A but do not project downwardly father than the lower face 25204 of the case accommodating chamber 2151A, the case accommodating chamber 2151A may be formed in a size sufficient to accommodate the second battery 24 of a greater thickness. Accordingly, the dimension of the battery accommodating chamber 2151 in the upward and downward direction can be suppressed.

Further, according to the image pickup apparatus 2100 of the sixth embodiment, since a battery is inserted into the battery accommodating chamber 2151 while the engaging walls 21002 thereof are engaged with and positioned in the upward and downward direction by the engaging grooves 254 of the case accommodating chamber 2151A and the lower face of the connection section accommodating chamber 2151B is provided at a location displaced to the upper face 25202 of the case accommodating chamber 2151A with respect to the lower face 25204 of the case accommodating chamber 2151A, portions of the contact pieces 260 of the electronic apparatus side connector section 250 which are supported by the lower face 25210 of the connection section accommodating chamber 2151B can be positioned at a location higher than the lower face 25204 of the case accommodating chamber 2151A. Consequently, the electronic apparatus side connector section 250 does not project downwardly farther than the lower face 25204 of the case accommodating chamber 2151A, and accordingly, the battery accommodating chamber 2151 may be formed with a size sufficient to accommodate the second battery 24. This is advantageous in suppressing the dimension of the battery accommodating chamber 2151 in the upward and downward direction.

Further, according to the image pickup apparatus 2100 of the sixth embodiment, since the upper face 210C of the case 210 and the face 2154A of the lid member 2155 which is opposed to the upper face 210C are positioned in the proximity of each other in a state wherein the case 210 is accommodated in the battery accommodating chamber 2151 with the engaging walls 21002 received by the receiving faces 2156 and with the connector section 230 connected to the electronic apparatus side connector section 250, the case 210 of the battery can function as a reinforcing plate for the lid member 2154 of the image pickup apparatus 2100. This is advantageous in reducing the thickness and the size of the body case 2102 of the image pickup apparatus 2100.

It is to be noted that, while, also in the fifth and sixth embodiments described above, the electronic apparatus is an image pickup apparatus, the electronic apparatus is not limited to an image pickup apparatus but the present invention can be applied naturally to any apparatus in which a battery is loaded such as illumination apparatus, audio apparatus, communication apparatus and battery charging apparatus.

While preferred embodiments of the present invention have been described using specific terms, such description is for illustrative purpose only, and it is to be understood that changes and variations may be made without departing from the spirit or scope of the following claims.

The invention claimed is:

1. A battery, comprising:
a case of a flattened substantially rectangular plate shape having a thickness, a width in a leftward and rightward direction having a greater dimension than the thickness and a length in a forward and backward direction having a greater dimension than the width;
a battery cell accommodated inside said case;
a connector section formed near a first end portion in a widthwise direction on one of faces at the opposite ends of said case in a lengthwise direction and projecting in the lengthwise direction, the connector section including a connector wall section that protrudes in the lengthwise direction from the one end face of said case, wherein the connector wall section is directly connected to and abuts the connector section on at least three sides thereof; and
a first wall portion abutting the connector section and extending from a first end of the connector section to a second end portion of the case in the widthwise direction;
a second wall portion to discriminate a battery characteristic, the second wall portion being disposed laterally and directly adjacent in lengthwise direction to the connector section such that the second wall portion directly abuts the connector section and extends from a second end of said connector section to the first end portion in the widthwise direction on one end face of the case, the second wall portion protruding beyond the first wall portion in the lengthwise direction.

2. The battery according to claim 1, wherein said connector wall section includes
a pair of vertical walls spaced from each other in the widthwise direction and extending in a thicknesswise direction, and
a plurality of contact pieces connected to said battery cell and provided in a spaced relationship from each other in the widthwise direction between said vertical walls, said second wall portion being connected to one of said vertical walls positioned near to the first end portion in the widthwise direction.

3. The battery according to claim 2, wherein
said connector wall section has a transverse wall extending in the widthwise direction at a location near one of the faces of said case at the opposite ends in the thicknesswise direction and interconnecting end portions in the thicknesswise direction of said vertical walls,
said vertical walls and said transverse wall cooperatively define a space which is open in the lengthwise direction and is open to the other face from between the faces at the opposite ends in the thicknesswise direction, and
a terminal forming member is disposed in said open space, said terminal forming member having a plurality of grooves formed in a spaced relationship from each other in the widthwise direction in such a manner as to be open in the lengthwise direction and extend in the thicknesswise direction, said contact pieces being disposed so as to form side faces of said grooves opposing to each other in the widthwise direction.

4. The battery according to claim 3, wherein said grooves are open to the other face from between the faces at the opposite ends of the faces in the thicknesswise direction.

5. The battery according to claim 3, wherein a portion of said connector wall section at an end portion in the lengthwise direction and a location of said terminal forming member at the end portion in the lengthwise direction extend on a plane parallel to the one end face.

6. The battery according to claim 3, wherein a portion of said connector wall section at an end portion in the lengthwise direction, a location of said terminal forming member at the end portion in the lengthwise direction and a location of said second wall portion at the end portion in the lengthwise direction extend on a plane parallel to the one end face.

7. The battery according to claim 1, wherein said second wall portion is formed with a thickness substantially ½ the thickness of said case.

8. The battery according to claim 1, wherein said second wall portion is formed with a thickness of a dimension smaller than that of the thickness of said case, and a space is formed above and below said second wall portion to discriminate forward of the one face.

9. The battery according to claim 1, wherein said second wall portion is provided over the overall length between one of said vertical walls positioned near the first end portion in the widthwise direction and the first end portion in the widthwise direction of the one face.

10. The battery according to claim 1, wherein that one of said vertical walls positioned near the first end portion in the widthwise direction extends to the first end portion in the widthwise direction of the one face, and said second wall portion is formed by the portion formed by the extension of said vertical walls.

11. The battery according to claim 1, wherein each of side faces of said case positioned at the opposite ends in the widthwise direction has an engaging wall formed in such a manner as to project outwardly in the widthwise direction and extend in the lengthwise direction.

12. The battery according to claim 1, wherein the second wall portion protrudes the same distance in the lengthwise direction as the projection of the connector section.

13. The battery according to claim 1, wherein said second wall portion includes a recess formed within the second wall having a size less than the second wall portion in the widthwise direction.

14. The battery according to claim 12, wherein said second wall portion includes a recess formed within the second wall having a size less than the second wall portion in the widthwise direction.

15. The battery according to claim 2, wherein said second wall portion includes a recess formed within in the second wall having a size less than the second wall portion in the widthwise direction.

16. The battery according to claim 3, wherein said second wall portion includes a recess formed within the second wall having a size less than the second wall portion in the widthwise direction.

* * * * *